(12) United States Patent
Mori et al.

(10) Patent No.: US 7,711,241 B2
(45) Date of Patent: May 4, 2010

(54) SHORT FILM GENERATION/REPRODUCTION APPARATUS AND METHOD THEREOF

(75) Inventors: Yasuhiro Mori, Izumi (JP); Ichiro Okabayashi, Ikoma (JP); Masaki Yamauchi, Ibaraki (JP); Akihiro Kawabata, Daito (JP)

(73) Assignee: Panasonic Corporation, Osaka (JP)

( * ) Notice: Subject to any disclaimer, the term of this patent is extended or adjusted under 35 U.S.C. 154(b) by 1628 days.

(21) Appl. No.: 10/714,917

(22) Filed: Nov. 18, 2003

(65) Prior Publication Data

US 2004/0100487 A1     May 27, 2004

(30) Foreign Application Priority Data

| Nov. 25, 2002 | (JP) | ............................ 2002-341292 |
| Jun. 12, 2003 | (JP) | ............................ 2003-167825 |

(51) Int. Cl.
*G11B 27/00*      (2006.01)
(52) U.S. Cl. ........................... 386/54; 386/52; 348/526; 348/528
(58) Field of Classification Search .................. 386/54; 348/526, 528
See application file for complete search history.

(56) References Cited

U.S. PATENT DOCUMENTS

| 6,072,480 | A | 6/2000 | Gorbet et al. |
| 6,211,974 | B1 * | 4/2001 | Haneda ....................... 358/527 |
| 2002/0015514 | A1 | 2/2002 | Kinjo |
| 2005/0158030 | A1 * | 7/2005 | Nishikawa et al. ............ 386/83 |

FOREIGN PATENT DOCUMENTS

| EP | 0 889 638 | 7/1999 |
| EP | 1 209 589 | 5/2002 |
| EP | 1 235 182 | 8/2002 |
| JP | 01-092875 | 4/1989 |
| JP | 8-44857 | 2/1996 |
| JP | 10-97639 | 4/1998 |
| JP | 10-336558 | 12/1998 |
| JP | 11-15993 | 1/1999 |
| JP | 11-243484 | 9/1999 |

(Continued)

OTHER PUBLICATIONS

European Search Report issued Aug. 1, 2007 for EP Application No. 03026208.3.
"Channel 3/4 Output," XP002443650, retrieved online from the Internet on Jul. 18, 2007 at URL:http://en.wikipedia.org/wiki/Channel_3/4_output.

*Primary Examiner*—Thai Tran
*Assistant Examiner*—Daniel Tekle
(74) *Attorney, Agent, or Firm*—Wenderoth, Lind & Ponack, L.L.P.

(57) ABSTRACT

A short film generation/reproduction apparatus for generating video of a short film using at least one still picture and reproducing such video is comprised of: a picture feature extraction unit 1107 for extracting picture features from an input picture; a picture-to-style feature conversion unit 1115 for converting the picture features into style features; a picture-to-musical feature conversion unit 1118 for converting the picture features into musical features; a style determination unit 1116 for determining a style based on the style features; a music determination unit 1119 for determining a piece of music based on the musical features; and a scenario generation unit 1117 for generating a scenario by using the still picture, music and style.

38 Claims, 57 Drawing Sheets

FOREIGN PATENT DOCUMENTS

| | | |
|---|---|---|
| JP | 2000-295566 | 10/2000 |
| JP | 2001-13939 | 1/2001 |
| JP | 2002-077592 | 3/2002 |
| JP | 2002-092019 | 3/2002 |

* cited by examiner

Fig.18

Object information 2220

| | File name of still picture | a001.jpg | |
|---|---|---|---|
| 2211 | Type of object | Person's face | |
| 2212 | Position information of object | Center coordinates of object | 00:(x0, y0) | 01:(x1, y1) | ... |
| 2213 | | Size of object | r0 | r1 | ... |

Fig.19

Effect table 2230

| | Effect name | Number of required objects |
|---|---|---|
| eff1 | Spotlight | 1~4 |
| eff2 | Zoom | 1~4 |
| eff3 | Trimming | 1~2 |
| eff4 | Cross talk | 2 |
| eff5 | Slide in | Any number |
| eff6 | Slide out | Any number |

Fig.25

Scenario2270

| Starting time | 0 second | 2 seconds | 3 seconds | ... |
|---|---|---|---|---|
| End time | 2 seconds | 3 seconds | 5 seconds | ... |
| Effect | Slide out | Zoom | Slide in | ... |
| Still picture | A | B | C | ... |
| Parameters | 1. Size (width of blocks to be slide out)<br>B0: position of block boundary yBL[j], θ<br>...<br>Variation: slanting: FO=1, θ<br>2. Order (order of sliding out blocks)<br>B0, B1, ...<br>3. Direction (direction in which blocks are slide out)<br>B0: toward upper right<br>B1: toward lower right<br>... | O0(x0, y0)<br>r0 | | |

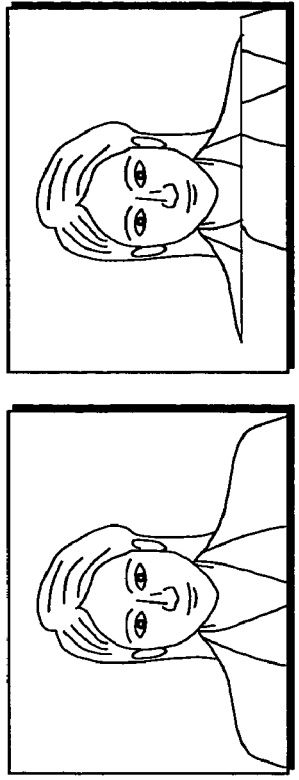
Fig.27A
Fig.27B
Fig.27C
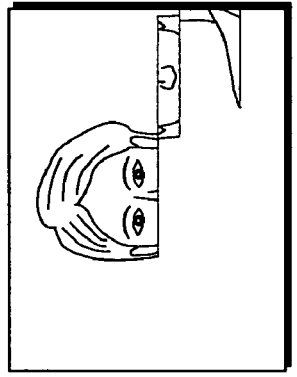
Fig.27D
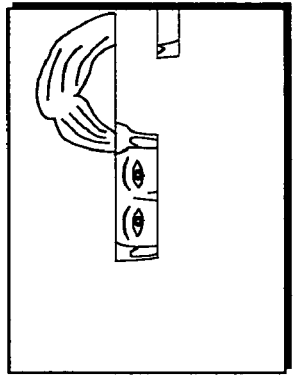
Fig.27E
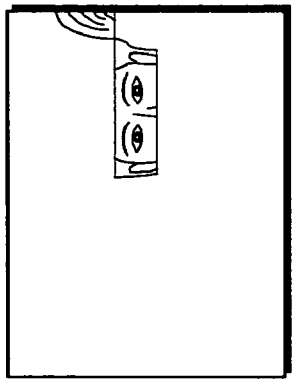
Fig.27F
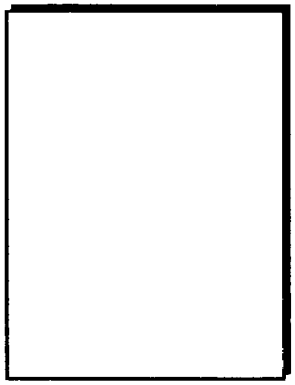
Fig.27G

Fig.28

Effect table 2231

| Effect name | Number of required objects | Feature point of required object |
|---|---|---|
| ... | ... | ... |
| Montage | 1,2 | head, eyes, nose, mouth |
| ... | ... | ... | eff10

Fig.30

Object information 2221

| File name of still picture | | | b001.jpg |
| --- | --- | --- | --- |
| Center coordinates of object | | | O0:(x0, y0) |
| Size of object | | | r0 |
| Feature points | Eyes | Left | Inner corner | Oels0:(xels0, yels0) |
| | | | Outer corner | Oels0:(xels0, yels0) |
| | | Right | Inner corner | Oers0:(xers0, yers0) |
| | | | Outer corner | Oers0:(xers0, yers0) |
| | Top of nose | | | On0:(xn0, yn0) |
| | Edges of mouth | | | Oml0:(xml0, yml0), Omr0:(xmr0, ymr0) |
| | Edges of eye brows | | | ... |
| | ... | | | ... |

Fig.32

Scenario 2271

| Starting time | 0 second |
|---|---|
| End time | 2 seconds |
| Effect | Montage |
| Still picture | b001.jpg |
| Parameters | 1. Size (width of blocks to be slide out)<br>2. Order (order of sliding out blocks)<br>　1. Blocks other than face<br>　2. Block including mouth<br>　3. Block including head<br>　4. Block including eyes<br>3. Direction (direction in which blocks are slide out)<br>　Random |
| ⋮ | ⋮ |

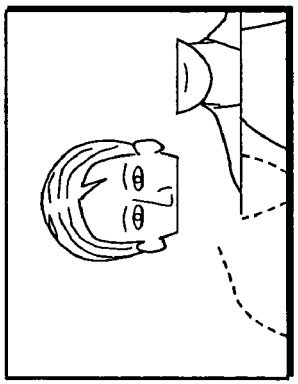
Fig.33D
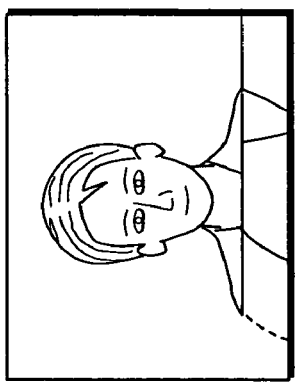
Fig.33C
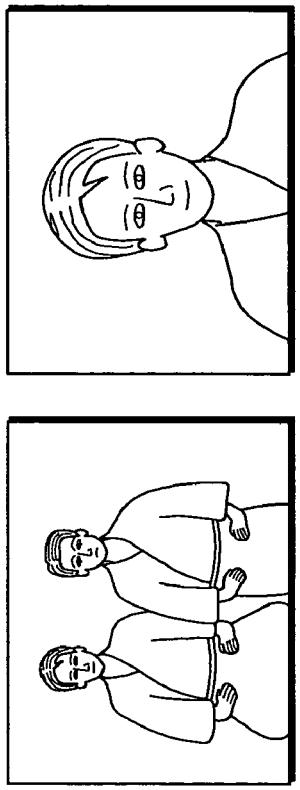
Fig.33B
Fig.33A
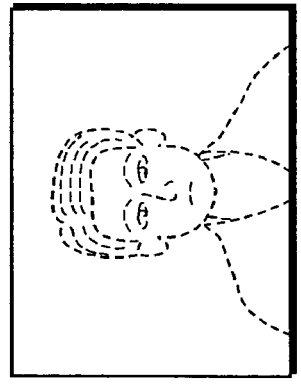
Fig.33H
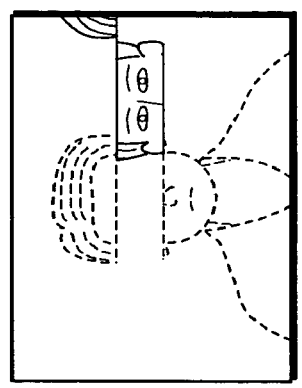
Fig.33G
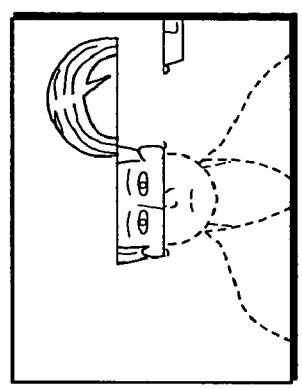
Fig.33F
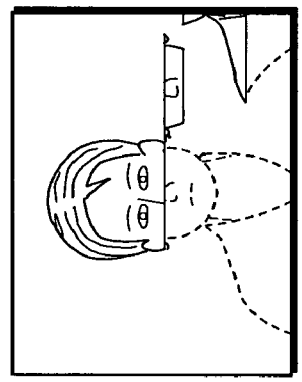
Fig.33E

Fig.36

Effect table 2232

| Effect name | Number of required objects | Focusability on one person |
|---|---|---|
| eff1 Spotlight | 1~4 | OK |
| eff2 Zoom | 1~4 | OK |
| eff3 Trimming | 1~2 | OK |
| eff4 Cross talk | 2 | NO |
| eff5 Slide in | Any number | OK |
| eff6 Slide out | Any number | OK |
| ... | ... | ... |

Fig.38

Object information 2222

| File name | c001.jpg | | |
|---|---|---|---|
| Center coordinates of object | 00:(x0, y0) | 01:(x1, y1) | 02:(x2, y2) |
| Size of object | r0 | r1 | r2 |
| Name of object | Stewart | Nash | Nikita |

Fig.40

| | Scenario 2272 | |
|---|---|---|
| Starting time | 0 second | ⋮ |
| End time | 2 seconds | ⋮ |
| Effect | Spotlight | ⋮ |
| Still picture | c001.jpg | ⋮ |
| Parameter | Object to put spotlight on Nikita | ⋮ |

Fig.45

Effect table 2233

| Effect name | Number of required objects | Sex of required objects | Character |
|---|---|---|---|
| ... | ... | ... | ... |
| Side in (eff5) | 2 | 1 man and 1 woman | Heart mark |
|  |  | Other combination possible | ○ |
| Slide out (eff6) | 2 | 1 man and 1 woman | Heart mark |
|  |  | Other combination possible | ○ |
| ... | ... | ... | ... |

Fig.47

Object information 2223

| | | b001. jpg | |
|---|---|---|---|
| File name | | | |
| Center coordinates of object | | O0:(x0, y0) | O1:(x1, y1) |
| Size of object | | r0 | r1 |
| Name of object | | Hanako ○△ | Taro □× |
| Object attributes | Sex | Female | Male |
| | Age | 23 | 26 |
| | Date of birth | June 20, △△ | August 10, ○○ |
| | Affiliation | Software Development Office | Intellectual Property Management Office |
| | Hobby | Hiking | Cycling |

SHORT FILM GENERATION/REPRODUCTION APPARATUS AND METHOD THEREOF

BACKGROUND OF THE INVENTION (1) Field of the Invention

The present invention relates to a short film generation/reproduction apparatus for generating video of a short film using at least one still picture and reproducing such video, as well as a method thereof.

(2) Description of the Related Art

In the domestic camera market in Japan in 2001, the number of shipments of digital still cameras exceeded that of film cameras, and the disparity between them will expectedly be wider in 2002. Furthermore, a great many number of digital camera-equipped mobile phones have been released in the recent mobile phone market, enjoying great popularity. Against this backdrop, there are an increased number of users of digital still cameras, who possess a large number of digital still pictures (to be referred to as "DSP" hereinafter).

Generally, DSPs are stored in the disk drive of a personal computer. In order to enable a user to view and manage such a large number of DSPs, application software packages, so-called "image browsing software" for viewing and managing pictures are on sale. Such applications is capable of realizing a conventionally-used paper photo album on a personal computer, as well as enabling the user to view the whole pictures in the form of thumbnails and carrying out hierarchical management of pictures by the use of directories.

Moreover, the above applications have a capability known as "slide show" as one of the capabilities of viewing DSPs stored in the disk drive (Refer to Japanese Laid-Open Patent application No. 01-92875, for example). Slide show can be likened to "digital picture card show" in which a DSP to be displayed is switched to another one at certain time intervals or according to a trigger such as a user instruction, as in the case of a slide projector. Some of the image browsing software applications are further capable of increasing a degree of entertainment by adding, to pictures, BGM and transitions such as "fade", "wipe" and "rotation" when a DSP is switched to another one.

However, the above applications are nothing but virtual embodiments of conventional paper photo albums on personal computers, indicating that slide show is basically the same as a picture card show in which pictures need to be flipped through one by one. Therefore, although the existing applications are well utilizing features of digital data, they are not capable of providing users with such enjoyment as can be provided only by the use of digital data.

In order to provide users with digital-specific enjoyment, there is application software for generating a cinema-like video (short film) from input still pictures (DIGITALSTAGE INC., LIFE with PhotoCinema). This application is capable of automatically generating a short film in response to the user's selections of still pictures, BGM (music) and a style set as film materials. Style set defines an outline (color tone and effect) of a short film to be generated and visual effects that match such image. This application, which is capable of giving moving picture-like motions to still pictures in a short film it generates, deserves being called a breakthrough in the field in that it has added a new dimension to the world of entertainment by utilizing digital still pictures.

However, the above application has the following problems.

Firstly, when selecting still pictures, music and a style, the user sometimes selects BGM and DSPs not suitable for such selected style (effect), giving a strange impression to a viewer of the short film.

Secondly, the user is required to select still pictures, music and a style all on his/her own, which is highly troublesome. For example, it may not be troublesome for the user to select DSPs which s/he wishes to use, but it is complex for him/her to select music and a style suited to the selected pictures. Meanwhile, even if the user wishes to select summery DSPs and a lively style after selecting summery music, it is not easy for him/her to select a set of appropriate pictures and music from among a library storing an enormous number of DSPs.

Thirdly, the above application software does not recognize an object in the DSPs (e.g. a face) and does not take into account the position of such object before applying an effect to DSPs in a short film. Therefore, undesirable motions frequently occur such as that an unimportant portion of a DSP is cut out and inserted into a pictorial cut, that a portion of a person's face is gone out of a DSP frame and that a picture is zoomed in with the focus on an unimportant portion.

Fourthly, since the application is intended for the use on a personal computer, the user is required to operate the application by the keyboard, which is complex and troublesome. Also, although there is an increasing demand for reproducing a short film by such a home appliance as a television with the computerization of home appliances, current home appliances are not capable of reproducing short films yet.

Fifthly, the application is not capable of recognizing the type of an object (e.g. a facial part) and then applying a visual effect to DSPs. Because of this reason, a facial part is gone out of a DSP frame and the order of applying slide in/slide out is not determined on the basis of the importance of facial parts, giving a strange impression to the viewer of the short film.

Lastly, the application is not capable of recognizing the name of an object before applying a visual effect. As a result, all objects are handled equally, making it impossible to generate a short film in which an arbitrary person, for example, is put into focus. Therefore, when a short film generated by the above application is reproduced at a wedding reception or a birthday party where specific people are gathering, it is not possible to identify the main person in the short film because such object is out of focus. Thus, a short film generated by the existing application software does not serve the intended purpose, depending on a place where such short film is reproduced.

SUMMARY OF THE INVENTION

The present invention has been conceived in view of the above problems whose first object is to provide a short film generation/reproduction apparatus and a method thereof capable of determining elements appropriate for a user-selected element out of still pictures, music and style, and the like so as to generate and reproduce a short film, as well as capable of generating and reproducing a short film with an increased degree of entertainment by applying a visual effect to an appropriate object in a still picture.

The second object of the present invention is to provide a short film generation/reproduction apparatus and a method thereof capable of generating a short film and reproducing such short film in a home appliance without requiring the user to carry out complicated procedures.

The third object is to provide a short film generation/reproduction apparatus and a method thereof capable of generating a short film with an increased degree of entertainment by determining parameters for determining the operation of effects on the basis of information about an object in a still picture and capable of reproducing such short film.

The fourth object is to provide a short film generation/reproduction apparatus and a method thereof capable of recognizing the name of an object and then applying a visual effect so as to generate a short film in which focus is put into a specified object.

In order to achieve the first object, the short film generation/reproduction apparatus according to the present invention is a short film generation/reproduction apparatus for generating video using at least one still picture and reproducing said video, comprising: a database unit operable to store said at least one still picture, a picture feature indicating a feature of said at least one still picture, a style indicating an outline of the video to be generated, a style feature indicating a feature of said style, music, and a musical feature indicating a feature of said music; a selection unit operable to select one of the following elements to be used when generating the video: said at least one still picture; the music; and the style; a feature reading unit operable to read out, from the database unit, the feature corresponding to the element selected by the selection unit, the feature being one of the picture feature, the musical feature, and the style feature; a feature conversion unit operable to convert the feature read out by the feature reading unit into the other features; a determination unit operable to determine the elements to be used to generate the video other than the element selected by the selection unit, based on said other features converted by the feature conversion unit; and a scenario generation unit operable to generate a scenario of the video, based on the element selected by the selection unit and the other elements determined by the determination unit.

Accordingly, since it becomes possible to generate a scenario as well as video by just selecting any one of still pictures, music and a style to be used to generate video, it is not necessary for the user to select all of still pictures, music and a style as required in an existing technique.

Here, in the short film generation/reproduction apparatus according to the present invention, the feature conversion unit converts the picture feature read out by the feature reading unit into the musical feature and the style feature, when the selection unit selects said at least one still picture.

Accordingly, it is possible to determine music and a style which are optimum for generating video.

Also, in the short film generation/reproduction apparatus according to the present invention, the feature conversion unit converts the musical feature read out by the feature reading unit into the picture feature and the style feature, when the selection unit selects the music.

Accordingly, it is possible to determine music and still pictures which are optimum for generating video.

Moreover, in the short film generation/reproduction apparatus according to the present invention, the feature conversion unit converts the style feature read out by the feature reading unit into the picture feature and the musical feature, when the selection unit selects the style.

Accordingly, it is possible to determine still pictures and music which are optimum for generating video.

More specifically, in the short film generation/reproduction apparatus according to the present invention, the database unit further stores a theme of the video to be generated and a theme feature indicating a feature of said theme, the selection unit selects one of the following elements to be used when generating the video: said at least one still picture; the music; the style; and the theme, and the feature reading unit reads out, from the database unit, the feature corresponding to the element selected by the selection unit, the feature being one of the picture feature, the musical feature, the style feature, and the theme feature.

Accordingly, a selection can be made from among four elements of still pictures, music, style and a theme, and it becomes possible to generate a scenario as well as video by just selecting any one of still pictures, music, a style and a theme to be used to generate video.

Furthermore, in the short film generation/reproduction apparatus according to the present invention, the feature conversion unit converts the theme feature read out by the feature reading unit into the picture feature, the musical feature, and the style feature, when the selection unit selects the theme.

Accordingly, it becomes possible to determine still pictures, music and a style which are optimum for generating video.

Moreover, the short film generation/reproduction apparatus according to the present invention may further comprise: a still picture obtainment unit operable to obtain a still picture; and a picture feature extraction unit operable to extract a picture feature from the still picture obtained by the still picture obtainment unit.

Accordingly, it becomes possible to eliminate the complexity of preparing picture features and to obtain picture features matching a still picture.

Also, the short film generation/reproduction apparatus according to the present invention may further comprise an object information extraction unit operable to extract object information from the still picture obtained by the still picture obtainment unit, the object information being information about an object included in said still picture.

Accordingly, it becomes possible to select still pictures which are optimum for generating video according to extracted object information.

In the short film generation/reproduction apparatus according to the present invention, the style includes (i) a predetermined number of effects specifying what kind of visual effect is used to reproduce at least one target still picture which is the still picture obtained by the still picture obtainment unit, the predetermined number of effects being selected from a group of effects and (ii) a parameter including an attribute of the style, and the scenario generation unit associates, with each of the predetermined number of effects, the object information included in said at least one target still picture of said each of the predetermined number of effects.

By determining parameters which determine the operation of an effect based on the object information of a still picture, it becomes possible to select a still picture with the focus on the object, and to generate and reproduce a short film with an increased degree of entertainment.

More specifically, in the short film generation/reproduction apparatus according to the present invention, the scenario generation unit may include: an effect arrangement unit operable to select effects one by one from among the predetermined number of effects included in the style, and arrange said selected effects one by one in a time domain; a still picture assignment unit operable to assign a still picture to each of the effects arranged in the time domain by the effect arrangement unit on the basis of the object information, the still picture satisfying a picture feature required by the respective effects; and a parameter setting unit operable to generate the scenario by describing a parameter indicating processing to be performed on an object suitable for each of the effects arranged in the time domain by the effect arrangement unit, and store said generated scenario in the database unit.

By determining parameters which determine the operation of an effect based on the object information of a still picture, it is possible to circumvent the situation in which an object is subject to partitioning, and to generate and reproduce a short film with an increased degree of entertainment.

Furthermore, in the short film generation/reproduction apparatus according to the present invention, the picture feature required by each of the effects is a feature of the object.

Moreover, in the short film generation/reproduction apparatus according to the present invention, the feature of the object is at least one of a type of the object, a color of the object, a shape of the object, and the number of objects.

Also, the short film generation/reproduction apparatus according to the present invention may further comprise a feature point extraction unit operable to extract, from the object, a feature point indicating a characteristic part of the object, and store the extracted feature point in the object information, wherein the parameter setting unit generates the scenario by describing a parameter indicating processing to be performed on a position where the feature point of the object is located.

Accordingly, it becomes possible to generate and reproduce a short film with an increased degree of entertainment that focuses on the feature points of the object.

Also, in the short film generation/reproduction apparatus according to the present invention, the database unit further stores face information for individual authentication used to identify a face of an individual, the short film generation/reproduction apparatus further comprises a face authentication unit operable to authenticate a name of the object using the face information and store said authenticated name of the object in the object information, when the object extracted by the object information extraction unit is a person's face, and the parameter setting unit generates the scenario by describing a parameter indicating processing to be performed on the object specified by said authenticated name.

By recognizing the name of an object and reflecting such recognition on a visual effect, it becomes possible to generate a short film with the focus on a specific object and to reproduce such generated short film.

Furthermore, the short film generation/reproduction apparatus according to the present invention may further comprise: an individual information storage unit operable to store individual information in which a name of an individual and an attribute of said individual are associated with each other; and an individual information search unit operable to search, from the individual information, for the attribute of the individual corresponding to the name of the object authenticated by the face authentication unit, and store said individual attribute obtained by the search in the object information, wherein the parameter setting unit generates the scenario by describing a parameter indicating processing to be performed on the object specified by said individual attribute.

Accordingly, it is possible to generate a short film in which a visual effect that operates on an object specified by the attribute of the individual is used and to reproduce such generated short film.

Moreover, in the short film generation/reproduction apparatus according to the present invention, the style includes (i) a predetermined number of effects specifying what kind of visual effect is used to reproduce said at least one still picture which is a target of each of the predetermined number of effects and (ii) a parameter including an attribute of the style, and the scenario generation unit arranges said predetermined number of effects based on the attribute included in the style and an attribute included in each of the predetermined number of effects.

Accordingly, it becomes possible to determine a framework of a scenario according to the style first, and then make a detailed determination about its visual effect.

Also, in the short film generation/reproduction apparatus according to the present invention, the predetermined number of effects is either a basic effect including only one effect or an effect block made up of a plurality of basic effects, and the scenario generation unit arranges the basic effect or the effect block, based on the attribute included in the style and the attribute included in each of the predetermined number of effects.

Accordingly, it becomes possible to determine a framework of a scenario according to the style first, and then make a further detailed determination about its visual effect.

Furthermore, in the short film generation/reproduction apparatus according to the present invention, the scenario generation unit assigns a still picture to each of the predetermined number of effects, the still picture being suitable for a type of each of said predetermined number of effects.

Accordingly, it becomes possible to assign optimum still pictures to effects.

Also, the short film generation/reproduction apparatus according to the present invention may further comprise: a short film selection unit operable to select the video to be reproduced; and a short film reproduction unit operable to read out, from the database unit, the scenario of the video selected by the short film selection unit, and said at least one still picture and the music defined in said scenario, and reproduce the video based on said scenario.

Accordingly, it becomes possible to select and reproduce a desired short film from among short films which were already generated.

Moreover, the short film generation/reproduction apparatus according to the present invention may further comprise a display unit operable to display the video reproduced by the short film reproduction unit.

What is more, in order to achieve the second object, the short film generation/reproduction apparatus according to the present invention may further comprise an operation unit operable to operate the short film generation/reproduction apparatus and a display device for displaying the video, the display device being connected to said short film generation/reproduction apparatus, wherein the short film reproduction unit modulates a signal obtained by reproducing the video into an RF signal so as to output said RF signal, and starts reproducing the video when a predetermined channel button is pressed down, the channel button being included in the operation unit and being assigned the RF signal.

Also, in he short film generation/reproduction apparatus according to the present invention, the short film reproduction unit switches the video being reproduced to another video, every time the channel button is pressed down.

Furthermore, in the short film generation/reproduction apparatus according to the present invention, the short film reproduction unit reproduces a plurality of videos and outputs a plurality of RF signals all at once.

Moreover, the short film generation/reproduction apparatus according to the present invention may further comprise an operation unit operable to operate the short film generation/reproduction apparatus and a display device for displaying the video, the display device being connected to said short film generation/reproduction apparatus, wherein the short film reproduction unit modulates a signal obtained by reproducing the video into a video signal so as to output said video signal, and starts reproducing the video when a predetermined button is pressed down, the button being included in the operation unit and being assigned the video signal.

Also, in the short film generation/reproduction apparatus according to the present invention, the short film reproduction unit switches the video being reproduced to another video, every time the button is pressed down.

Furthermore, in the short film generation/reproduction apparatus according to the present invention, the short film generation/reproduction apparatus may be a home server.

Moreover, the short film generation/reproduction apparatus according to the present invention is a short film generation/reproduction apparatus for generating video using at least one still picture and reproducing said video, comprising: an operation unit operable to operate the short film generation/reproduction apparatus and a display device for displaying the video, the display device being connected to said short film generation/reproduction apparatus; and a short film reproduction unit operable to modulate a signal obtained by reproducing the video into an RF signal so as to output said RF signal, and start reproducing the video when a predetermined button is pressed down, the button being included in the operation unit and being assigned the RF signal.

Also, the short film generation/reproduction apparatus according to the present invention is a short film generation/reproduction apparatus for generating video using at least one still picture and reproducing said video, comprising: a database unit operable to store said at least one still picture, a picture feature indicating a feature of said at least one still picture, music, a musical feature indicating a feature of said music, and an effect specifying what kind of visual effect is used to reproduce said at least one still picture which is a target of said effect; a selection unit operable to select either of the following elements to be used when generating the video: said at least one still picture; and the music; a feature reading unit operable to read out, from the database unit, the feature corresponding to the element selected by the selection unit, the feature being either the picture feature or the musical feature; a feature conversion unit operable to convert the feature read out by the feature reading unit into the other feature; a determination unit operable to determine the other element, based on said other feature converted by the feature conversion unit; a style generation unit operable to determine a predetermined number of effects and a parameter used to generate the video, and generate a style indicating an outline of the video to be generated, based on the element selected by the selection unit and the other element determined by the determination unit; and a scenario generation unit operable to generate a scenario of the video, based on the element selected by the selection unit and the other element determined by the determination unit, and the style generated by the style generation unit.

Accordingly, since it becomes possible to generate a scenario as well as video by just selecting either still pictures and music to be used to generate video, it is not necessary for the user to select all of still pictures, music and a style as required in an existing technique. Moreover, it is also possible to determine an optimum style for generating the video.

Furthermore, the short film generation/reproduction apparatus according to the present invention is a short film generation/reproduction apparatus for generating video using at least one still picture and reproducing said video, comprising: a still picture obtainment unit operable to obtain a still picture; a database unit operable to store said still picture; and an object information extraction unit operable to extract, from the still picture obtained by the still picture obtainment unit, an object included in said still picture, and store, in the database unit, object information including a position of said extracted object.

What is more, in order to achieve the third object, the short film generation/reproduction apparatus according to the present invention is a short film generation/reproduction apparatus for generating video using at least one still picture and reproducing said video, comprising: an input unit operable to obtain a still picture inputted from outside; a database unit operable to store said at least one still picture, a style including (i) a predetermined number of effects specifying what kind of visual effect is used to reproduce said at least one still picture which is a target of each of the predetermined number of effects, the predetermined number of effects being selected from a group of effects and (ii) a parameter, and music used for the video to be generated, and a scenario generation unit operable to generate a scenario of the video, based on a predetermined feature of the style and a predetermined feature of the music, wherein the input unit includes an object information extraction unit operable to extract an object included in a still picture every time a still picture is inputted from outside and store, in the database unit, object information including a position of the extracted object, the scenario generation unit includes: an effect arrangement unit operable to select effects one by one from among a group of effects stored in the database unit, and arrange said selected effects one by one in a time domain; a still picture assignment unit operable to assign a still picture to each of the effects arranged in the time domain by the effect arrangement unit based on the object information stored in the database unit, the still picture satisfying a picture feature required by the respective effects; and a parameter setting unit operable to generate the scenario by describing a parameter indicating processing to be performed on the object suitable for each of the effects arranged in the time domain by the effect arrangement unit, and store said generated scenario in the database unit.

By determining parameters which determine the operation of an effect based on the object information of a still picture, it is possible to circumvent the situation in which an object is subject to partitioning, and to generate and reproduce a short film with an increased degree of entertainment that focuses on the object.

Furthermore, in the short film generation/reproduction apparatus according to the present invention, the picture feature required by each of the effects is a feature of the object.

Accordingly, it becomes easy to determine parameters for determining the operation of an effect based on the object information of a still picture.

Moreover, in the short film generation/reproduction apparatus according to the present invention, the feature of the object is at least one of a type of the object, a color of the object, a shape of the object, and the number of objects.

Accordingly, it becomes easy to determine parameters for determining the operation of an effect based on the object information of a still picture, that is, at least any one of the type, color, shape of the object and the number of objects.

Also, in the short film generation/reproduction apparatus according to the present invention, the input unit further includes a feature point extraction unit operable to extract, from the object, a feature point indicating a characteristic part of the object, and the parameter setting unit generates the scenario by describing a parameter indicating processing to be performed on a position where the feature point of the object is located.

Accordingly, it is possible to generate a short film with an increased degree of entertainment that focuses on a feature point of the object, and to reproduce such generated short film.

What is more, in order to achieve the fourth object, in the short film generation/reproduction apparatus according to the present invention, the database unit further stores face information for individual authentication used to identify a face of an individual, the input unit further includes a face authentication unit operable to authenticate a name of the object using the face information and store said authenticated name of the object in the object information, when the object extracted by the object information extraction unit is a person's face, and the parameter setting unit generates the scenario by describing a parameter indicating processing to be performed on the object specified by said authenticated name.

By recognizing the name of an object and reflecting such recognition on a visual effect, it is possible to generate and reproduce a short film with the focus on a specific object.

Moreover, the short film generation/reproduction apparatus according to the present invention may further comprise an individual information storage unit operable to store individual information in which a name of an individual and an attribute of said individual are associated with each other, wherein the input unit further includes an individual information search unit operable to search, from the individual information, for the attribute of the individual corresponding to the name of the object authenticated by the face authentication unit, and store said individual attribute obtained by the search in the object information, and the parameter setting unit generates the scenario by describing a parameter indicating processing to be performed on the object specified by said individual attribute.

Accordingly, it is possible to generate and reproduce a short film in which a visual effect that operates on an object specified by the attribute of the individual is used.

Also, the short film generation/reproduction system according to the present invention is a short film generation/reproduction system, comprising: a short film generation/reproduction apparatus for generating video using at least one still picture and reproducing said video; and a short film reproduction apparatus which is connected to said short film generation/reproduction apparatus via a network, wherein the short film generation/reproduction apparatus includes: a database unit operable to store said at least one still picture, a picture feature indicating a feature of said at least one still picture, a style indicating an outline of the video to be generated, a style feature indicating a feature of said style, music, and a musical feature indicating a feature of said music; a selection unit operable to select one of the following elements to be used when generating the video: said at least one still picture; the music; and the style; a feature reading unit operable to read out, from the database unit, the feature corresponding to the element selected by the selection unit, the feature being one of the picture feature, the musical feature, and the style feature; a feature conversion unit operable to convert the feature read out by the feature reading unit into the other features; a determination unit operable to determine the elements to be used to generate the video other than the element selected by the selection unit, based on said other features converted by the feature conversion unit; a scenario generation unit operable to generate a scenario of the video, based on the element selected by the selection unit and the other elements determined by the determination unit; and a first communication unit operable to read out, from the database unit, the scenario of the video selected by the short film reproduction apparatus, and said at least one still picture and the music defined in said scenario, and send the readout scenario, at least one still picture and music to the short film reproduction apparatus via the network, and the short film reproduction apparatus includes: a short film selection unit operable to select the video to be reproduced; a second communication unit operable to communicate with the short film generation/reproduction apparatus via the network; a storage unit operable to temporarily store the scenario of the video, and said at least one still picture and the music defined in said scenario which are sent by the short film generation/reproduction apparatus; a short film reproduction unit operable to read out, from the storage unit, the scenario of the video selected by the short film selection unit, and said at least one still picture and the music defined in said scenario, and reproduce the video based on said scenario; and a display unit operable to display the video reproduced by the short film reproduction unit.

Accordingly, since it becomes easy for the user to carry only the short film reproduction apparatus with him/her, such user can play back the video at an outside location and the like.

Note that not only is it possible to embody the present invention as a short film generation/reproduction apparatus with the above configuration but also as a short film generation/reproduction method that includes, as its steps, characteristic units of such short film generation/reproduction apparatus, and as a program that causes a computer to execute these steps. It should be also understood that such program can be distributed via a recording medium such as a CD-ROM and via a transmission medium such as the Internet.

As is obvious from the above explanation, according to the short film generation/reproduction apparatus of the present invention, it is possible to select one of (i) still picture, (ii) music and (iii) style which are three materials required to generate a short film, and (iv) theme, and then to select other materials that match the first-selected material, so as to generate a short film. This saves the time which the user is required to spend to search the database that stores an enormous amount of information, allowing such user to make a short film easily and comfortably.

Furthermore, since the short film generation/reproduction apparatus according to the present invention is capable of generating a short film that reflects object information extracted from still pictures, it is possible to provide a visual effect with an increased degree of entertainment.

Therefore, the present invention is highly practical in that it enables the user to make a short film quite easily by the use of features of short film materials such as still pictures, music and style and in that it is capable of making a more efficient use of effects by extracting object information included in still pictures.

Furthermore, since the present invention is capable of allowing the user to play back the short film by just pressing a predetermined button, the user can watch the short film with ease, without being required to perform complicated operations.

Moreover, since it is possible to determine parameters that determine the operation of an effect based on the object information of a still picture, it is possible to circumvent the situation in which an object is subject to partitioning, and to generate and reproduce a short film with an increased degree of entertainment that focuses on the object.

What is more, according to the short film generation/reproduction apparatus of the present invention, since it is possible to generate a scenario by describing a parameter indicating processing to be performed on a position where a feature point of an object is located, it is possible to generate and reproduce a short film with an increased degree of entertainment that focuses on the feature point of such object.

Furthermore, according to the short film generation/reproduction apparatus of the present invention, since it is possible to generate a scenario by describing a parameter indicating processing to be performed on an object specified by its name, it is possible to generate and reproduce a short film that focuses on a specific object by recognizing the name of the object and reflecting such recognition on a visual effect.

Moreover, according to the short film generation/reproduction apparatus of the present invention, since it is possible to generate a scenario by describing a parameter indicating processing to be performed on an object specified by the attribute of an individual, it is possible to generate a short film in which a visual effect that operates on an object specified by the individual attribute is used and to reproduce such generated short film.

Accordingly, the present invention makes it possible for a wide rage of image processing to be performed with the focus on objects in still pictures, which allows the generation and reproduction of a short film with a high degree of entertainment. Therefore, the present invention is highly practical in the present age in which there is a widespread use of digital cameras.

For further information about the technical background to this application, Japanese Patent application No. 2002-341292 filed on Nov. 25, 2002 and Japanese Patent application No. 2003-167825 filed on Jun. 12, 2003 are incorporated herein by reference.

BRIEF DESCRIPTION OF THE DRAWINGS

These and other objects, advantages and features of the invention will become apparent from the following description thereof taken in conjunction with the accompanying drawings that illustrate a specific embodiment of the invention. In the Drawings:

FIG. 18 is a diagram showing an example configuration of object information stored in a database;

FIG. 19 is a diagram showing an example structure of an effect table;

FIG. 25 is a diagram showing an example structure of a scenario stored in the database;

FIGS. 27A~27G are storyboards showing montage as an example effect;

FIG. 28 is a diagram showing an example structure of an effect table;

FIG. 30 is a diagram showing an example structure of object information;

FIG. 32 is a diagram showing an example structure of a scenario stored in the database;

FIGS. 33A~33H are storyboards showing a variation of montage;

FIG. 36 is a diagram showing an example structure of an effect table;

FIG. 38 is an example structure of object information;

FIG. 40 is a diagram showing an example structure of a scenario stored in the database;

FIG. 45 is a diagram showing an example structure of an effect table;

FIG. 47 is a diagram showing an example structure of the object information stored in the database;

DESCRIPTION OF THE PREFERRED EMBODIMENTS

The following explains preferred embodiments according to the present invention with reference to the figures.

Figure 1:
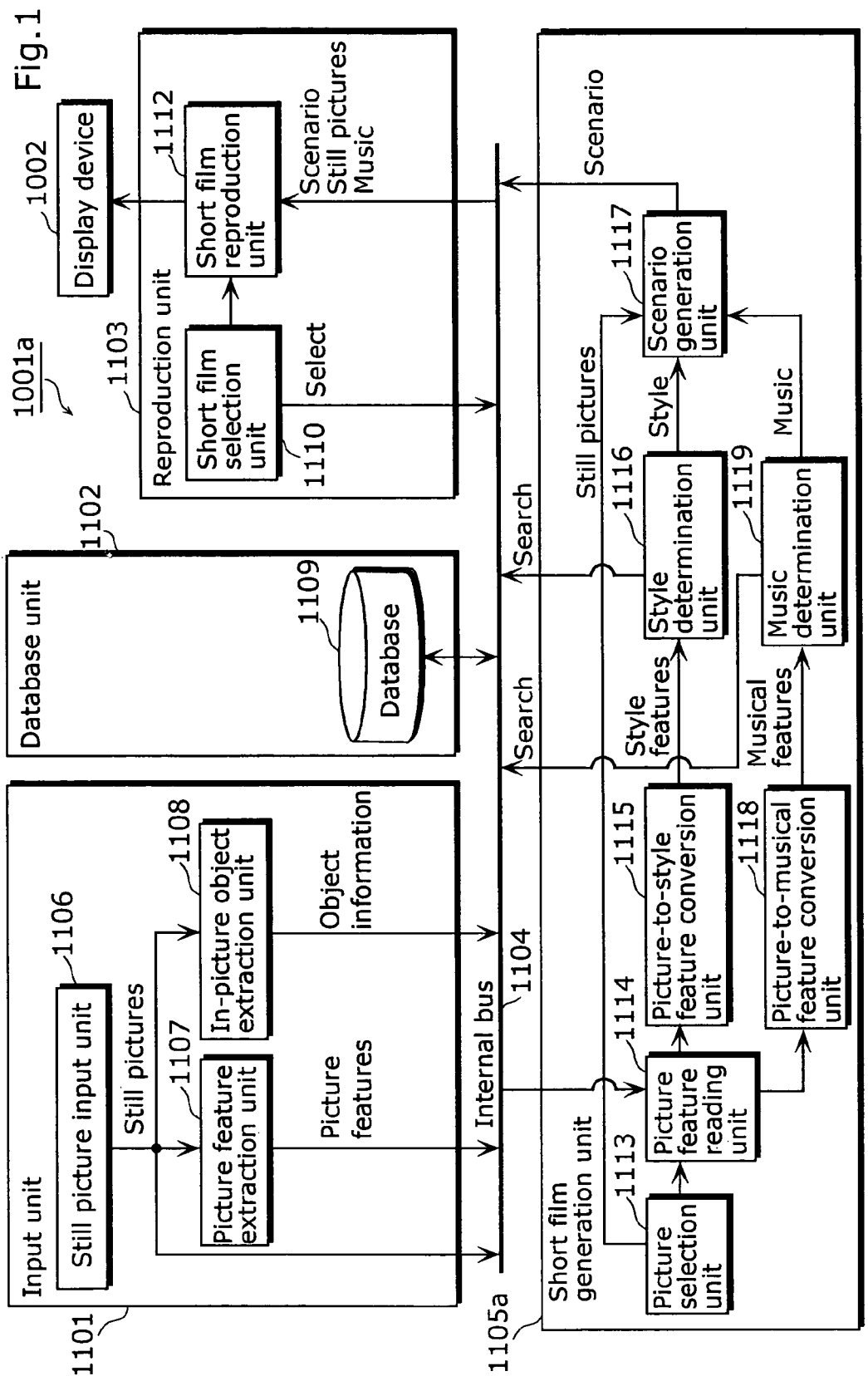
FIG. 1 is a block diagram showing a configuration of an embodiment of a short film generation/reproduction apparatus according to the present invention.

FIG. 1 is a functional block diagram showing the configuration of a short film generation/reproduction apparatus according to the first embodiment of the present invention.

A short film generation/reproduction apparatus 1001a is an apparatus for generating a short film using at least one input still picture and reproducing such short film. As shown in FIG. 1, such short film generation/reproduction apparatus 1001a is comprised of an input unit 1101, a database unit 1102, a reproduction unit 1103, an internal bus 1104, and a short film generation unit 1105a. Furthermore, a display device 1002 is connected to the reproduction unit 1103. The display device 1002, which is a device for displaying video (e.g. LCD and CRT), displays a reproduced short film.

A still picture includes picture data and meta-data indicating the attributes of such picture data. The most part of meta-data is data generated by a device such as a digital still camera. Typically, meta-data is data such as the date and time of photo shooting, location (position information detected by GPS), conditions (e.g. shutter speed, focal length and exposure time) (these information are collectively referred to also as "semantic information" hereinafter). The specification of the above data is established by the Japanese Electronic Industry Development Association (JEIDA) as Exchangeable Image File Format (EXIF).

The input unit 1101, which is intended for obtaining still pictures from a medium that stores still pictures, is made up of a still picture input unit 1106, a picture feature extraction unit 1107, and an in-picture object extraction unit 1108.

The database unit 1102, which includes at least one data storage device, stores still pictures, music and one or more predetermined styles, and is capable of searching for data in a database 1109.

The still picture input unit 1106 reads still pictures stored in the medium into the memory of the short film generation/reproduction apparatus 1001a (not illustrated in the diagram), and stores them in the database 1109. The medium here is, for example, a semiconductor memory medium (e.g. Compact Flash (R) memory card, SD memory card (R)), optical disc medium (e.g. CD-R/ROM/RW, DVD-R/RAM/RW), a magnetic medium (e.g. tape, flexible disk), and an optical magnetic disc (e.g. MO).

The picture feature extraction unit 1107 extracts picture features from the retrieved picture data. Picture feature here is an indicator of color shade, color spread, color position, brightness, brightness position, and the like. In order to extract these features, the picture feature extraction unit 1107 calculates a color histogram, a frequency histogram, and the like.

The in-picture object extraction unit 1108 extracts, from the input picture data, an object such as a person so as to generate object information. Here, the object information include (i) position information represented by the center coordinates of a circle which the extracted object is adjacent to and by the radius of such circle and (ii) the type of the object. An example of the object type is whether it is a person's face or not. In this case, it is possible to use individual information for identifying the object as the object type. Note that the position information of the object is not necessarily have to be represented by the center coordinates and radius of the circle, and therefore that it can also be represented by the starting and end coordinates on one of the diagonal lines of a square.

The short film generation unit 1105a is made up of a picture selection unit 1113, a picture feature reading unit 1114, a picture-to-style feature conversion unit 1115, a picture-to-musical feature conversion unit 1118, a style determination unit 1116, a music determination unit 1119, and a scenario generation unit 1117.

The picture selection unit 1113 provides the user with a GUI (Graphical User Interface) for selecting still pictures. The picture feature reading unit 1114 reads, from the database 1109, the features of the still pictures selected by the user through the picture selection unit 1113. The picture-to-style feature conversion unit 1115 converts the picture features read out by the picture feature reading unit 1114 into style features. The style determination unit 1116 searches the database 1109 to determine an optimum style based on the style features. Meanwhile, the picture-to-musical feature conversion unit 1118 converts the picture features read out by the picture feature reading unit 1114 into musical features. The music determination unit 1119 searches the database 1109 to determine an optimum piece of music based on the musical features. Subsequently, the scenario generation unit 1117 generates a scenario using the still pictures selected by the user, the style determined by the style determination unit 1116 and the music determined by the music determination unit 1119.

Figure 2:
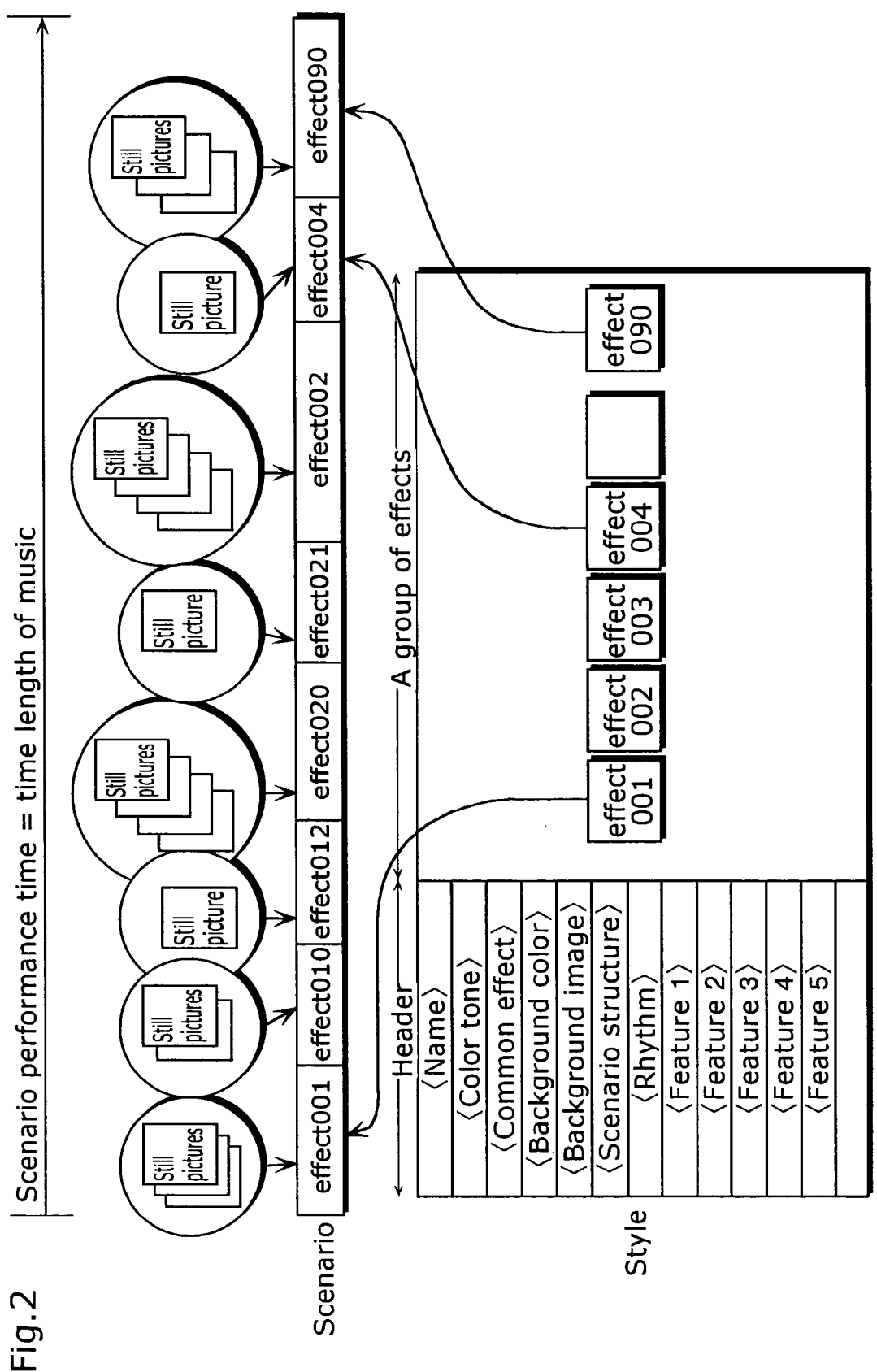
FIG. 2 is a conceptual diagram showing a relationship between a style and a scenario in the short film generation/reproduction apparatus.

FIG. 2 is a conceptual diagram showing the relationship between a style and a scenario.

The style constitutes a "header" that describes elements and attributes which are common throughout a short film to be generated and a collection of an arbitrary number of "effects" which are gathered under the same concept. An effect specifies which visual effect is used to reproduce one or more target still pictures, and describes a function for actually operating a visual effect as well as its attributes. At this stage, in a "group of effects" included in the style, the arrangement of effects in the time domain and pointers to target still pictures are not determined yet. The attributes include the speed attribute (e.g. "slow", "normal", and "first") and the arrangement attribute (e.g. "prologue", "body", "epilogue" and "anywhere"), and the like. A reference is made to these attributes when the arrangement order of effects in a scenario is determined as explained later.

The header includes "name", "color tone", "common effect", "scenario structure", "rhythm", and "style feature", and the like. Of these, "color tone" and "common effect" are common throughout the short film.

"Scenario structure" is an attribute about the arrangement of effects. When the scenario structure is <"prologue"—"body"—"epilogue">, for example, effects are arranged in order of 1) prologue, 2) body, and 3) epilogue on the basis of the respective arrangement attributes of the effects. "Rhythm" indicates a rate at which effects with the speed attribute of "fast" and "slow" should be arranged. For example, when "rhythm" is <2-1>, an effect with the speed attribute of "slow" shall be arranged after two effects with the speed attribute of "fast". "Style features" indicate five keywords of "intensiveness", "dynamism", "briskness", "simpleness", and "softness" respectively, each being represented by five levels.

Figure 3:
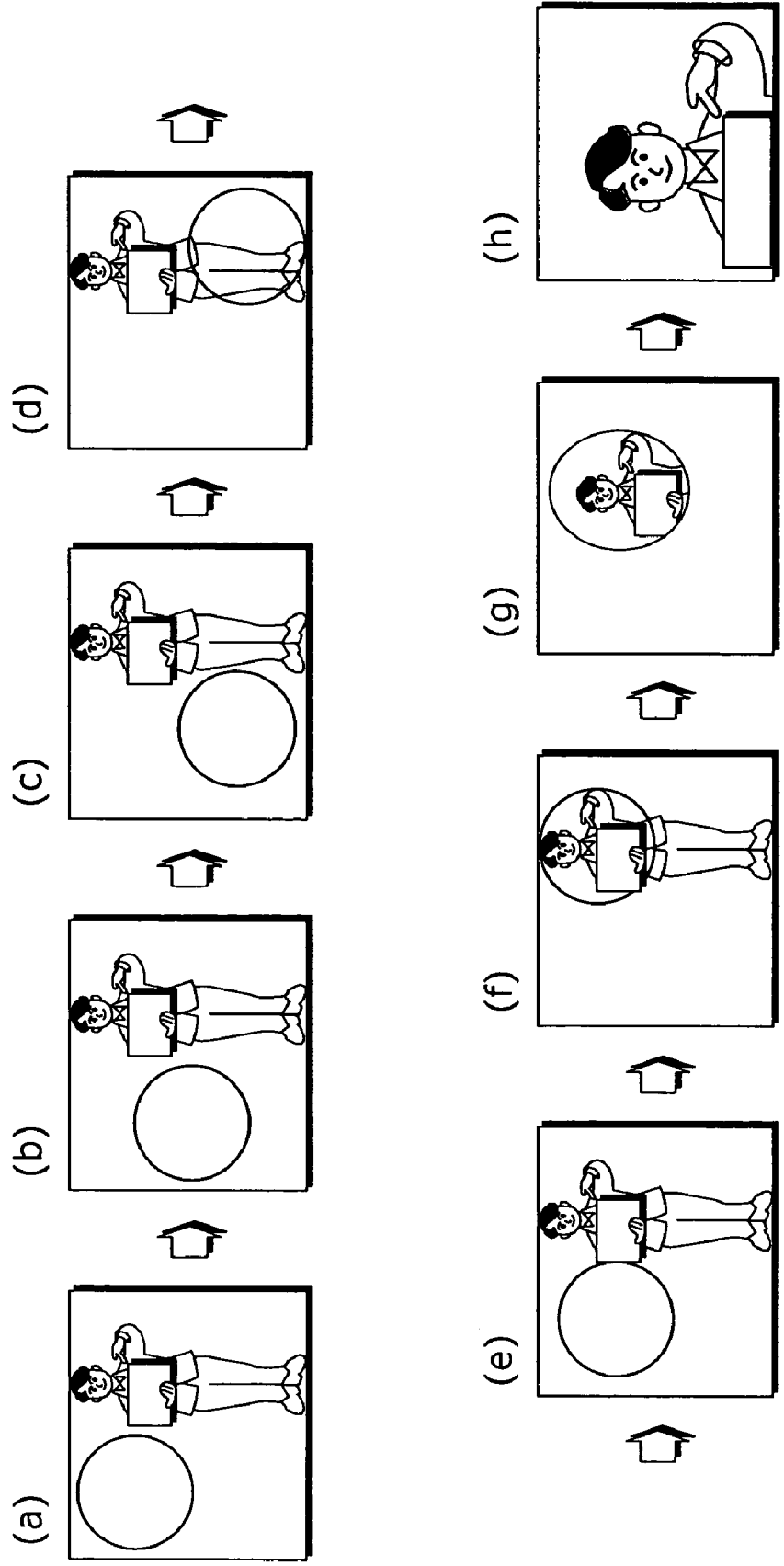
FIG. 3 is a diagram schematically showing, in the form of storyboards, an example effect in the short film generation/reproduction apparatus.

FIG. 3 is a diagram that schematically shows an example effect in the form of storyboards.

In this effect, as shown in (a)~(e) in FIG. 3, the spotlight is searching for the face of a person on a picture as an object. Next, as shown in (e) in FIG. 3, the spot light has found the face, on which the spotlight is then focused. Furthermore, as shown in (g) in FIG. 3, only the portion on which the spotlight is focused is cut out, with the other portion being eliminated. Finally, as shown in (h) in FIG. 3, the spotlighted portion is zoomed in and enlarged to fill the screen for display.

In the scenario, as shown in FIG. 2, effects which have been picked up from a "group of effects" according to the time length of music are arranged, and still pictures to be used for the respective effects are determined.

The reproduction unit 1103 is made up of a short film selection unit 1110 and a short film reproduction unit 1112.

The short film selection unit 1110 provides the user with a GUI for selecting a short film to be reproduced. The short film reproduction unit 1112 reads out, from the database 1109, the selected short film scenario as well as the still pictures and music defined in such scenario, decodes the scenario to reproduce the short film, and outputs the reproduced short film to the display device 1002.

The following explains the operation of the short film generation/reproduction apparatus 1001a with the above configuration when still pictures are inputted.

Figure 4:
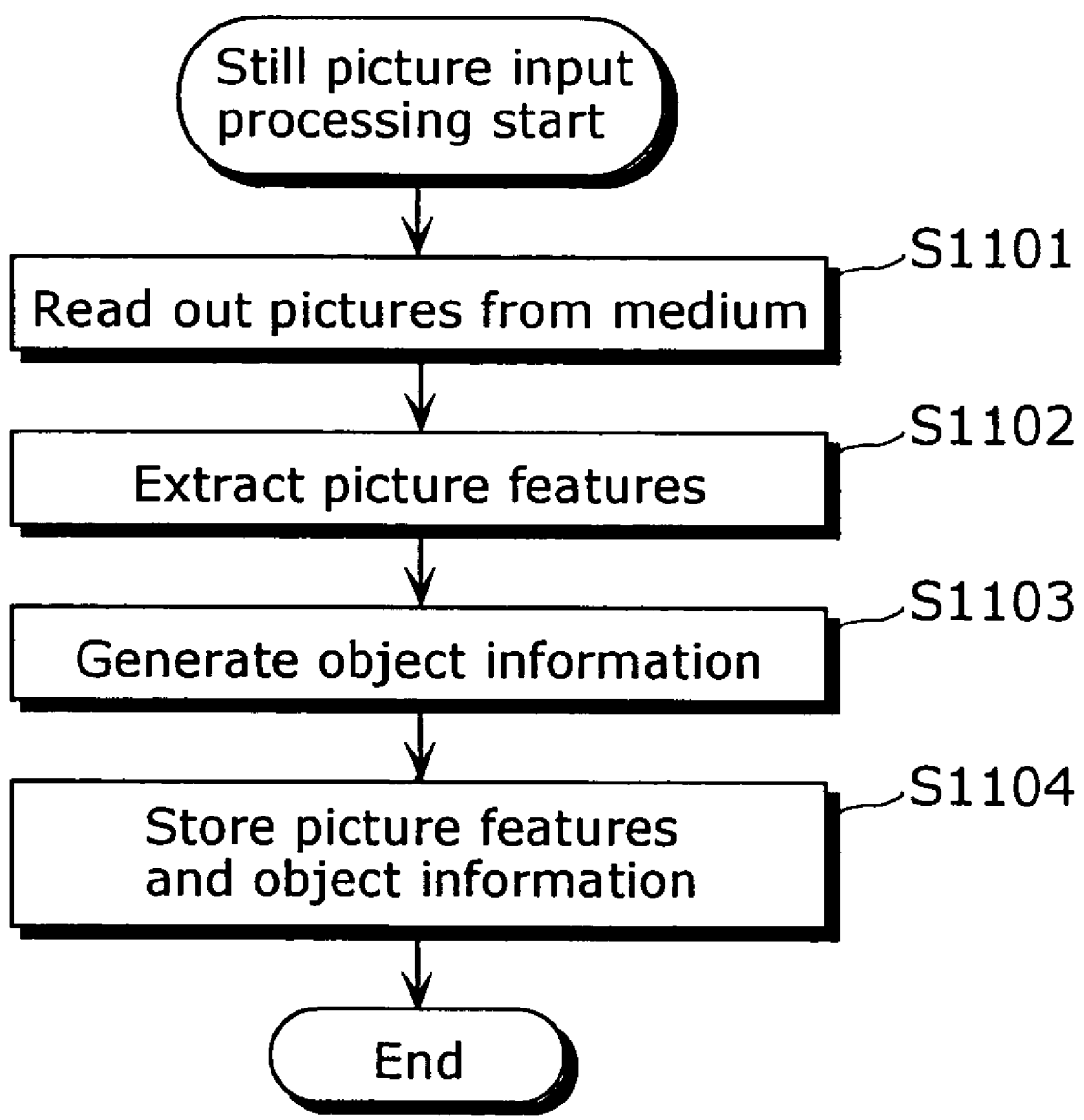
FIG. 4 is a flowchart showing an algorithm to be followed by an input unit in the short film generation/reproduction apparatus when inputting still pictures.

FIG. 4 is a flowchart showing the algorithm to be followed by the input unit 1101 when inputting the still pictures.

The still picture input unit 1106 reads still pictures stored in the medium into the memory of the short film generation/reproduction apparatus 1001a (S1101). Next, the picture feature extraction unit 1107 extracts the picture features of the readout picture data (S1102). Then, the in-picture object extraction unit 1108 extracts an object in a still picture, so as to generate object information (S1103).

Finally, the picture features extracted by the picture feature extraction unit 1107 and the object information generated by the in-picture object extraction unit 1108 are added to the meta-data included in the still picture, so as to be stored in the database 1109 together with the still picture data (S1104). Note that picture data may be stored in either a compression format represented by JPEG or a non-compression format.

Next, an explanation is given of the operation of the short film generation/reproduction apparatus 1001a when generating a scenario of a short film.

Figure 5:
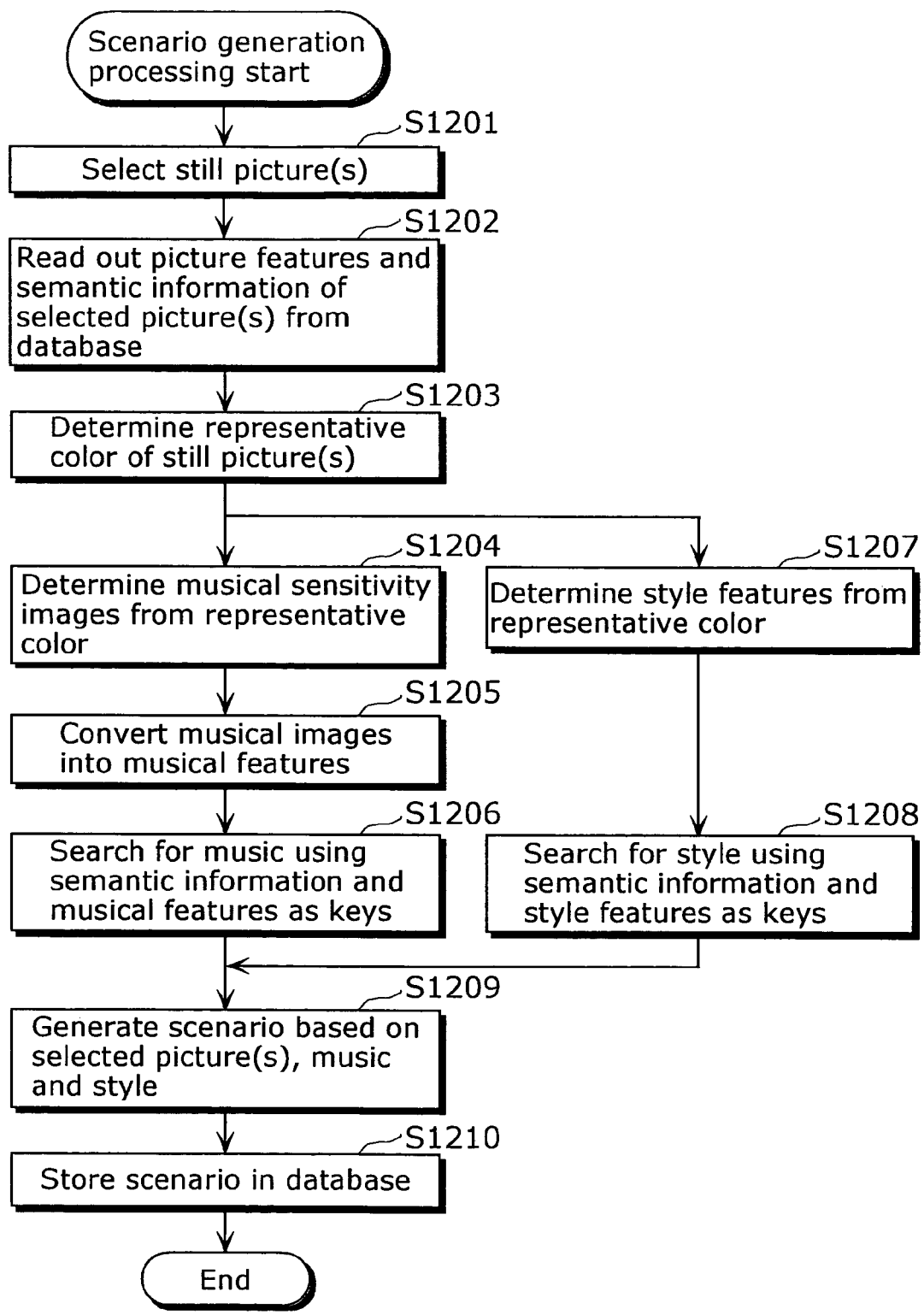
FIG. 5 is a flowchart showing an algorithm for generating a scenario in a short film generation unit in the short film generation/reproduction apparatus.

FIG. 5 is a flowchart showing the algorithm for generating the scenario in the short film generation unit 1105a.

First, the picture selection unit 1113 accepts, from the user, a selected range of still picture(s) (at least one picture) to be used in a generated short film (S1201). Still pictures used in the short film will be pictures within such selected range. The picture feature reading unit 1114 reads, from the database 1109, the picture features and semantic information of the selected still picture(s) (S1202).

Moreover, the picture feature reading unit 1114 determines a color occupying the most part of each still picture, based on the color histogram of the above-read out picture features. Then, the picture feature reading unit 1114 counts the number of the above determined colors in the respective still picture(s), and regards that the color which was counted for the largest number of times is a representative color of the still picture (s) (S1203).

Next, the picture-to-musical feature conversion unit 1118 converts the representative color determined by the picture feature reading unit 1114 into musical sensitivity images (S1204). Table 1 is a correspondence table showing an example correspondence between color sensitivity images and musical sensitivity images for colors. Here, musical sensitivity images are set in advance on the basis of the color sensitivity images for each color, and therefore a musical sensitivity image is determined depending on a representative color. Moreover, the respective musical sensitivity images indicate five keywords of "intensiveness", "dynamism", "briskness", "simpleness", and "softness", each keyword being represented by five levels.

TABLE 1

| Color | Color sensitivity image | Musical sensitivity image |
|---|---|---|
| Red | vital, energetic, passionate, exciting, delightful, vigorous, glamorous, gorgeous, dangerous, jealous, greedy, fight, revolution, stressful, pressure, frustration, | intensiveness (5), dynamism (5), briskness (1), simpleness (1), softness (1) |

TABLE 1-continued

| Color | Color sensitivity image | Musical sensitivity image |
|---|---|---|
| Orange | anger, rage, aggressive, impulsive, nervous, madness warm, cheerful, bright, open, enjoyable, merrily, jolly | intensiveness (2), dynamism (3), briskness (2), simpleness (1), softness (1) |
| White | victory, fresh, favorable, purity, innocent, goodness, truth, chilly, cautious, sense of failure, solitude | intensiveness (1), dynamism (1), briskness (3), simpleness (5), softness (5) |
| Black | defeat, devil, negative, ominous, fear, suppression, complex, despair | intensiveness (1), dynamism (1), briskness (1), simpleness (1), softness (1) |
| Pink | romantic, fairy tale-like, bright, happiness, tender, pretty, soft, sweet | intensiveness (1), dynamism (2), briskness (1), simpleness (3), softness (4) |
| Yellow | active, happy, bright, swinging, cheerful, curiosity, knowledge, quest, creative, openness, caution, danger, carelessness, anxiety | intensiveness (3), dynamism (4), briskness (4), simpleness (1), softness (2) |
| Green | comfort, relax, safety, peace, rest, equality, eternity, fair, consolation, dear, easiness, fresh, nature, healthy, invigorating, nutrition, affluent, youth, growth, immature | intensiveness (2), dynamism (2), briskness (3), simpleness (5), softness (3) |
| Blue | intelligence, rational, spirit, tranquility, peace, clean, nobleness, dignity, conscience, autonomous, success, safe, reliance, meditation, sincerity, conservative, cold, cool, fresh, hard, vastness, infinity, solitude, sorrow, apathy, despair, melancholy, loneliness, anxiety, immature, passive, introverted, obedient, cruel | intensiveness (2), dynamism (2), briskness (5), simpleness (2), softness (2) |
| Purple | elegant, mysterious, sacred, dignity, artistic, imagination, majesty, anxiety, solitude, emotionally instable, vanity | intensiveness (3), dynamism (2), briskness (2), simpleness (3), softness (2) |

Next, the picture-to-musical feature conversion unit 1118 converts musical sensitivity images into musical features, using a predetermined method (S1205). Table 2 is shows example musical features. In the first embodiment, the following eight elements are used as musical features: "tempo", "beat fluctuation", "fundamental beat", "beat intensity 1", "beat intensity 2", "beat intensity ratio", "average number of notes", and "degree of spectrum change".

TABLE 2

| Musical feature | Description |
|---|---|
| Tempo | Indicate song's speed |
| Beat flutuation | Ratio of sounds that do and do not contribute to beat formation, indicating the rhythmic fluctuation |
| Fundamental beat | The fundamental, underlying beat of the song that forms the rhythm; 8 beat, 16 beat, etc. |
| Beat intensity 1 | Indicates the beat level corresponding to 1/2 beat (about 8 musical notes) |
| Beat intensity 2 | Indicates the beat level corresponding to 1/4 beat (about 16 musical notes) |
| Beat intensity ratio | Ratio of beat intensities 1 and 2 |
| Average number of notes | Indicates the degree of rising notes |
| Degree of spectrum change | Measures the degree of spectrum change |

Next, the music determination unit 1119 obtains (i) the season of photo shooting from the date and time of photo shooting included in the semantic information read out by the picture feature reading unit 1114 and (ii) a rough idea of the location of photo shooting from the position of photo shooting read out by the picture feature reading unit 1114. "Rough idea of the location of photo shooting" indicates the place where the photo shooting was carried out (e.g. at the seaside, in the mountain, in the town, in a local region/city, and in Japan/overseas). Subsequently, the music determination unit 1119 makes a search in the database 1109 with the musical features as a key, and selects one piece of music, from among pieces of searched music, by taking into consideration the above-obtained season and location of photo shooting (S1206). For example, when a still picture was taken at the seaside in July, more up-tempo music is selected from among the pieces of music which have been narrowed down according to the musical features.

Meanwhile, the picture-to-style feature conversion unit 1115 converts the representative color determined by the picture feature reading unit 1114 into style features (S1207). Table 3 is a correspondence table showing an example correspondence between color sensitivity images and style features for colors. Here, style features are set in advance on the basis of the color sensitivity images for each color, as in the case of musical sensitivity images, and therefore style features are determined depending on a representative color.

TABLE 3

| Color | Color sensitivity image | Style features |
|---|---|---|
| Red | vital, energetic, passionate, exciting, delightful, vigorous, glamorous, gorgeous, dangerous, jealous, greedy, fight, revolution, stressful, pressure, frustration, anger, rage, aggressive, impulsive, nervous, madness | Cool (modern . . . retro) 3 Dynamism (dynamic . . . static) 5 Speed (quick . . . slow) 4 Motion (linear . . . round) 4 |
| Orange | warm, cheerful, bright, open, enjoyable, merrily, jolly | Cool (modern . . . retro) 3 Dynamism (dynamic . . . static) 4 Speed (quick . . . slow) 2 Motion (linear . . . round) 3 |
| White | victory, fresh, favorable, purity, innocent, goodness, truth, chilly, cautious, sense of failure, solitude | Cool (modern . . . retro) 4 Dynamism (dynamic . . . static) 2 Speed (quick . . . slow) 2 Motion (linear . . . round) 4 |
| Black | defeat, devil, negative, ominous, fear, suppression, complex, despair | Cool (modern . . . retro) 3 Dynamism (dynamic . . . static) 3 Speed (quick . . . slow) 1 Motion (linear . . . round) 3 |
| Pink | romantic, fairy tale-like, bright, happiness, tender, cute, soft, sweet | Cool (modern . . . retro) 3 Dynamism (dynamic . . . static) 2 Speed (quick . . . slow) 1 Motion (linear . . . round) 1 |
| Yellow | active, happy, bright, swinging, cheerful, curiosity, knowledge, quest, creative, openness, caution, danger, carelessness, anxiety | Cool (modern . . . retro) 5 Dynamism (dynamic . . . static) 5 Speed (quick . . . slow) 5 Motion (linear . . . round) 5 |
| Green | comfort, relax, safety, peace, rest, equality, eternity, fair, consolation, dear, easiness, fresh, nature, healthy, invigorating, nutrition, affluent, youth, growth, immature | Cool (modern . . . retro) 3 Dynamism (dynamic . . . static) 1 Speed (quick . . . slow) 1 Motion (linear . . . round) 1 |
| Blue | intelligence, rational, spirit, tranquility, peace, clean, | Cool (modern . . . retro) 5 Dynamism (dynamic . . . static) 3 |

TABLE 3-continued

| Color | Color sensitivity image | Style features |
|---|---|---|
| | nobleness, dignity, conscience, autonomous, success, safe, reliance, meditation, sincerity, conservative, cold, cool, fresh, hard, vastness, infinity, solitude, sorrow, apathy, despair, melancholy, loneliness, anxiety, immature, passive, introverted, obedient, cruel | Speed (quick . . . slow) 1 Motion (linear . . . round) 5 |
| Purple | elegant, mysterious, sacred, dignity, artistic, imagination, majesty, anxiety, solitude, emotionally instable, vanity | Cool (modern . . . retro) 5 Dynamism (dynamic . . . static) 3 Speed (quick . . . slow) 3 Motion (linear . . . round) 3 |

Next, the style determination unit 1116 makes a search in the database 1109 with the style features and semantic information as keys, and selects a style (S1208).

The scenario generation unit 1117 generates a scenario using the still pictures, music and style determined in the above manner (S1209).

The following gives a detailed explanation of scenario generation performed by the scenario generation unit 1117.

Figure 6:
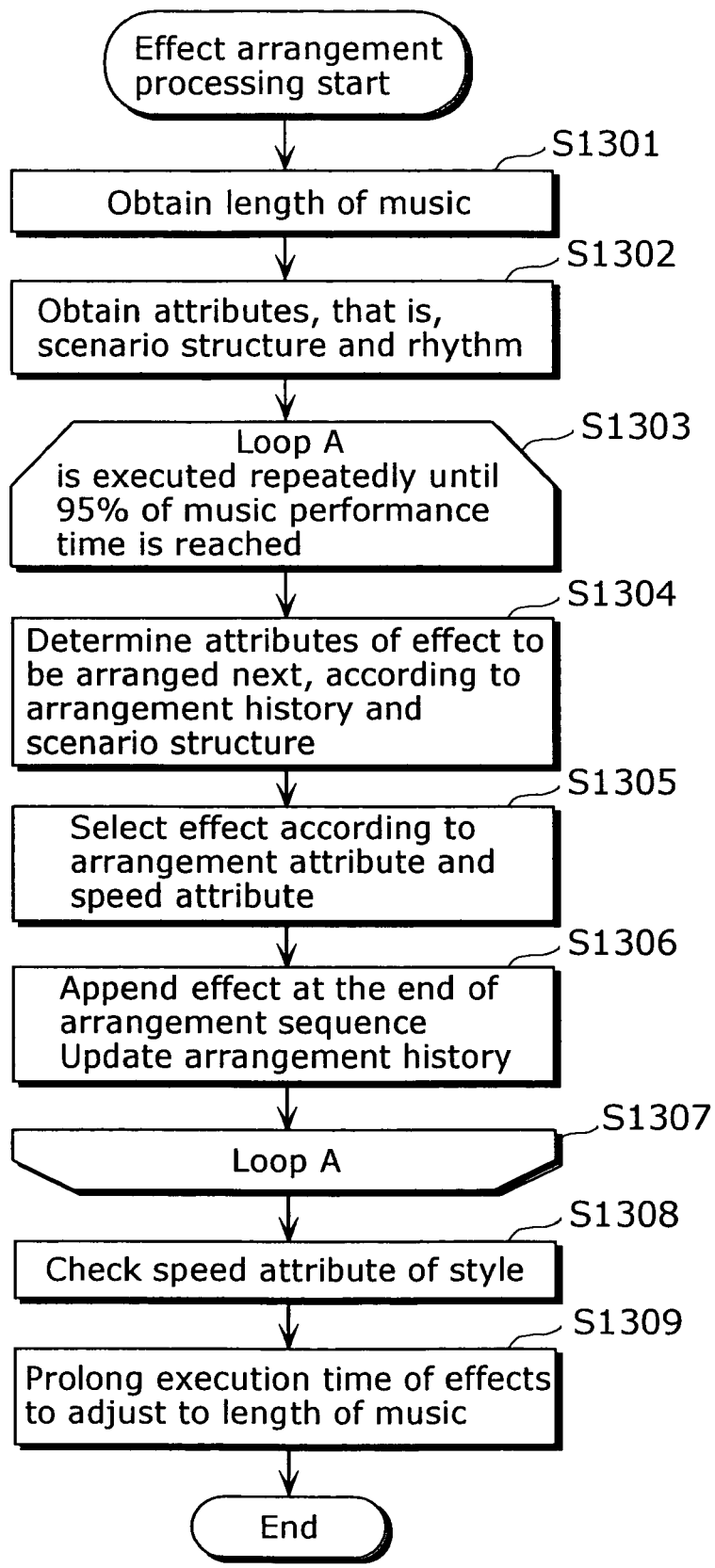
FIG. 6 is a flowchart showing an algorithm for determining how effects are arranged in the short film generation/reproduction apparatus.

FIG. 6 is a flowchart showing the algorithm for determining how effects are arranged.

First, the scenario generation unit 1117 reads out the music serving as BGM determined by the music determination unit 1119, and obtains its time length (S1301). Then the scenario generation unit 1117 reads out the style determined by the style determination unit 1116, and obtains the scenario structure and rhythm which are attributes of such style (S1302).

On the obtainment of the scenario structure and rhythm, the scenario generation unit 1117 repeats the below processing until it reaches beyond 95% of the music time length (S1303). Note that, in the first embodiment, effect arrangement is carried out until the scenario generation unit 1117 reaches beyond 95% of the time length of the music, but another numeric value may be employed instead of 95%.

The scenario generation unit 1117 determines the arrangement attribute of an effect to be placed next, on the basis of the scenario structure and the arrangement history (S1304). For example, when the scenario structure is <"prologue"—"body"—"epilogue">, effects in the range of 0~30% of the music with respect to its beginning are effects whose arrangement attribute is "prologue" or "anywhere". Effects in the range of 30~80% of the music are effects whose arrangement attribute is "body" or "anywhere". And, effects in the range of 80~100% of the music are effects whose arrangement attribute is "epilogue" or "anywhere".

Subsequently, the scenario generation unit 1117 obtains the rate of speed attributes "slow":"fast" of the effects which have already been arranged, with reference to the arrangement history. The scenario generation unit 1117 determines the speed attribute of an effect to be arranged next, on the basis of such speed attribute and a rate indicating a rhythm (S1304). For example, when the rhythm is <3-1>, weighting is performed at the time of effect selection so that a rate of the speed attribute of the effect "slow": "fast" becomes 3:1, and four or more effects with the speed attribute of "slow" shall not be arranged in a row.

Then, the scenario generation unit 1117 selects an effect to be arranged from among a "group of effects" included in the style, according to the logical AND of the above determined arrangement attribute and speed attribute (S1305). Then the scenario generation unit 1117 appends such determined effect to the sequence of the effect arrangement in the scenario and updates the arrangement history (S1306).

After carrying out effect arrangement until it reaches beyond 95% of the music time length in the processing for determining arrangement attributes and speed attributes of effects and the processing for determining which effect to be placed (S1307), the scenario generation unit 1117 reads out the speed attribute of the style, and determines effects which require a time adjustment (S1308). For example, when the motion attribute of the style is "slow", the execution time of all effects in the arrangement shall be prolonged. When the motion attribute of the style is "normal", the execution time of effects with the speed attribute of "slow" or "normal" shall be prolonged. And, when the motion attribute of the style is "fast", the execution time of effects with the speed attribute of "slow" shall be prolonged.

Figure 7:
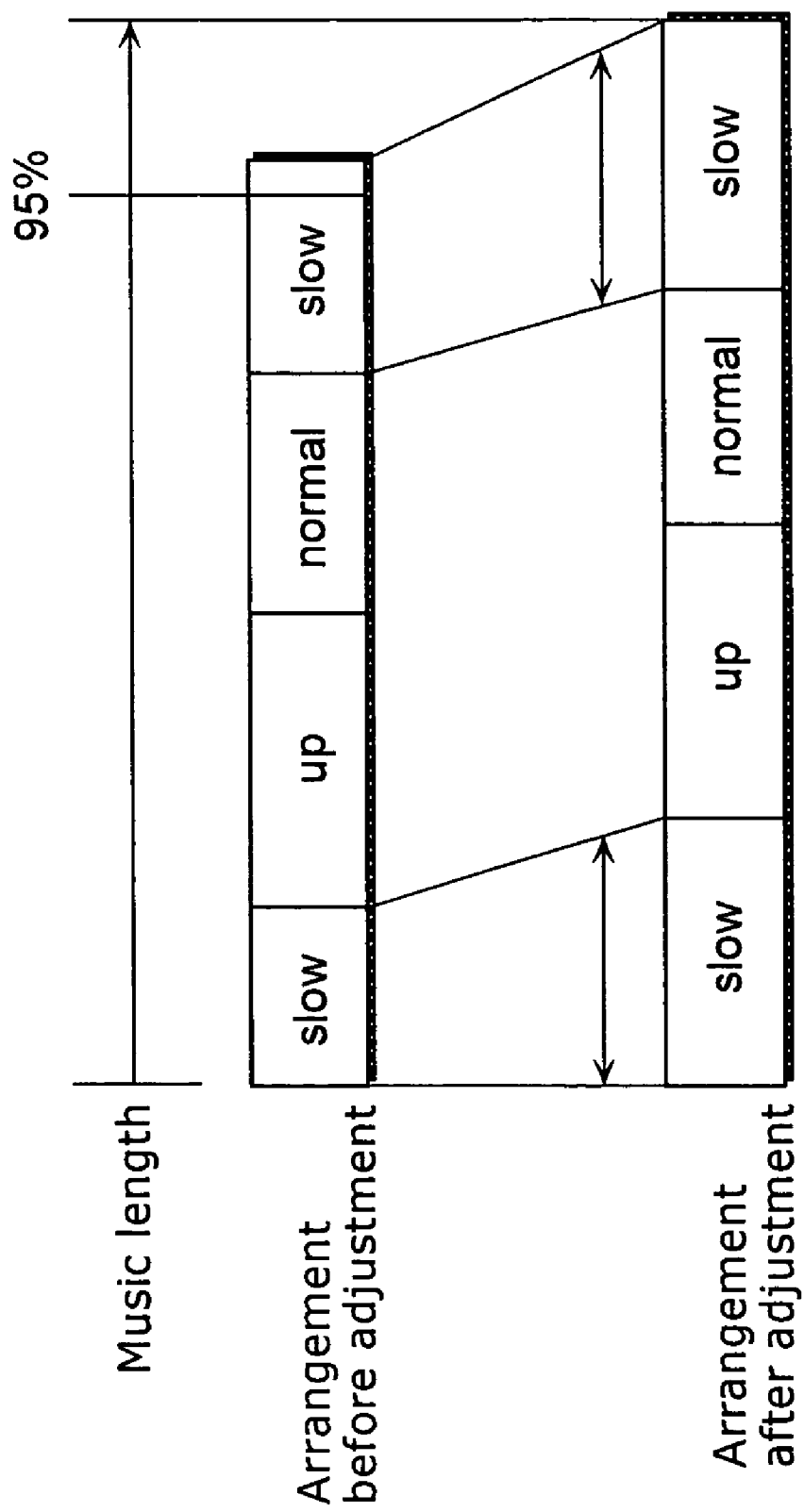
FIG. 7 is a conceptual diagram showing an arrangement of effects with respect to a length of music before and after a time adjustment is made in the short film generation unit in the short film generation/reproduction apparatus.

FIG. 7 is a conceptual diagram showing the arrangement of effects with respect to the length of music before and after a time adjustment is made, in the case where the speed attribute of the style is "fast".

The scenario generation unit 1117 prolongs the execution time of effects which have been determined to be targets of time adjustments (S1309). Accordingly, effects have been arranged in accordance with the time length of the music.

Next, the scenario generation unit 1117 searches the database 1109 to select still pictures with picture features defined in the respective effects. In this manner, the scenario generation unit 1117 associates each effect with still pictures, so as to describe a relationship among the still pictures, music, and style as a scenario.

The scenario generation unit 1117 generates the scenario in the above manner (Step S1209 in FIG. 5). Finally, the scenario generation unit 1117 stores such generated scenario in the database 1109 (S1210).

Next, an explanation is given of the operation when the short film generated in the above manner is reproduced.

The short film selection unit 1110 of the reproduction unit 1103 obtains a list of short films stored in the database unit 1102, and displays it to the user. When the user selects a short film s/he wishes to watch, the short film selection unit 1110 gives an instruction to read out the scenario of the selected short film as well as the music and still pictures defined in such scenario. Then, the short film reproduction unit 1112 decodes the scenario read out from the database 1109, reproduces the short film using the readout music and still pictures, and outputs such reproduced short film to the display device 1002.

As explained above, since music as BGM and a style which are optimum for still pictures selected by the user are determined according to picture features extracted from such still pictures so as to generate a short film, it is possible to save the user of the trouble of selecting an optimum piece of music from among an enormous pieces of music as well as an optimum style from a plurality of styles when making a short film. Furthermore, since the user is just required to select still pictures to make a short film in accordance with such still pictures, the present invention contributes to the construction of an environment in which the user can make a short film comfortably.

Moreover, by arranging effects in the above described manner, it is possible to give the feel of a story to a short film to be generated. For example, when the user makes a short film using still pictures taken at the time of a family vacation, the prologue is applied with an effect that enables the user to see an overall view of the short film by the use of two or more still pictures. The body is applied with an effect that enables the user to see each still picture at a slow pace, and the epilogue is applied with an effect that is capable of making an efficient utilization of a family photo. This gives dynamism as well as the feel of a story to the short film.

Furthermore, being capable of arranging effects in consideration of a balance between the number of slow effects and up-tempo effects, it is possible for the short film generation/reproduction apparatus according to the present embodiment to generate a short film which will not bore the user.

In the first embodiment, picture features of a still picture are converted into musical features and into style features on the basis of the color sensitivity images of the representative color of the still picture, by focusing only on the color histogram. However, picture features do not have to be converted into musical features and into style features by focusing only on the color histogram, but by focusing on spatial frequencies, the number of objects, and other features. Also, a combination of such features may also be used when converting picture features into musical features and into style features. Furthermore, musical features and style features are not necessarily have to be determined by a counting method as described above, and therefore it is also possible that such conversions are performed by using, as a representative picture, a characteristic still picture which is extracted from among selected still pictures.

Also, in the first embodiment, how effects are arranged is determined on the basis of the scenario structure and rhythm which are style attributes, but the present invention is not limited to this. Therefore, it is also possible to select an effect capable of showing still pictures one by one at a slow pace for a slow part in a short film, while selecting an effect capable of dynamic representation of more than one still picture for an up-tempo part, on the basis of the tempo as a musical feature.

Second Embodiment

Next, an explanation is given of the case where the user selects music and a short film that matches the image of such selected music is generated.

Figure 8:
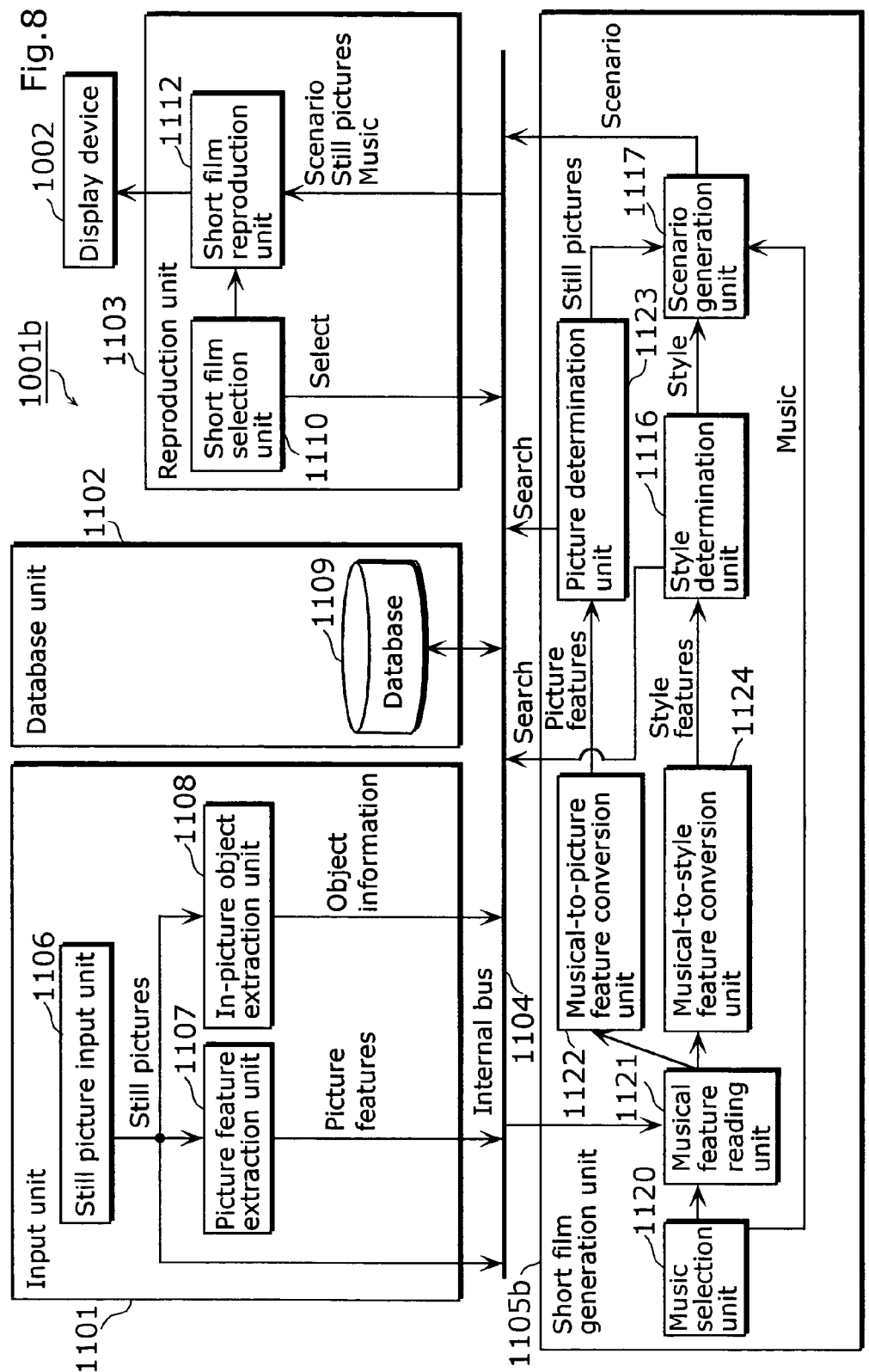
FIG. 8 is a block diagram showing a configuration of another embodiment of the short film generation/reproduction apparatus according to the present invention.

FIG. 8 is a block diagram showing another configuration of the short film generation/reproduction apparatus according to the second embodiment of the present invention. Note that components corresponding to those in the short film generation/reproduction apparatus 1001a in the first embodiment are assigned the same numbers, and explanations thereof are omitted.

In a short film generation/reproduction apparatus 1001b shown in FIG. 8, the configuration of a short film generation unit 1105b is different from that of the short film generation unit 1105a according to the first embodiment that generates, using pictures, a short film matching the image of such pictures, but other configuration of the short film generation/reproduction apparatus 1001b is the same as that of the short film generation/reproduction apparatus 1001a.

The short film generation unit 1105b is intended for generating a short film that matches the image of music selected by the user, and is made up of a music selection unit 1120, a musical feature reading unit 1121, a musical-to-picture feature conversion unit 1122, a musical-to-style feature conversion unit 1124, and a picture determination unit 1123, in addition to the style determination unit 1116 and the scenario generation unit 1117 which are described above.

The music selection unit 1120 provides the user with a GUI for selecting music. The musical feature reading unit 1121 reads, from the database 1109, the features of the music selected by the user. The musical-to-picture feature conversion unit 1122 converts the musical features read out by the musical feature reading unit 1121 into picture features. The picture determination unit 1123 searches the database 1109 to determine optimum still pictures based on the picture features. Meanwhile, the musical-to-style feature conversion unit 1124 converts the musical features read out by the musical feature reading unit 1121 into style features. The style determination unit 1116 searches the database 1109 to determine an optimum style based on the style features. Subsequently, the scenario generation unit 1117 generates a scenario using the music selected by the user, the still pictures determined by the picture determination unit 1123, and the style determined by the style determination unit 1116.

Next, an explanation is given of the operation of the short film generation unit 1105b with the above configuration, when generating a scenario of a short film.

Figure 9:
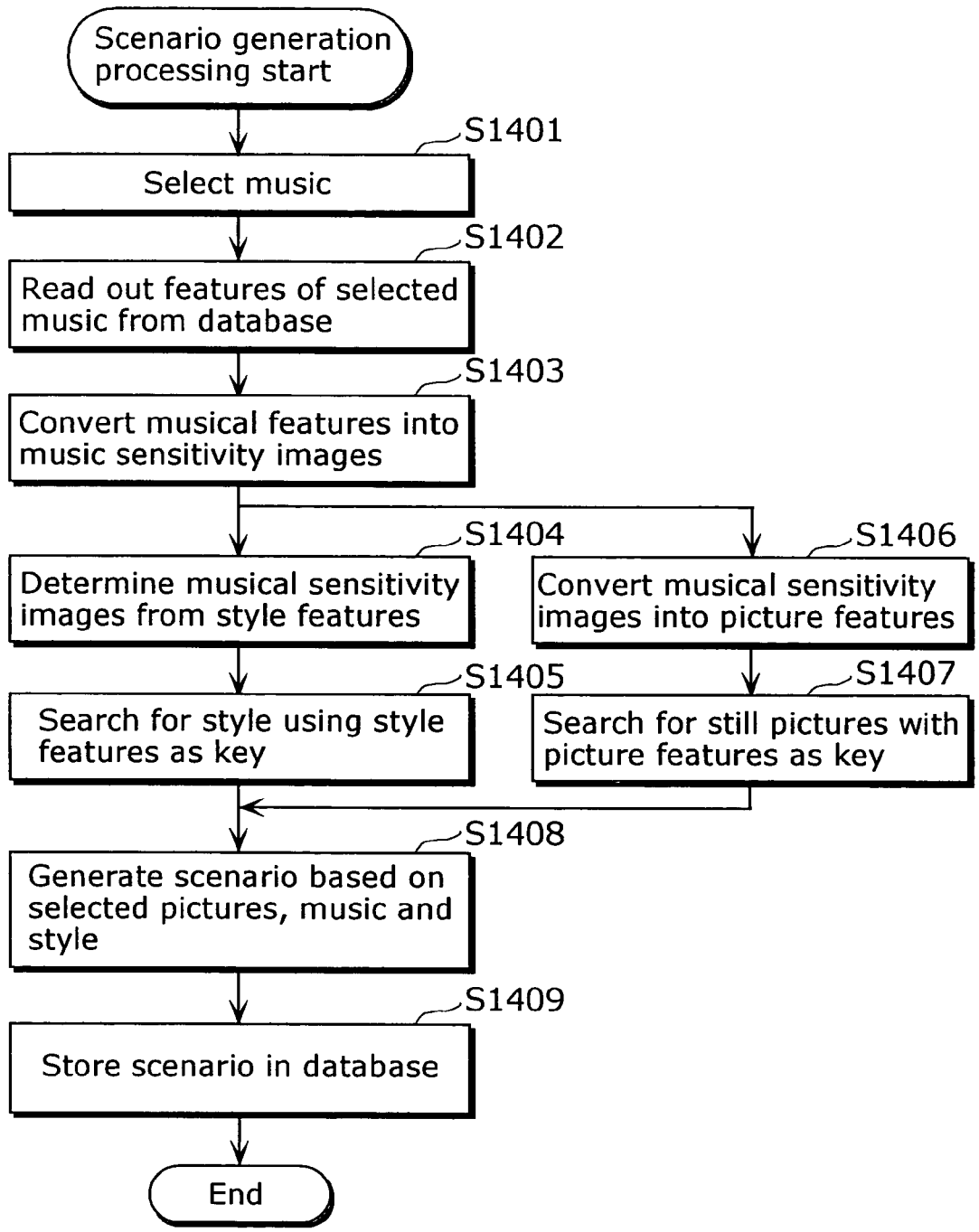
FIG. 9 is a flowchart showing an algorithm for generating a scenario in the short film generation unit in the short film generation/reproduction apparatus.

FIG. 9 is a flowchart showing the algorithm for generating the scenario in the short film generation unit 1105b.

First, the user selects, through the music selection unit 1120, music (music 1) that s/he wishes to use as BGM of a short film to be generated (S1401). The musical feature reading unit 1121 reads, from the database 1109, the musical features of the music 1 (S1402). Note that, in the second embodiment, although musical features are read out from the database 1109, it is also possible that the musical feature reading unit 1121 may have the capability of extracting musical features so as to extract the musical features directly from the selected music. Next, the musical feature reading unit 1121 converts the readout musical features into musical sensitivity images (S1403).

The musical-to-style feature conversion unit 1124 uses the above musical sensitivity images as style features as they are (S1404). This is because both musical sensitivity images and style features indicate five keywords of "intensiveness", "dynamism", "briskness", "simpleness", and "softness" with each keyword being represented by five levels. Subsequently, the style determination unit 1116 makes a search in the database 1109 with the style features (=musical sensitivity images) as a key, so as to determine a style (S1405).

Meanwhile, the musical-to-picture feature conversion unit 1122 converts the above musical sensitivity images into picture features (S1406). Then, the picture determination unit 1123 searches still pictures stored in the database 1109 with the picture features as a key, so as to determine a predetermined number of still pictures (S1407).

The scenario generation unit 1117 generates a scenario using the still pictures, music and style determined in the above manner, as in the case of the first embodiment (S1408). Finally, the scenario generation unit 1117 stores the generated scenario in the database 1109 (S1409).

As described above, since the short film generation/reproduction unit 1101b according to the second embodiment determines, on the basis of the musical features of music selected by the user, a style and still pictures which are best suited to such selected music, so as to generate a short film, it is possible to save the user of the trouble of selecting optimum still pictures from among an enormous amount of picture data as well as an optimum style from a plurality of styles when making a short film. Furthermore, since it is possible for the user to make a short film in accordance with music s/he desires by just selecting music to be used as BGM, the present invention contributes to the construction of an environment in which the user can make a short film comfortably. Also, since a short film is generated by just selecting music as described above, the present invention is effective, for example, for generating BGVs for karaoke.

Note that, in the second embodiment, the picture determination unit 1123 searches for still pictures stored in the database 1109 with picture features as a key, but the present invention is not limited to this. Therefore, it is also possible that music stored in the database 1109 incorporates semantic information, so as to allow the picture determination unit 1123 to search for still pictures stored in the database 1109 according to such semantic information and picture features, for example. In this case, when the semantic information of the music indicates "summer", for example, a search can be made with the date and time of photo shooting being limited from July to September.

Third Embodiment

Next, an explanation is given of the case where the user selects a style and a short film that matches the image of such style is generated.

Figure 10:
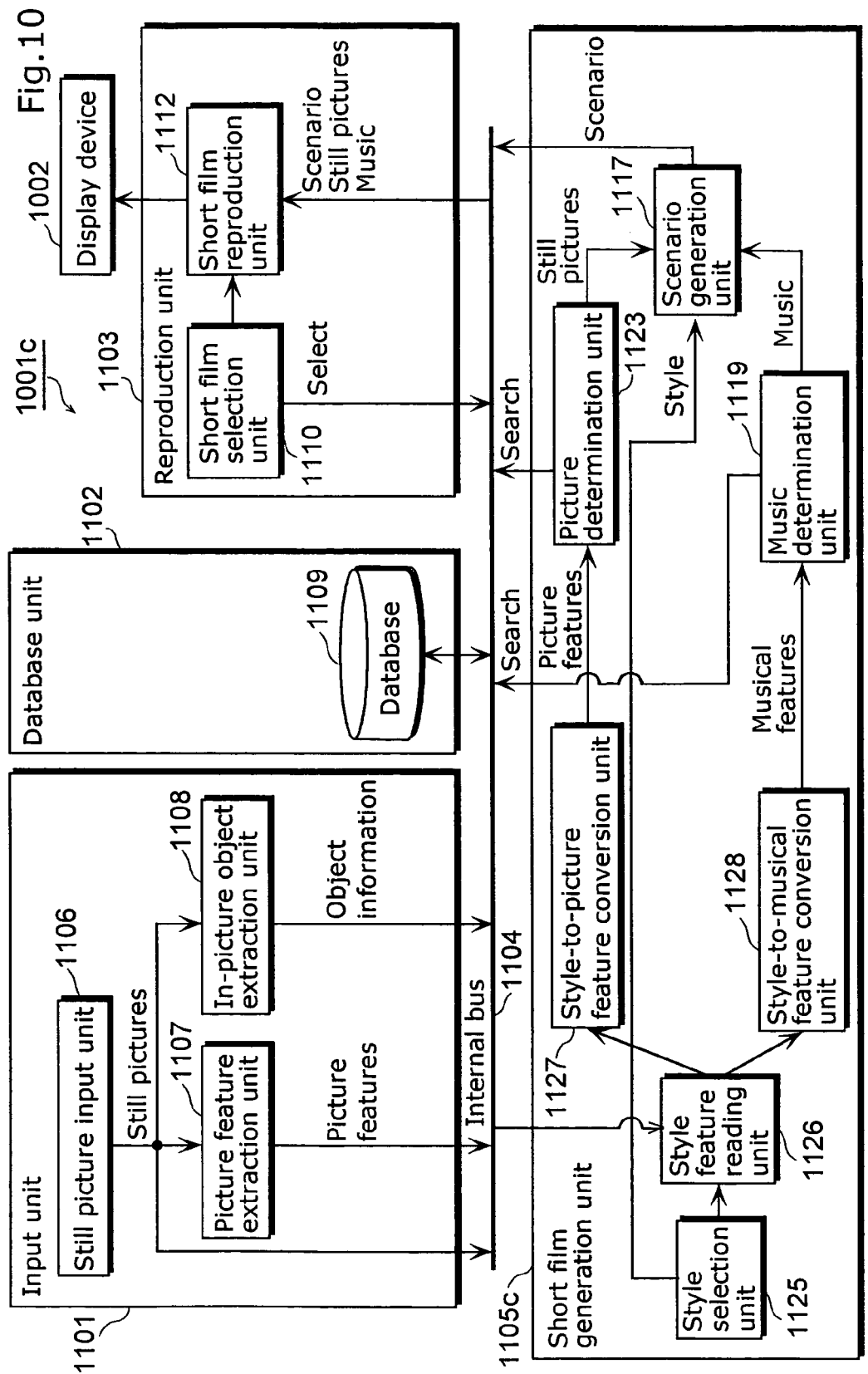
FIG. 10 is a block diagram showing a configuration of another embodiment of the short film generation/reproduction apparatus according to the present invention.

FIG. 10 is a block diagram showing another configuration of the short film generation/reproduction apparatus according to the third embodiment of the present invention. Note that components corresponding to those in the short film generation/reproduction apparatuses 1001a and 1001b in the first and second embodiments are assigned the same numbers, and explanations thereof are omitted.

In a short film generation/reproduction apparatus 1001c shown in FIG. 10, the configuration of a short film generation unit 1105c is different from that of the short film generation units 1105a and 1105b according to the first and second embodiments, but other configuration of the short film generation/reproduction apparatus 1001c is the same as those of the short film generation/reproduction apparatuses 1001a and 1001b.

The short film generation unit 1105c is intended for generating a short film that matches the image of a style selected by the user, and is comprised of a style selection unit 1125, a style feature reading unit 1126, a style-to-picture feature conversion unit 1127, and a style-to-musical feature conversion unit 1128, in addition to the picture determination unit 1123, the music determination unit 1119, and the scenario generation unit 1117.

The style selection unit 1125 provides the user with a GUI for selecting a style. The style feature reading unit 1126 reads, from the database 1109, the features of the style selected by the user. The style-to-picture feature conversion unit 1127 converts the style features read out by the style feature reading unit 1126 into picture features. The picture determination unit 1123 searches the database 1109 to determine optimum still pictures based on the picture features. Meanwhile, the style-to-musical feature conversion unit 1128 converts the style features read out by the style feature reading unit 1126 into musical features. The music determination unit 1119 searches the database 1109 to determine an optimum piece of music based on the musical features. Subsequently, the scenario generation unit 1117 generates a scenario using the style selected by the user, the still pictures selected by the picture determination unit 1123, and the music determined by the music determination unit 1119.

Next, an explanation is given of the operation of the short film generation unit 1101c with the above configuration, when generating a scenario of a short film.

Figure 11:
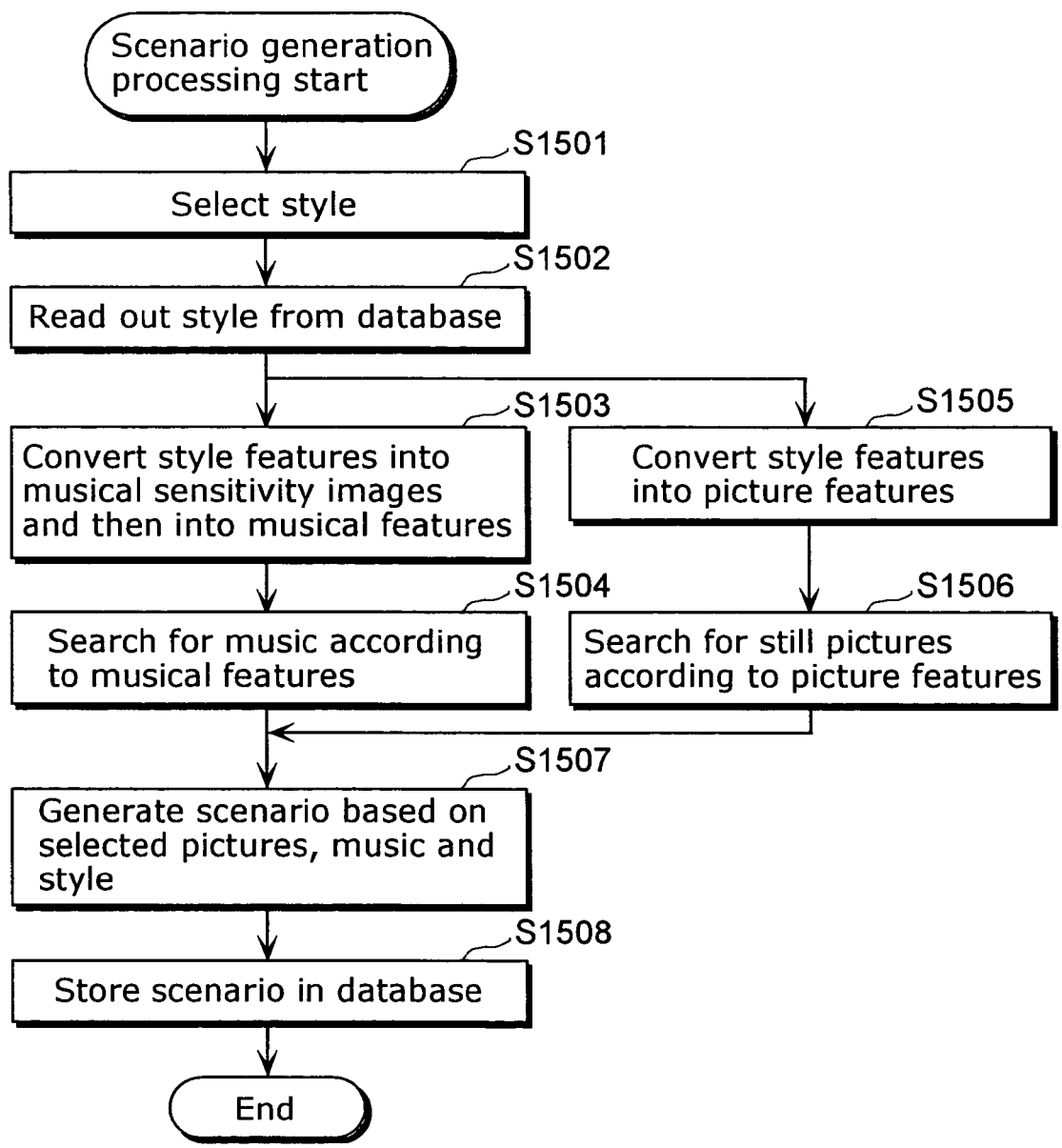
FIG. 11 is a flowchart showing an algorithm for generating a scenario in the short film generation unit in the short film generation/reproduction apparatus.

FIG. 11 is a flowchart showing the algorithm for generating the scenario in the short film generation unit 1105c.

First, the user selects, through the style selection unit 1125, a style that s/he wishes to use for a short film to be generated (S1501). The style feature reading unit 1126 reads the selected style from the database 1109, and obtains style features which are described in the header of such style as shown in 2 (S1502). Next, the style-to-musical feature conversion unit 1128 converts the style features into musical features (S1503). In the third embodiment, musical sensitivity images that match the style are described as style features, and such musical sensitivity images are converted into musical features. Next, the music determination unit 1119 makes a search in the database 1109 with such musical features as a key, so as to select music to be used as BGM of the short film (S1504).

Meanwhile, the style-to-picture feature conversion unit 1127 converts the style features (=musical sensitivity images) into picture features (S1505). Then, the picture determination unit 1123 searches still pictures stored in the database 1109 with the picture features as a key, so as to determine a predetermined number of still pictures (S1506).

The scenario generation unit 1117 generates a scenario using the still pictures, music and style determined in the above manner, as in the case of the first and second embodiments (S1507). Finally, the scenario generation unit 1117 stores the generated scenario in the database 1109 (S1508).

As described above, since the short film generation/reproduction unit 1101c according to the third embodiment determines, on the basis of the style features of the style selected by the user, music and still pictures which are appropriate for such selected style, so as to generate a short film, it is possible to save the user of the trouble of selecting optimum still pictures and music from among databases of an enormous amount of pictures and music when making a short film. Furthermore, since it is possible for the user to make a short film in accordance with a style that s/he desires just by selecting a style that indicates an outline of a short film, the present invention contributes to the construction of an environment in which the user can make a short film comfortably.

Note that, in the third embodiment, the music determination unit 1119 searches for music stored in the database 1109 with musical features as a key, but the present invention is not limited to this. Therefore, it is also possible that music stored in the database 1109 incorporates semantic information, so as to allow the music determination unit 1119 to search for music stored in the database 1109 according to such semantic information and musical features, for example. In this case, even when referring to the same musical features, it is possible for the music determination unit 1119 to select music suitable for each season by detecting the current season from the current time information and by additionally using such season as a key for making a search in the database 1109.

Moreover, in the third embodiment, although style features are represented as musical sensitivity images that match the style, the present invention is not limited to this. Therefore, it is also possible, for example, to represent style features using keywords other than those of musical sensitivity images and to convert style features into musical features on the basis of a table that shows a correspondence between such style features and musical features.

Furthermore, in the third embodiment, although the picture determination unit 1123 searches for still pictures stored in the database 1109 with picture features as a key, the present invention is not limited to this. Therefore, it is also possible, for example, to define object information as one of style features, so as to allow the picture determination unit 1123 to search for still pictures stored in the database 1109 according to such object information and picture features. In this case, in a style intended for showing still pictures composed mainly of snapshots, it is preferable that the user selects still pictures that include many persons (faces) as objects.

Fourth Embodiment

Next, an explanation is given of the case where the user selects a theme and a short film that matches the image of such theme is generated.

Figure 12:
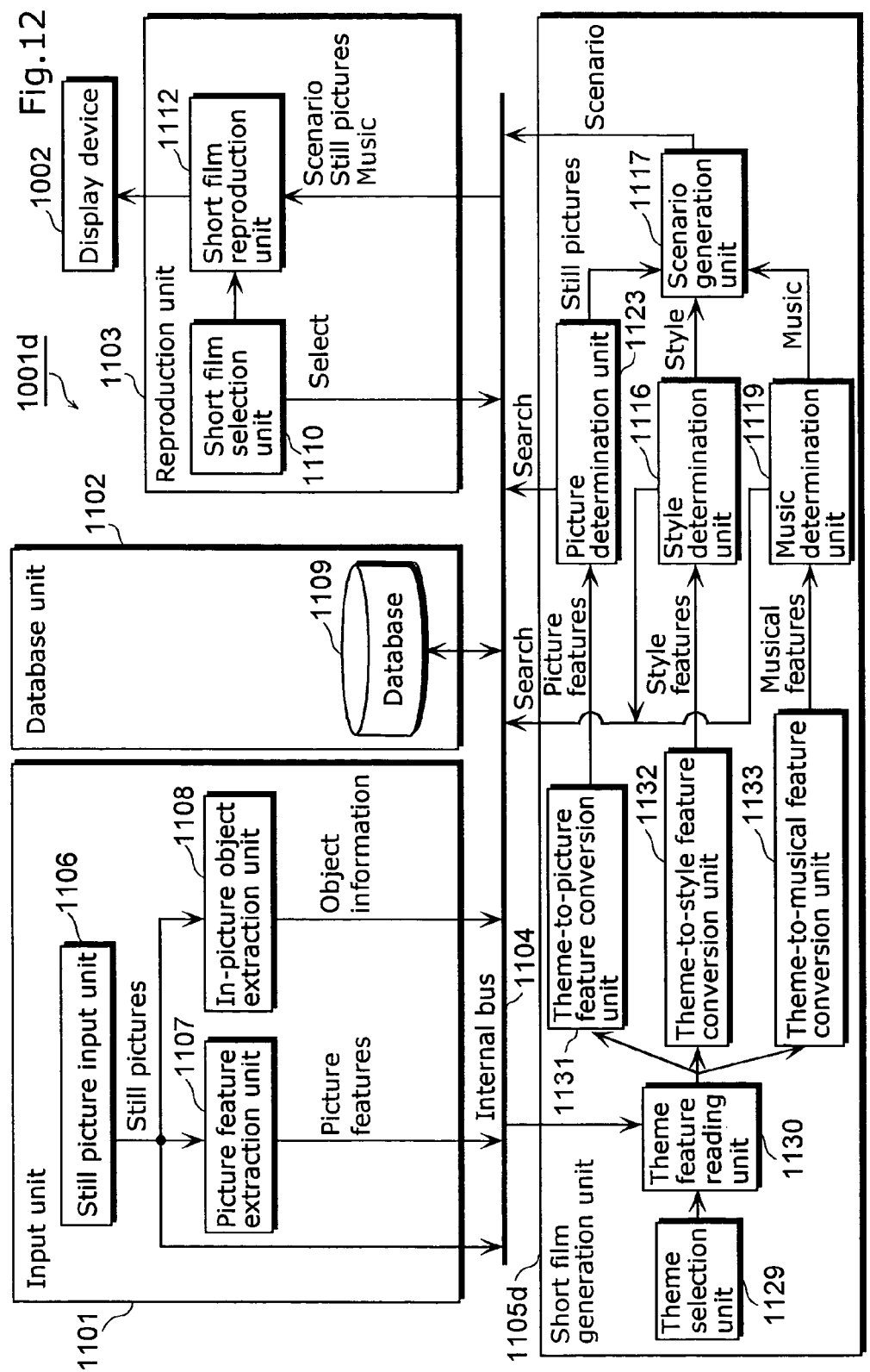
FIG. 12 is a block diagram showing a configuration of another embodiment of the short film generation/reproduction apparatus according to the present invention.

FIG. 12 is a block diagram showing another configuration of the short film generation/reproduction apparatus according to the fourth embodiment of the present invention. Note that components corresponding to those in the short film generation/reproduction apparatuses 1001*a*~1001*c* in the first~third embodiments are assigned the same numbers, and explanations thereof are omitted.

In a short film generation/reproduction apparatus 1001*d* shown in 12, the configuration of a short film generation unit 1105*d* is different from that of the short film generation units 1105*a*~1105*c* according to the first~third embodiments, but other configuration of the short film generation/reproduction apparatus 1001*d* is the same as those of the short film generation/reproduction apparatuses 1001*a*~1001*c*.

The short film generation unit 1105*d* is intended for generating a short film that matches the image of a theme selected by the user, and is made of a theme selection unit 1129, a theme feature reading unit 1130, a theme-to-picture feature conversion unit 1131, a theme-to-style feature conversion unit 1132, and a theme-to-musical feature conversion unit 1133, in addition to the picture determination unit 1123, the style determination unit 1116, the music determination unit 1119, and the scenario generation unit 1117.

"Theme" here is defined in advance by the developer or the user, according to which picture features, musical sensitivity images (musical features) and style features are determined. Example themes include seasons (e.g. "spring", "summer," "fall", "winter", "early summer", and "late fall"), words that roughly specify a certain period of time (e.g. "this time last year" and "recently"), and words that exactly specify years ("the year 2000" and "the year 1990").

The theme selection unit 1129 provides the user with a GUI for selecting a theme. The theme feature reading unit 1130 reads, from the database 1109, the theme definition file of the theme selected by the user. The theme-to-picture feature conversion unit 1131 retrieves the picture features described in such theme definition file. The picture determination unit 1123 searches the database 1109 to determine optimum still pictures based on the picture features. Meanwhile, the theme-to-style feature conversion unit 1132 retrieves the style features described in the theme definition file. The style determination unit 1116 searches the database 1109 to determine an optimum style based on the style features. The theme-to-musical feature conversion unit 1133 retrieves the musical features descried in the theme definition file. The music determination unit 1119 searches the database 1109 to determine an optimum piece of music based on the musical features. Subsequently, the scenario generation unit 1117 generates a scenario using the still pictures determined by the picture determination unit 1123, the style selected by the style determination unit 1116, and the music determined by the music determination unit 1119.

Next, an explanation is given of the operation of the short film generation/reproduction apparatus 1101*d* with the above configuration, when generating a scenario of a short film.

Figure 13:
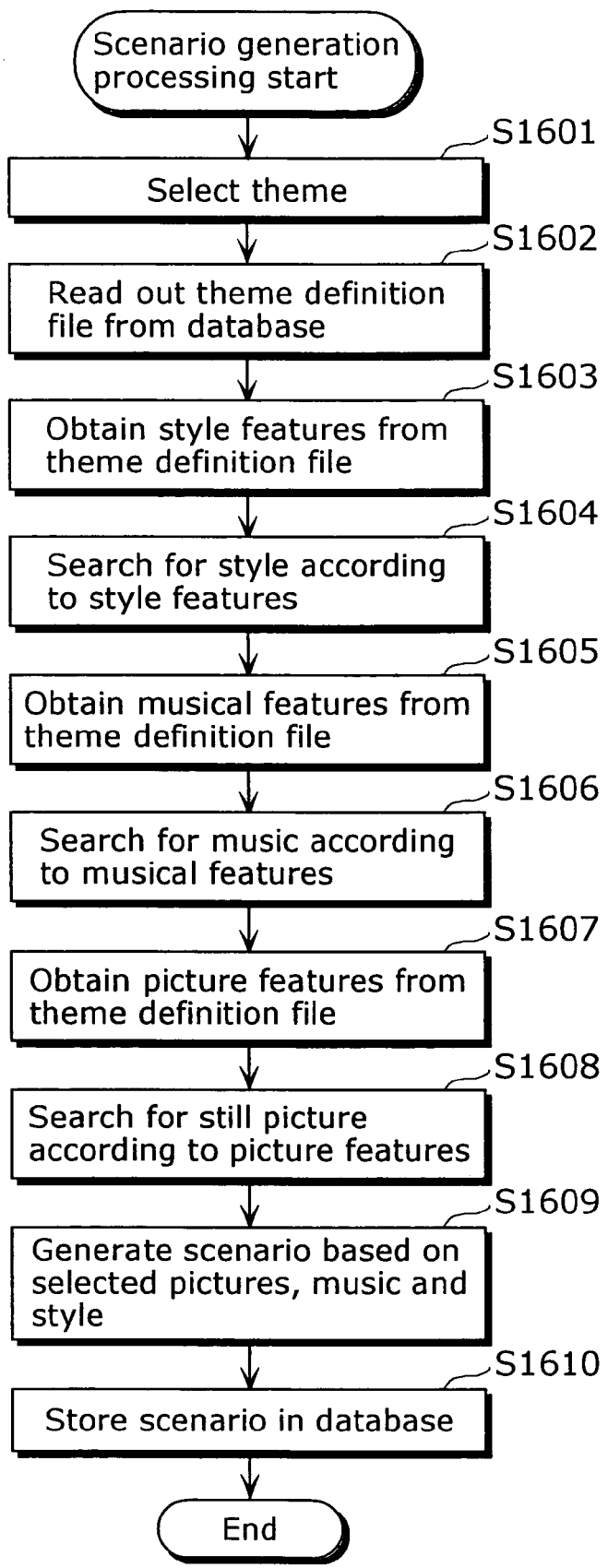
FIG. 13 is a flowchart showing an algorithm for generating a scenario in the short film generation unit in the short film generation/reproduction apparatus.

FIG. 13 is a flowchart showing the algorithm for generating the scenario in the short film generation unit 1105*d*.

First, the user selects, through the theme selection unit 1129, a theme that s/he wishes to use for a short film to be generated (S1601). The theme feature reading unit 1130 reads the theme definition file of the selected theme from the database 1109 (S1602). Next, the theme-to-style feature conversion unit 1132 retrieves the style features described in the theme definition file (S1603). Next, the style determination unit 1116 makes a search in the database 1109 with the style features as a key, so as to determine a style (S1604).

Subsequently, the theme-to-musical feature conversion unit 1133 retrieves the musical sensitivity images described in the theme definition file, and converts such musical sensitivity images into musical features (S1605). Then, the music determination unit 1119 makes a search in the database 1109 with the musical features as a key, so as to determine a piece of music to be used as BGM of the short film (S1606).

Next, the theme-to-picture feature conversion unit 1131 retrieves the picture features described in the theme definition file (S1607). Then, the picture determination unit 1123 makes a search in the database 1109 with the picture features as a key, so as to determine a predetermined number of still pictures (S1608).

The scenario generation unit 1117 generates a scenario using the still pictures, music and style determined in the above manner, as in the case of the first embodiment (S1609). Finally, the scenario generation unit 1117 stores the generated scenario in the database 1109 (S1610).

As described above, since the short film generation/reproduction unit 1101*d* according to the third embodiment determines, on the basis of the theme selected by the user, a style, music and still pictures which are optimum for such selected theme, so as to generate a short film, it is possible to save the user of the trouble of selecting optimum still pictures, music and style from among an enormous amount of pictures, music, and styles when making a short film. Furthermore, since it is possible for the user to make a short film in accordance with a theme that s/he desires just by selecting a theme, the present invention contributes to the construction of an environment in which the user can make a short film comfortably.

Note that, in the fourth embodiment, the picture determination unit 1123 searches for still pictures stored in the database 1109 with picture features as a key, but the present invention is not limited to this. Therefore, it is also possible that a theme definition file includes restriction conditions that take into account the theme, and that the picture determination unit 1123 searches for still pictures stored in the database 1109 according to such restriction conditions and picture features, for example. In this case, if a theme is "summer", it is possible for the user to select only summery still pictures by setting the following items, for example, as restriction conditions: the date and time of photo shooting=from June to September; the location of photo shooting=mountain, sea, swimming pool; and color tone=blue, white.

Moreover, in the first~fourth embodiment, although the display device 1002 is connected to the short film generation/reproduction apparatus 1001*d*, the present invention is not limited to this. Therefore, the short film generation/reproduction apparatus 1001*d* may incorporate the display device 1002 in itself, for example.

Fifth Embodiment

Next, an explanation is given for how the scenario generation unit 1117 associates a still picture with an effect. Here, an explanation is given for the case where an effect shown in FIG. 3 is assigned to a still picture. In this effect, as described above, the spotlight searches for the face of a person on the picture as an object, and the person's face which has been searched by the spotlight is zoomed in at the end.

Figure 14:
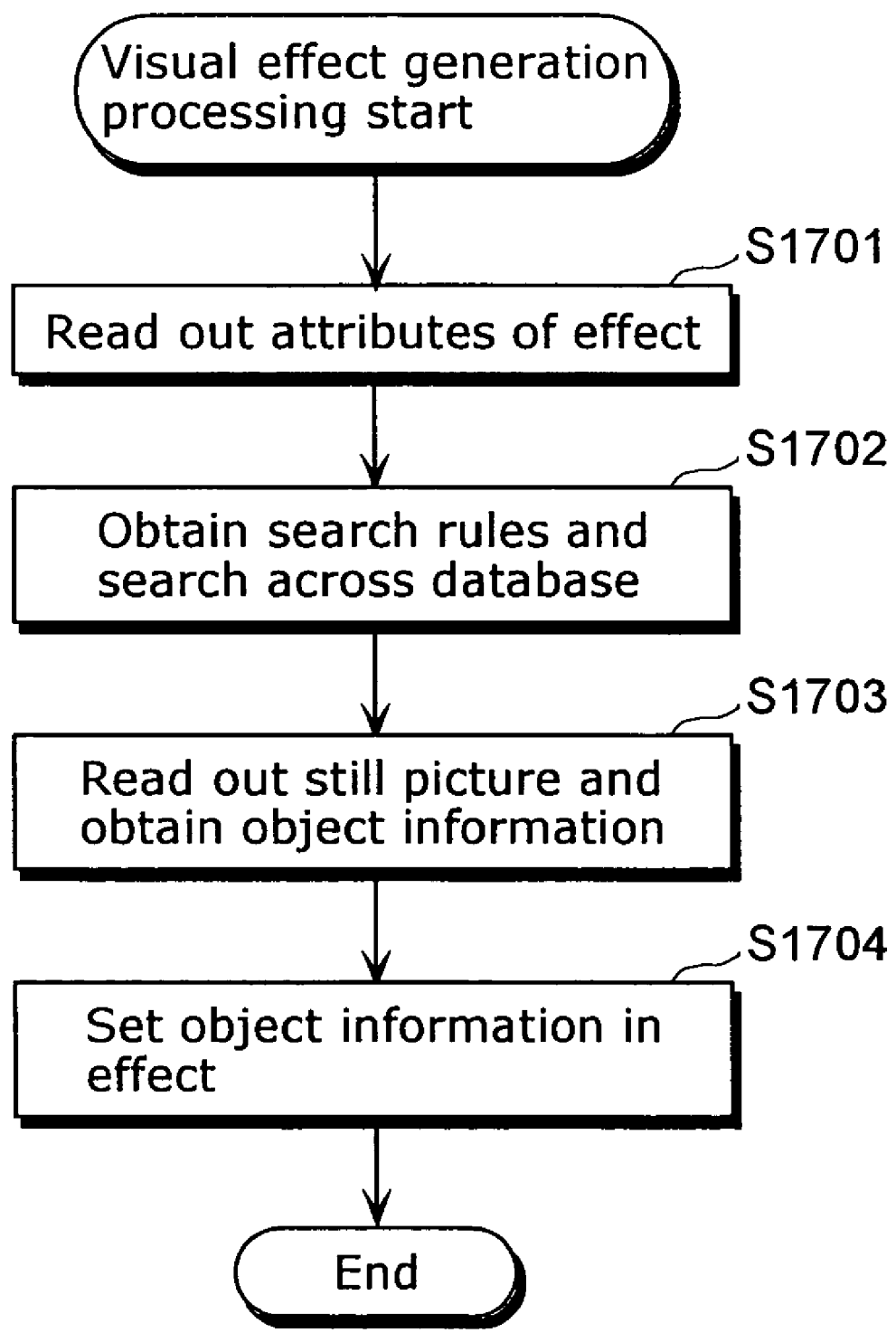
FIG. 14 is a flowchart showing an algorithm to be followed by the scenario generation unit when generating a visual effect according to object information in the short film generation/reproduction apparatus.

FIG. 14 is a flowchart showing the algorithm to be followed by the scenario generation unit 1117 when assigning a still picture to the effect and generating a visual effect according to the object information of such still picture.

The scenario generation unit 1117 reads out the attributes of the effect (S1701). These effect attributes are predetermined search rules, in which "the number of faces," "the position of face", "the size of face", and "the number of similar pictures", and the like are set as shown in Table 4. In the effect shown in FIG. 3, a search rule is set as "the number of faces=1", since it is possible to display a still picture in an effective manner, as long as such still picture includes one person.

TABLE 4

| Effect attribute | Description |
| --- | --- |
| Number of faces = | the number of faces in a still picture |
| Position of face = | the position of a face in a still picture (center of gravity coordinates) |
| Size of face = | the size of a face in a still picture (the radius of a circumscribing circle) |
| Number of similar pictures = | the number of pictures which are similar in terms of picture features |

The scenario generation unit 1117 makes a search in the database 1109 according to the search rules, so as to determine a still picture to be assigned to this effect (S1702). Next, the scenario generation unit 1117 reads out the object information of the above-determined still picture from the database 1109 (S1703). Subsequently, the scenario generation unit 1117 sets, in the effect, information in the object information which is required for such effect (S1704). Since the effect shown in 3 requires the position and size of the face as an object, the scenario generation unit 1117 obtains the position and size of the face from the object information of the still picture, and sets them in the effect.

As described above, in the case of the effect shown in FIG. 3, since the scenario generation unit 1117 selects, from the database, a still picture on which there is only one person, and sets the object information of the face (the position of the center of gravity coordinates and the radius) in the effect, it is possible to give the user the feeling that the spotlight has found the face by recognizing the position and size of the face and then such face has been zoomed in.

As explained above, since a still picture that best matches the effect can be selected from the database, it is possible to provide a visual effect with a higher degree of entertainment. Moreover, since a visual effect is given to a still picture with proper recognition of an object in a still picture such as a person's face, it is possible to provide the user with increased enjoyment as well as to give the feel of a story to a short film.

Sixth Embodiment

In the first~fifth embodiments, the scenario generation unit 1117 establishes a link between an effect and a still picture by arranging effects in order first, and then selecting, from the database 1109, a still picture that includes picture features required by such effect. In the sixth embodiment, on the other hand, a link is established between an effect and a still picture by arranging still pictures first, and then selecting an effect according to the picture feature and object information of a still picture.

Figure 15:
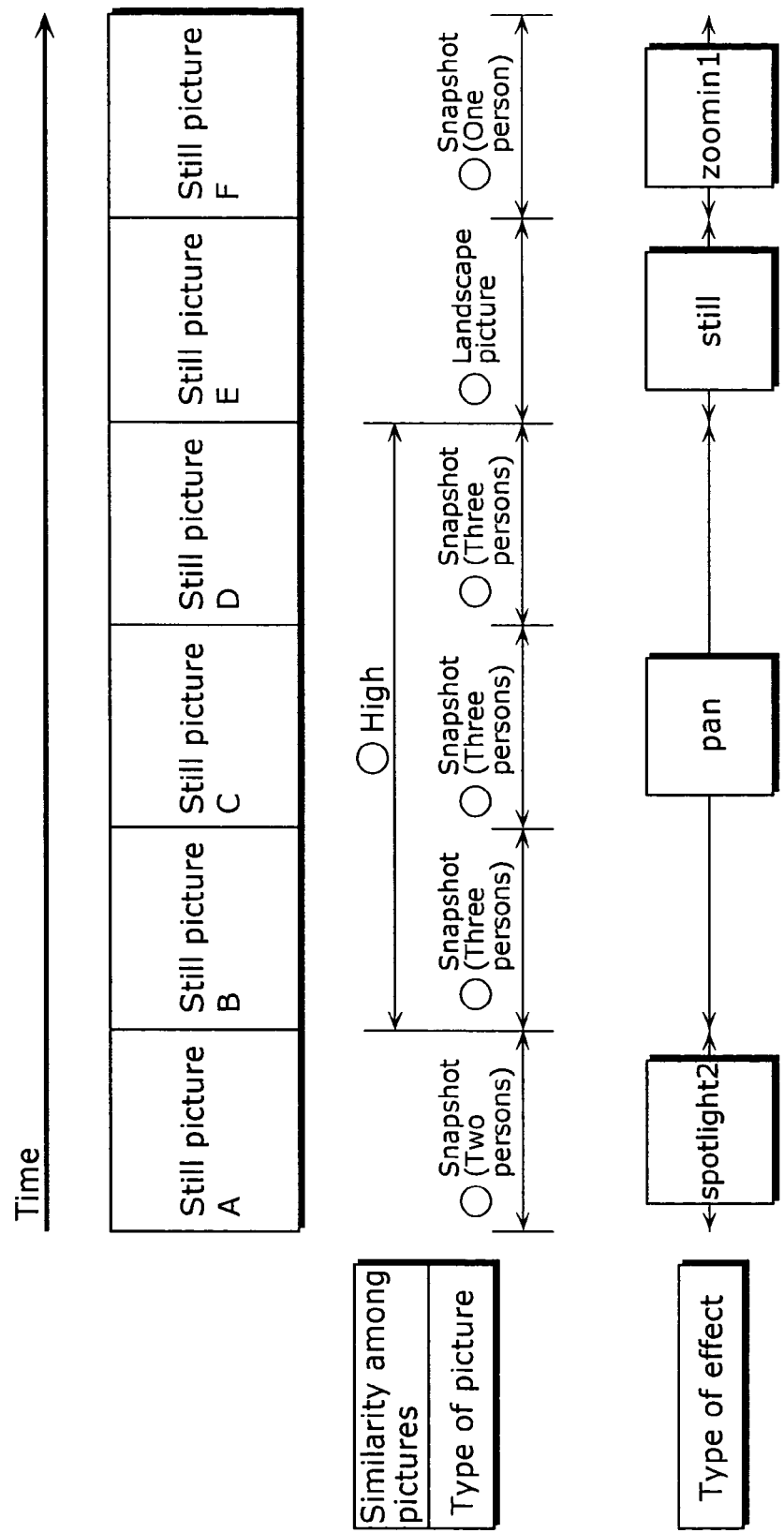
FIG. 15 is a conceptual diagram showing how effects are assigned to still pictures which are arranged in order in the time domain in the scenario generation unit in the short film generation/reproduction apparatus.

FIG. 15 is a conceptual diagram showing how effects are assigned to still pictures which are arranged in order in the time domain. Here, still pictures A~F are arranged in the time domain in order in which they have been stored in the database 1109. The picture features and object information of the respective still pictures are classified as follows: the still picture A is a snapshot in which there are two persons; the still pictures B~D are photos with a high degree of similarity to each other; the still picture E is a landscape picture in which there is no person; and the still picture F is a snapshot in which there is one person. Table 5 below shows the classification of pictures in accordance with their picture features as well as effects corresponding to the respective classified pictures.

Here, an explanation is given of the operation of the scenario generation unit 1117 when generating a scenario using still pictures, music and a style which have been determined.

Figure 16:
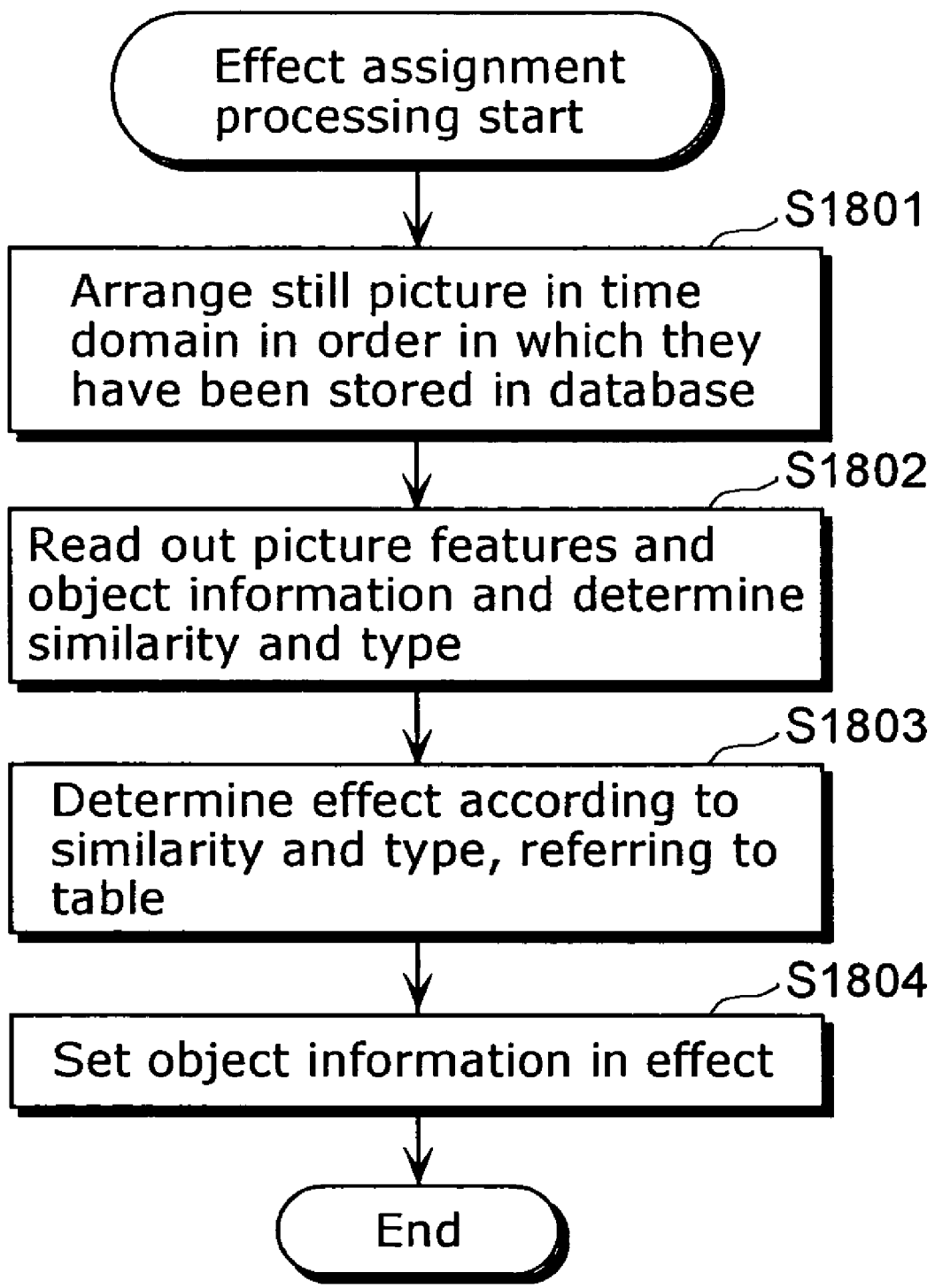
FIG. 16 is a flowchart showing an algorithm for assigning effects to still pictures in the scenario generation unit in the short film generation/reproduction apparatus.

FIG. 16 is a flowchart showing the algorithm for assigning effects to still pictures.

The scenario generation unit 1117 reads out the determined still pictures (more than one) in order in which they were stored in the database 1109, and arranges them in order in the time domain (S1801). Next, the scenario generation unit 1117 judges the similarity between pictures as well as the type of the respective still pictures, on the basis of their respective picture features and object information (S1802). Then, the scenario generation unit 1117 assigns each of the still pictures with an effect suitable for their respective similarities and types, according to, for example, a conversion table shown in FIG. 5 and links the still pictures with effects (S1803). In an example shown in FIG. 15, "spotlight 2" that is in the section of "snapshot (two persons)" is selected for the still picture A. Similarly, "pan" is selected for the still pictures B~D, "still" for the still picture E, and "zoomin1" for the still picture F. Note that any effect can be selected as long as such effect belongs to a single section, and therefore that an effect may be selected according to rules such as random, round robin, and the like.

TABLE 5

| Category | Corresponding effect |
| --- | --- |
| Similar picture | pan (1st picture: upper right ⇒ lower left, 2nd picture: upper left ⇒ lower right, 3rd picture: center left ⇒ center right) |
| Snapshot (1 person) | spotlight1 . . . put spotlight on 1 face |
| | zoomIn1 . . . zoom up 1 face |
| Snapshot (2 persons) | spotlight2 . . . put spotlight on 2 faces |
| | zoomIn2 . . . zoom up 2 faces |
| Snapshot (3 persons) | spotlight3 . . . put spotlight on 3 faces |
| | zoomIn3 . . . zoom up 3 faces |
| Snapshot (4 or more persons) | slidein4 . . . slide in a picture part including 4 persons |
| Landscape picture | still . . . display pictures one by one slowly |
| | pan . . . move a picture from right to left |

Finally, the scenario generation unit 1117 sets, in each of the effects whose arrangement in order has been determined, object information such as the position and size of an object (S1804).

As described above, since still pictures are arranged in order first, and then a link is established between each effect and each still picture on the basis of picture features and object information of each of still pictures, it is possible to generate a scenario using, as materials, all still pictures selected by the user or the picture determination unit 1123. Furthermore, an effect suitable for a still picture can be selected, since the selection is based on the picture features and object information of such still picture.

Note that, in the sixth embodiment, still pictures are arranged in the time domain in order in which they were stored in the database 1109, but the present invention is not limited to this. Therefore, it is possible, for example, to arrange still pictures in time and date order in which they were taken.

Moreover, it is also possible to generate a scenario by first establishing a link between each of effects and still pictures based on the picture features and object information of the respective still pictures and then by arranging, in the time domain, only effects which have been linked with still pictures, without arranging still pictures in the time domain first.

Also note that, in the first~sixth embodiments, although the short film generation/reproduction apparatus 1001 and the display device 1002 are independently configured, the present invention is not limited to this, and therefore that the short film generation/reproduction apparatus 1001 and the display device 1002 are integrated together.

Seventh Embodiment

Figure 17:
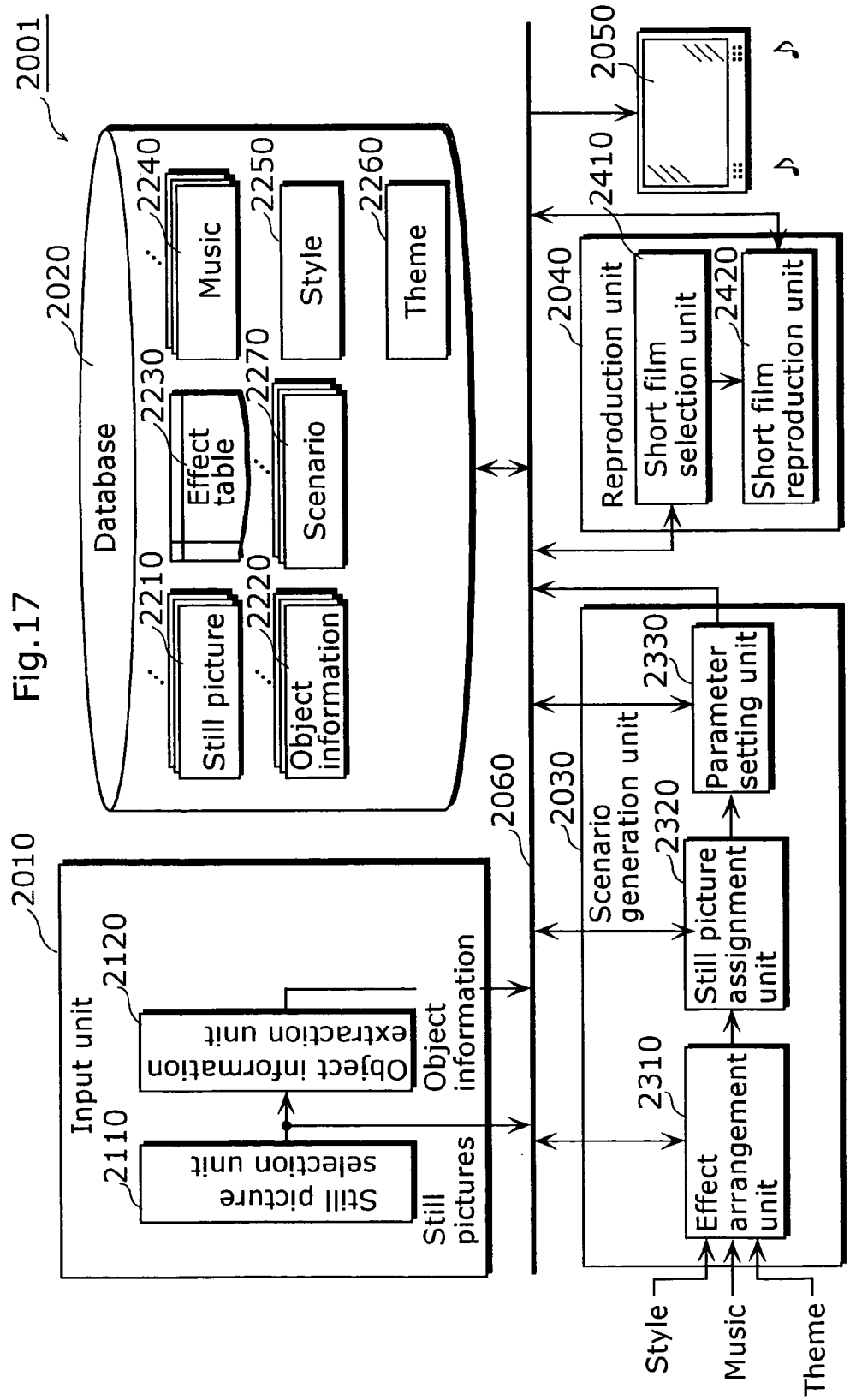
FIG. 17 is a functional block diagram showing a configuration of a short film generation/reproduction apparatus according to a seventh embodiment of the present invention.

FIG. 17 is a functional block diagram showing another configuration of a short film generation/reproduction apparatus according to the seventh embodiment of the present invention.

A short film generation/reproduction apparatus 2001 is a computer apparatus for generating a scenario of video (short film) using more than one input still picture and for reproducing the short film using the generated scenario. As shown in FIG. 17, such short film generation/reproduction apparatus 2001 is comprised of an input unit 2010, a database 2020, a scenario generation unit 2030, a reproduction unit 2040, a display unit 2050, and an internal bus 2060 and the like that connects the input unit 2010~the display unit 2050 with one another. Note that in FIG. 17, only the scenario generation unit 2030 that corresponds to the scenario generation unit 1117 is illustrated out of the configuration of the respective short film generation units 1105*a*~1105*d*.

Here, "scenario" is not moving picture data itself typified by that of MPEG, but data in which visual effects (effects), parameters that specify the operations of the effects, and pointers to still pictures to which the effects are applied, and the like are described by a script language represented by XML in temporal order. In the seventh embodiment, a scenario is generated by mapping still pictures to "effects" which are arranged in the time domain.

The input unit 2010 is intended for obtaining still pictures from a digital camera and a medium that stores still pictures taken by a digital camera, and is made up of a still picture selection unit 2110 and an object information extraction unit 2120, and the like.

The still picture selection unit 2110 reads still pictures stored in the medium into the memory of the short film generation/reproduction apparatus 2001 (not illustrated in the diagram), and stores them in the database 2020. The medium here is, for example, a semiconductor memory medium (e.g. Compact Flash (R) memory card, SD memory card (R)), and optical disc medium (e.g. CD-R/ROM/RW, DVD-R/RAM/RW), a magnetic medium (e.g. tape, flexible disk), and an optical magnetic disc (e.g. MO).

Note that each of still pictures 2110 stored in the database 2020 via the still picture selection unit 2110, which are picture in compliant with JPEG, for example, includes still picture data itself and meta-data indicating the attributes of such picture data. The most part of meta-data is data generated by a device such as a digital still camera. Typically, meta-data is data such as the date and time of photo shooting, location (position information detected by GPS), conditions (e.g. shutter speed, focal length and exposure time) (these information are collectively referred to also as "semantic information" hereinafter). The specification of the above data was established by the Japanese Electronic Industry Development Association (JEIDA) as Exchangeable Image File Format (EXIF).

The object information extraction unit 2120 extracts, from the input picture data, an object such as a person's face, so as to generate object information. Such generated object information is stored in the database 2020.

FIG. 18 is a diagram showing an example configuration of object information 2220 stored in the database 2020.

As shown in FIG. 18, the object information 2220 includes: position information 2213 represented by the center coordinates of a circle which the extracted object is adjacent to and by the radius of such circle; a type of object 2212; and a file name 2211 of the corresponding still picture. An example of the object type 2212 is whether it is a person's face or not. Note that the position information of the object is not necessarily have to be represented by the center coordinates and radius of a circle, and therefore that it can also be represented by the starting and end coordinates on one of the diagonal lines of a square.

The database 2020 is capable of storing and searching for the following information in addition to the still pictures 2210 inputted from the still picture selection unit 2110 in the input unit 2010 and the object information 2220 generated by the object information extraction unit 2120: an effect table 2230; music 2240 used as BGM at the time of reproducing a short film; a style 2250 indicating an outline of video to be generated; a theme 2260 of the video to be generated; and a scenario 2270.

Note that the database 2020 can be configured by a recording medium such as a hard disk and a RAM. In this case, the database 2020 is additionally equipped with a means for storing and reading out the still pictures 2210 in and from the recording medium.

The effect table 2230 shows a relationship between the effect name of each of effects in a group of effects and the number of objects required by each of such effects.

FIG. 19 is a diagram showing an example structure of the effect table 2230.

As shown in FIG. 19, the effect table 2230 is made up of columns for effect names and columns for the number of required objects.

Stored in the columns for effect names is a list of effect names that specify which visual effect is used in reproducing one or more target still pictures (e.g. spotlight eff1, zoom eff2, trimming eff3, cross talk eff4, slide in eff5, and slide out eff6, and the like). In the columns for the number of required objects, "1~4," "1~4," "1~2," "2," "any number" and "any number" are stored respectively for the spotlight eff1~the slide out eff6.

For example, the spotlight eff1 is an effect in which the spotlight searches, within a picture, for a target object on which a focus is put in the end and in which a picture including 1~4 objects is mapped. The slide in eff5 and the slide out eff6 are effects in which a still picture is divided in a vertical, horizontal or slanting direction so that slide in or slide out is performed in a vertical, horizontal or slanting direction or in which a square picture is divided into four blocks so that they are slide in or slide out toward four corners. A picture that includes many objects can be mapped to these effects.

Note that, in addition to the above, it is also possible to apply the following visual effects to still pictures: a visual effect for giving still pictures dynamic motion and therefore a better look, by storing, in an effect name column, "pan" for moving the whole still pictures in any direction, detecting the positions of objects and setting the most distant position as a starting point; a visual effect for giving montage photo-like look to still pictures when two pictures are superimposed on each other, by storing, in an effect name column, "montage" for adjusting the positions of parts of objects between two pictures so as to allow the bottom picture to appear as if it was a montage photo when the upper picture is slide out; a visual effect for making a values smaller from a distant position, by storing, in an effect name column, "zoom in/zoom out" for scaling up/down a picture with a central focus on a specified object, or by storing, in an effect name column, "fade-in/fade-out" for making an object gradually come up/disappear on or from the screen by applying a blending to such object, and by reading out the coordinate positions of the object; and a visual effect for setting a specified object and its background image in different positions (e.g. most distant positions from each other) without superimposing the object on the background image, by storing, in an effect name column, "focus-in/focus-out" for masking the background image while focusing on the object, determining a relationship between the center of gravity position of a figure to be focused and the coordinate position of the object. In these cases, the number of required objects shall be set depending on the attributes of each effect.

The scenario 2270 is generated by determining an arrangement of effects which have been picked up from a group of effects and mapping still pictures to the effects which have been arranged in the time domain.

The scenario generation unit 2030 is intended for generating a scenario using (i) still pictures selected in advance by the user, and (ii) a determined style and music, or (iii) a determined style, music and a theme, and storing such generated scenario in the database 2020. Such scenario generation unit 2030 is made up of an effect arrangement unit 2310, a still picture assignment unit 2320, and a parameter setting unit 2330, and the like.

The effect arrangement unit 2310 is intended for retrieving one effect from a group of effects on the basis of (i) predetermined music and style, or (ii) predetermined music, style and theme, and for placing such effect in the time domain. By repeating this processing, the effect arrangement unit 2310 forms a framework of the scenario with a certain time length of reproduction. Here, the length of scenario reproduction may be any one of a length equal to that of music to be used as BGM and a time length defined by the user or the system.

The still picture assignment unit 2320 reads out the descriptions in the attributes of each effect in the framework of the scenario formed by the effect arrangement unit 2310, searches the database 2020 for still pictures with the required attributes, and maps such still pictures to the respective effects. More specifically, in the seventh embodiment, the still picture assignment unit 2320 searches for still pictures according to the number of objects required by each effect, and assigns still pictures obtained as a result of the search to each effect, i.e. maps such still pictures to each effect. Thus, when an effect is spotlight, the still picture assignment unit 2320 searches for pictures in which there is/are 1~4 object(s), selects one of them, and maps it to "spotlight".

The parameter setting unit 2330 determines parameters which are called when the mapping of still pictures to effects has completed and which are intended for determining the operation of each effect in the scenario.

For example, when an effect is slide out eff6, it is possible to determine the operation of slide out by determining parameters for the following three items:
1. the direction in which a block to be a target of slide out is moved (vertically, horizontally, slantingly, and toward four corners from the center);
2. the width of a block to be a target of slide out; and
3. the order in which block is slide out.

The reproduction unit 2040, which retrieves a scenario so as to generate plural pieces of frame data and displays them in temporal order, is made up of a short film selection unit 2410 and a short film reproduction unit 2420, and the like.

The short film selection unit 2410 provides the user with a GUI for selecting a short film to be reproduced.

The short film reproduction unit 2420 reads out, from the database 2020, the scenario of the selected short film as well as the still pictures and music defined in such scenario, decodes the scenario so as to reproduce the short film, and outputs the reproduced short film to the display unit 2050. Accordingly, the user can view the short film as a moving picture.

The display unit 2050, which is made up of a device for displaying video (e.g. LCD and CRT) and an internal speaker, is capable of displaying the video of the reproduced short film, and the like.

The following explains the operation of the short film generation/reproduction apparatus 2001 with the above configuration when still pictures are inputted.

Figure 20:
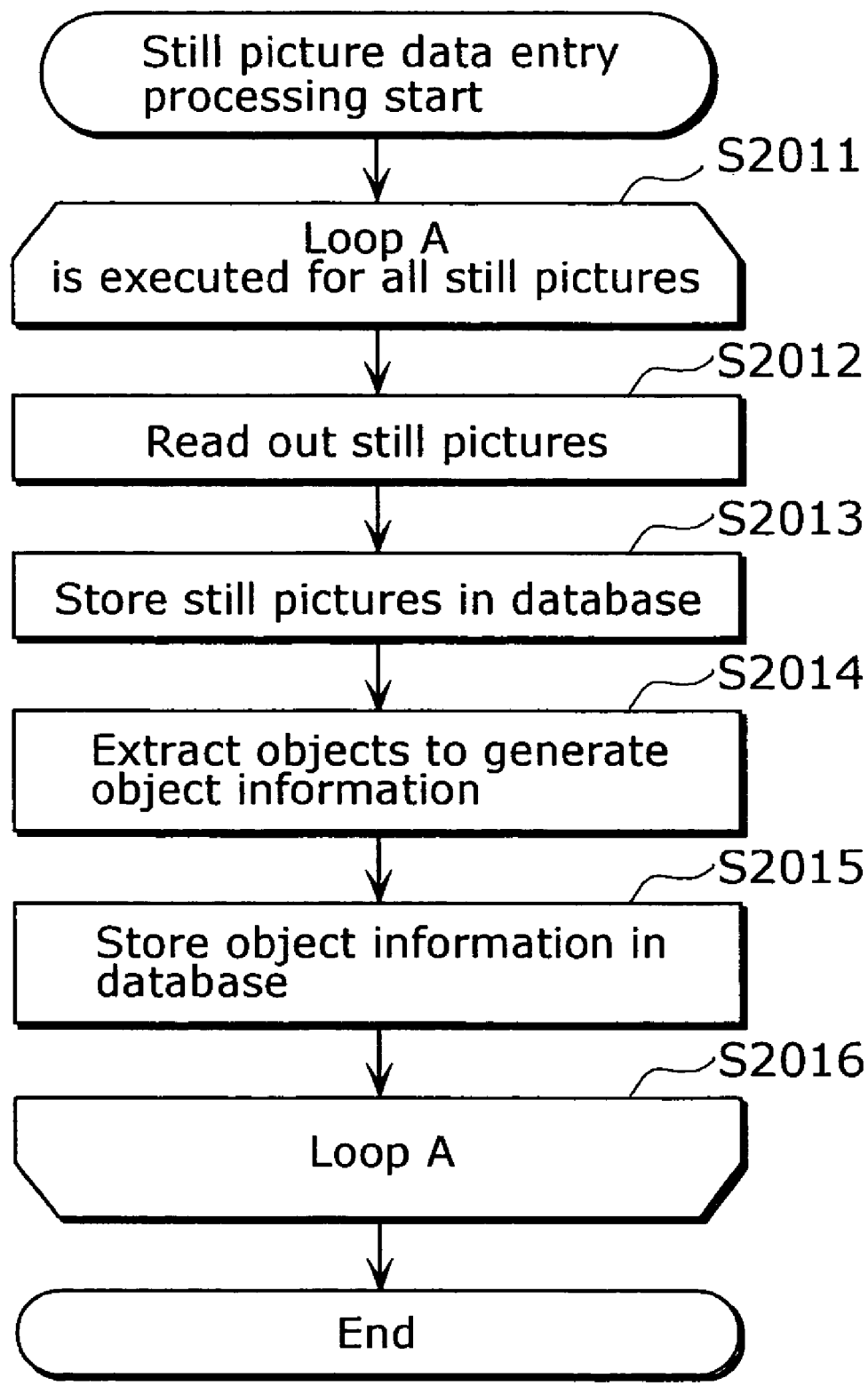
FIG. 20 is a flowchart showing an algorithm to be followed by the input unit when inputting the still pictures.

FIG. 20 is a flowchart showing the algorithm when the still pictures are inputted to the input unit 2010.

The still picture selection unit 2110 and the object information extraction unit 2120 repeatedly perform the following processing on all still pictures stored in the medium on a picture-by-picture basis (S2011).

First, the still picture selection unit 2110 reads still pictures stored in the medium into the memory of the short film generation/reproduction apparatus 2002 (S2012), and stores such readout still pictures in the database 2021 (S2013). Note that picture data may be stored in either a compression format represented by JPEG or a non-compression format.

Next, the object information extraction unit 2120 extracts all objects included in the above-readout still pictures (persons' faces in the seventh embodiment), and generates object information including the position information of the respective extracted objects (S2014). When the object information extraction unit 2120 finishes generating object information, the input unit 2010 stores the object information in the database 2020 (S2015). Accordingly, object information 2220 of the respective still pictures 2210 (see FIG. 18) is stored in the database 2020.

When all the still pictures 2210 and object information 2220 are stored in the database 2020 (S2016), the input unit 2010 terminates the processing for inputting still picture data.

Through the above processing, the position information and the like of each of all still pictures to be targets of image processing are obtained, making it possible for image processing to be performed mainly on objects.

Next, an explanation is given of the operation for generating a scenario of a short film.

Figure 21:
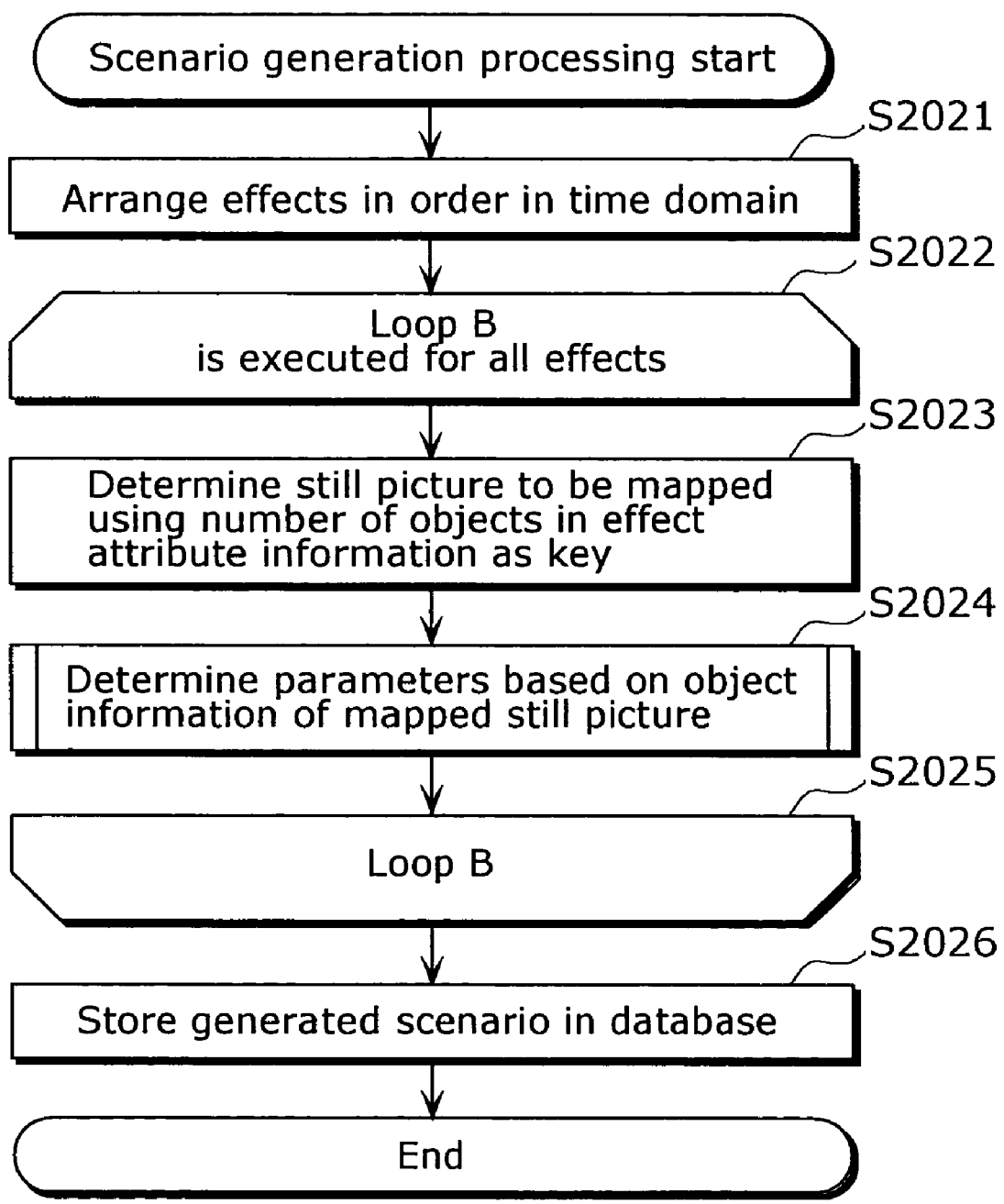
FIG. 21 is a flowchart showing an algorithm to be followed by each unit in the scenario generation unit, until a scenario is generated.

FIG. 21 is a flowchart showing the algorithm to be followed by each unit in the scenario generation unit 2030, until a scenario is generated. Note that this scenario generation processing shall be carried out after receiving a user's instruction about still pictures and the range of still pictures used in a short film as well as music, a style, and a theme used for such short film are determined.

First, the effect arrangement unit 2310 selects one effect from among a plurality of effects stored in the effect table 2230, and places it in a selected section in the time domain (S2021). To be more specific, this refers to the processing for arranging effects of "still", "zoom", "slide in" and "zoom out" in order of appearance, in accordance with the time length of the selected music. Accordingly, a framework of the scenario is formed.

When the arrangement of effects in the time domain completes, the still picture assignment unit 2320 and the parameter setting unit 2330 determine still pictures to be mapped to all the effects arranged in the time domain, so as to set various parameters (S2022).

First, the still picture assignment unit 2320 searches for still pictures which include a required number of objects according to the object information 2220, with the number of objects in effect attribute information as a key, and selects one of the above still pictures obtained as a result of the search, as a still picture to be mapped (S2023). More specifically, when an effect is slide out eff6, the still picture assignment unit 2320 searches for pictures including one or more objects, selects one of the pictures obtained as a result of the search, and maps such selected picture to slide out eff6.

Next, the parameter setting unit 2330 determines parameters, based on the object information of the above mapped still picture (S2024). To be more specific, the parameter setting unit 2330 reads out the object information (the position information of each object (center of gravity coordinates and size)) of respective still pictures which have been mapped, and determines parameters for each effect.

When still pictures to be mapped and parameters for all effects are determined (S2025), it marks the completion of the scenario. Thus, the scenario generation unit 2030 stores such generated scenario in the database 2020 (S2026), and terminates the scenario generation processing.

Here, an explanation is given of the processing for determining parameters to be carried out in Step S2024.

Figure 22:
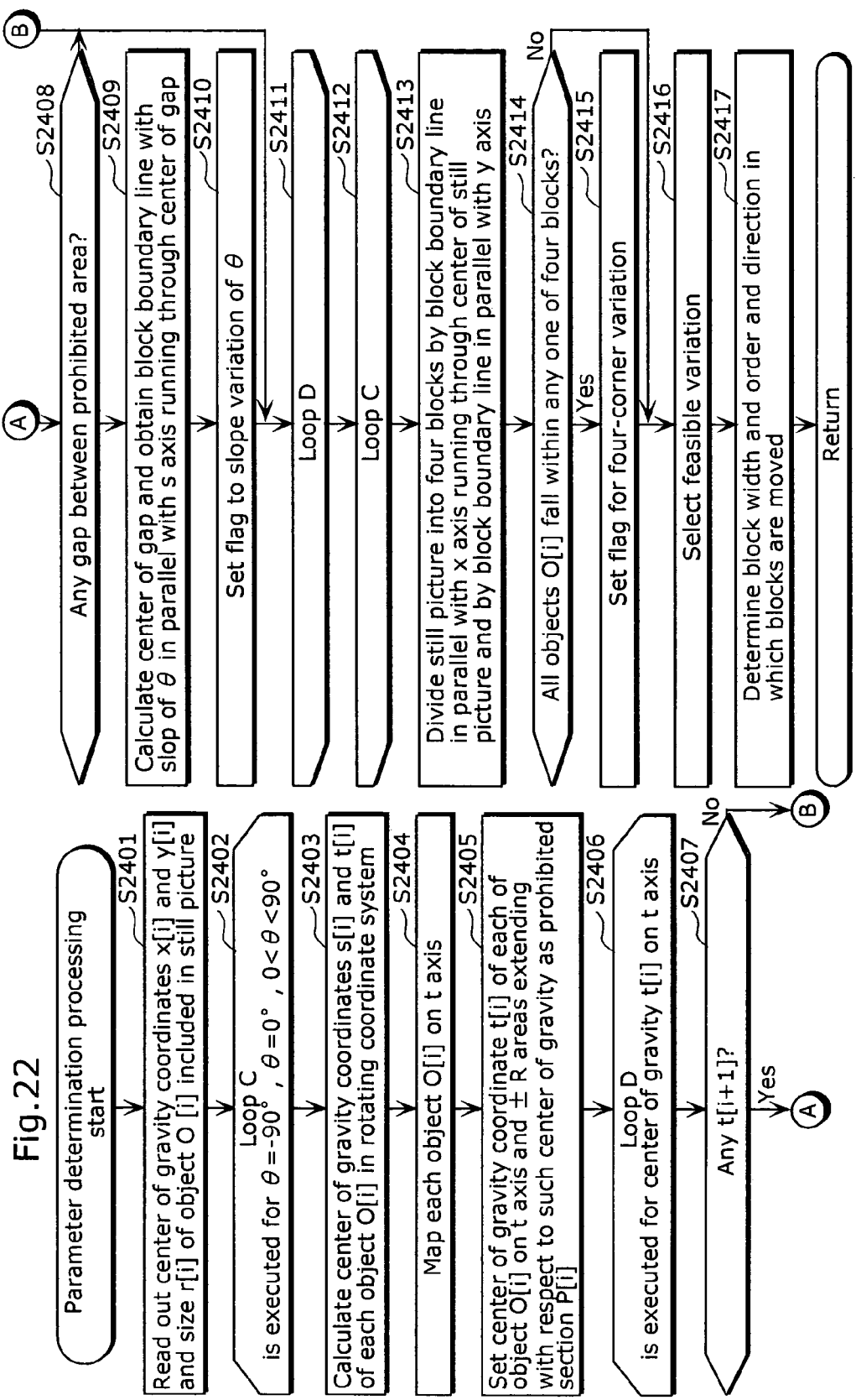
FIG. 22 is a flowchart explaining an algorithm to be followed by the parameter setting unit when determining a variation and parameters of an effect.

FIG. 22 is a flowchart showing a subroutine for explaining the algorithm to be followed by the parameter setting unit 2330 when determining a variation and parameters of an effect. Note that, in order to simplify the explanation, a concrete explanation is given of "slide out" as an example.

Here, "slide out" is an effect in which a still picture being displayed is divided into 1~"n" ("n" is 2 or a larger natural number) blocks, which are moved one by one to outside the screen. This effect has four variations of "vertical", "horizontal" "slanting", and "four corners", which are decided depending on in which direction blocks are slide out (see FIGS. 23A~23D).

Figure 23A:
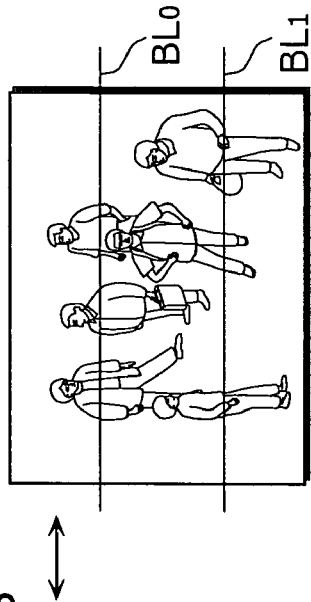
FIGS. 23A~23D are diagrams showing four variations of slide out: vertical, horizontal, slanting, and four corners.
Figure 23B:
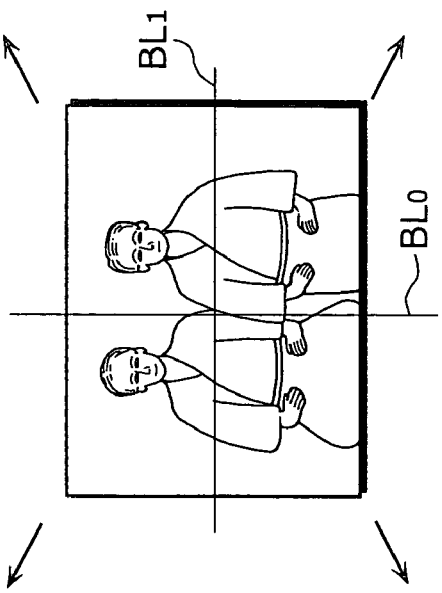
Figure 23C:
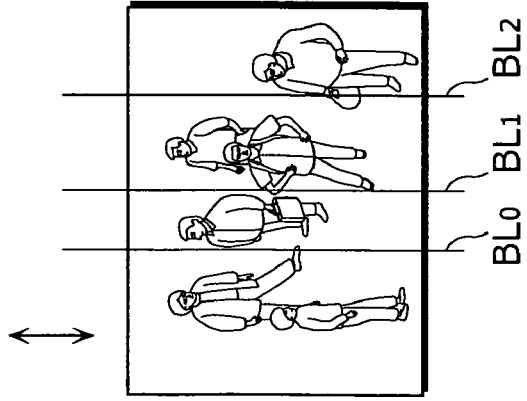
Figure 23D:
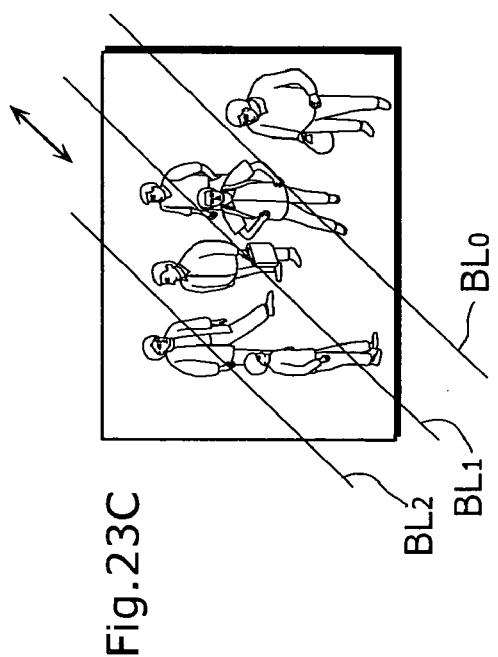

1. in "vertical" slide out, a still picture is divided by vertical lines into vertically-oriented rectangle blocks, which are moved up or down (see FIG. 23A).
2. in "horizontal" slide out, a still picture is divided by horizontal lines into horizontally-oriented rectangle blocks, which are slide out to the right or left (see FIG. 23B).
3. in "slanting" slide out, a still picture is divided by straight lines with a slope of θ (0°<θ<90°) into rightward-slanted blocks (trapezoids, the upper left (right) and the lower right (left) blocks can be triangle-shaped), which are moved to an upper right or lower left direction (see FIG. 23C).
4. in "four-corner" slide out, a still picture is divided by a horizontal line and a vertical line which intersect at the center of gravity of the still picture into four equal blocks, which are moved toward the nearest corner of the respective blocks (meaning that each of the four blocks is moved toward the respective directions) (see FIG. 23D).

Note that, when θ=−90° and 0° in "slanting" slide out, the slopes of lines become equivalent to those of the "horizontal" and "vertical" slide out respectively, and therefore that whether to carry out this variation or not is considered in the scope of the same algorithm. Also note that objects in still pictures are persons' faces in the seventh embodiment.

First, the parameter setting unit 2330, using the object information 2220, reads out center of gravity coordinates x[i] and y[i] and a size r [i] of an object O [i] ("i"=0, 1, 2, ... ) in the x-o-y coordinate system, the object O[i] being included in a still picture which has been mapped to an effect (S2401).

Next, the parameter setting unit 2330 obtains block boundary lines at rotation angles θ (θ=−90°, θ=0° and 0°<θ<90°), and sets flags for vertical, horizontal, and slanting variations (S2402).

First, the parameter setting unit 2330 determines center of gravity coordinates s[i] and t[i] of each object O [i] in the rotating coordinate (s-o-t) system (S2403).

Figure 24A:
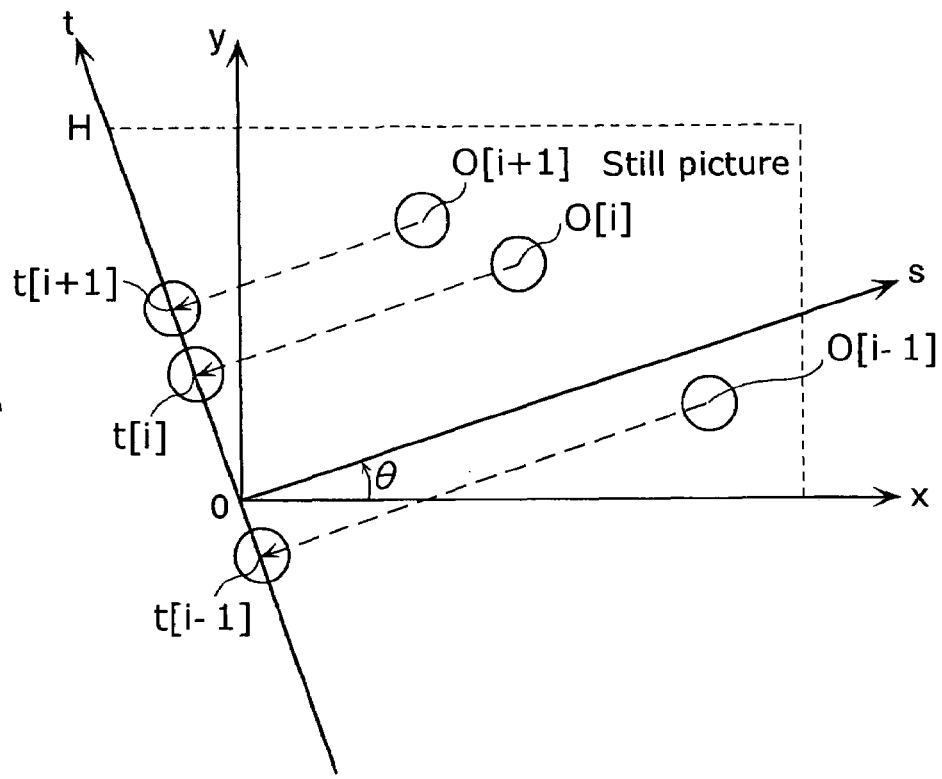
FIG. 24A and FIG. 24B are diagrams explaining the rotation coordinate system: s-o-t coordinate system which is generated by rotating the original coordinate system (x-o-y) by θ° (0°<θ<90°)
Figure 24B:
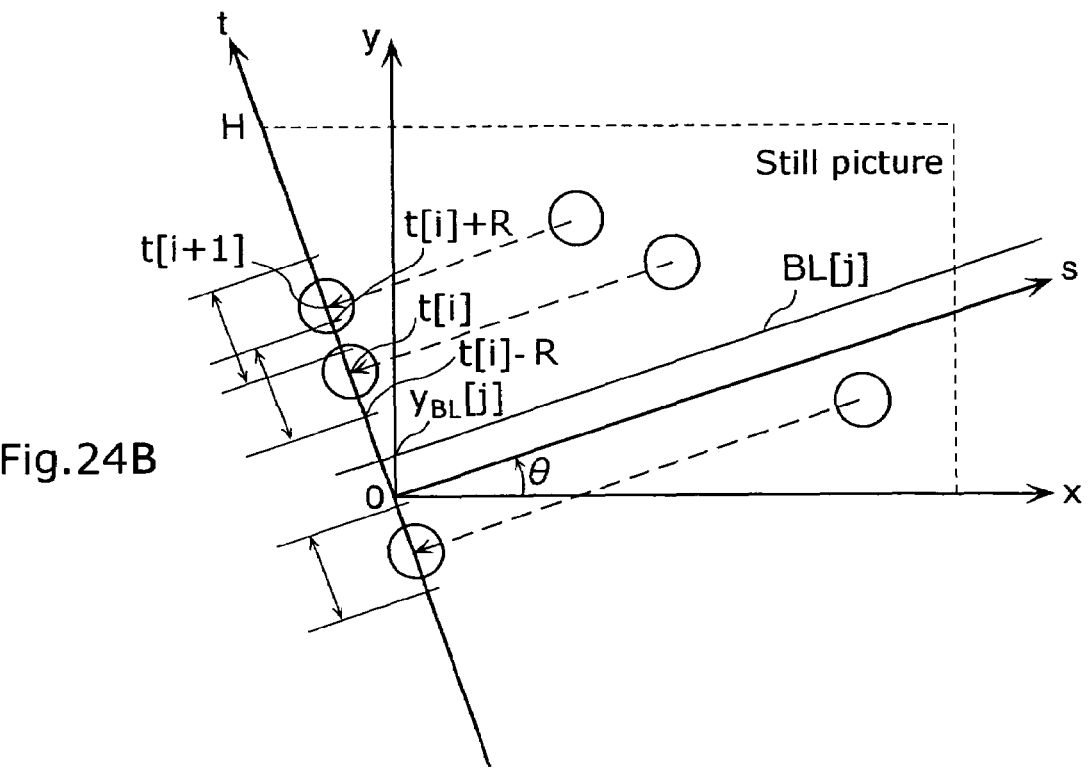

FIGS. 24A and 24B are diagrams explaining the rotation coordinate system: s-o-t coordinate system which is generated by rotating the original coordinate system (x-o-y) by θ (0°<θ<90°).

In FIG. 24A, an object O[i] is represented by its center of gravity coordinates (x[i] and y[i]) in the x-o-y coordinate system and by the radius r[i] of a circle that circumscribes the object. "H" is the height of a still picture. Coordinates (s[i] and t[i]) in the s-o-t system are determined using the following equation:

$$\begin{pmatrix} s[i] \\ t[i] \end{pmatrix} = \begin{pmatrix} \cos\theta & \sin\theta \\ -\sin\theta & \cos\theta \end{pmatrix} \begin{pmatrix} x[i] \\ y[i] \end{pmatrix}$$

When the center of gravity coordinates are determined, the parameter setting unit 2330 maps each object O[i] to the t axis (S2404). t [i] shown in the diagram is obtained as a result of mapping an object O[i] to the t axis. Accordingly, each object O[i] is placed on the t axis.

Next, the parameter setting unit 2330 sets the center of gravity coordinate t[i] of each object O[i] on the t axis and ±R areas that extend with respect to such center of gravity coordinate t[i] as a prohibited section P[i] where no points shall be placed, i.e. no block boundary lines shall be drawn in parallel with the s axis (S2405). Here, a value which is bigger than r[i] is set to an R so that hair and the like can surely be included in a prohibited section.

After setting prohibited sections, that is, prohibited areas, the parameter setting unit 2330 checks whether there is any object on the positive side on the t axis of each of center of gravity coordinates t[i] on the t axis, and obtains block boundary lines, so as to set flags for horizontal, vertical, and slanting variations (S2406).

First, the parameter setting unit 2330 judges whether there is any object on the positive side of a target object O[i] on the t axis, i.e. whether there is any t[i+1] or not (S2407). When there exists t[i+1] (Yes in S2407), the parameter setting unit 2330 checks whether there is a gap in a prohibited area extending between an object O[i] and an object O[i+1] on the positive side on the t axis (S2408).

When there exists a gap (Yes in S2408), it means that a still picture can be divided by a straight line (with the slope of θ) which is parallel with the s axis, the straight line running on a point in between such gap (see FIG. 24B). This allows the still picture to be divided by a block boundary line without partitioning the object. Thus, the parameter setting unit 2330 determines the center of the gap so as to obtain a block boundary line BL[j] with the slop of θ that runs through the center of the gap in parallel with the s axis (S2409), and sets a flag to a slope variation of θ (S2410). Note that a block boundary is specified according to a position yBL[i] on the y axis, a position on the x axis, and θ.

Meanwhile, when succeeding in obtaining a block boundary or when there is no gap in the prohibited area (No in S2408), the parameter setting unit 2330 repeats Steps S 2407~S2410 for objects O[i+1] on the positive side, until there is no object on the positive side on the t axis. Note that when a distance between an end of the still picture and the prohibited area of an object on positive side on the t axis is larger than a predetermined threshold, a block boundary line may be drawn in the middle of such distance as in the case of the BL[j] shown in FIG. 23B.

After obtaining the block boundary line at a certain rotation angle of θ and setting a flag to a slope variation of θ (S2411), the parameter setting unit 2330 changes such rotation angle θ, and obtains a block boundary line at such changed angle of θ and sets a flag to a slope variation of such changed θ.

After obtaining block boundary lines at all rotation angles θ and setting flags to slope variations of such θ (S2412), the parameter setting unit 2330 divides the still picture into four blocks by a block boundary line in parallel with the x axis that run through the center of the still picture and by a block boundary line in parallel with the y axis (S2413). Then, the parameter setting unit 2330 judges whether all objects O[i] fall within any one of the four blocks or not (S2414).

When all objects O[i] fall within any one of the four blocks (Yes in S2414), meaning that all of such objects are not subject to partitioning, the parameter setting unit 2330 sets a flag for four-corner variation (S2415), and goes on to Step S2414.

Meanwhile, when any one of the objects O[i] does not fall within any one of the four blocks (No in S2414), meaning that such object is subject to partitioning, the parameter setting unit 2330 goes on to Step S2414 without setting a flag for the four-corner variation.

When feasible variations are determined, the parameter setting unit 2330 randomly selects one of such feasible variations (S2416). Note that a random number is used here as a method for making a random selection of a feasible variation, but it is also possible to select a variation which does not overlap with that of the previously selected effect by storing all information required to carry out feasible variations and the history of effects.

When the variation is determined, the parameter setting unit. 2330 determines the width of blocks to be slide out according to the block boundary lines, and determines the order and the direction in which the blocks are slide out according to the coordinates and size of the objects (S2417). More specifically, except for the four-corner variation, when a still picture is divided into "n" blocks, a block including an object which is most closely located to the center shall be the "n"th block (to be slide out last), and a block which is located most far from such "n"th block shall be a block to be slide out first of all. Thereafter, the parameter setting unit 2330 regards the second furthest block as the second block, and the third furthest block as the third block, which continues until the "n"th number of block.

Note that the order of sliding out blocks does not necessarily have to be determined in the above manner, and therefore that it is also possible that a block that includes an object which is most closely located to the center is the fist block to be slide out. Since four blocks are slide out all at once toward four directions in the case of the four-corner variation, the order of sliding out is not required.

When the width of blocks, the order and direction of sliding out blocks, i.e. all parameters required for carrying out slide out are determined, the parameter setting unit 2330 returns to the main routine. Accordingly, the scenario including "slide out" is stored in the database 2020.

FIG. 25 is a diagram showing an example structure of a scenario 2270 stored in the database 2020. Note that the scenario 2270 is described by a script as explained above, but FIG. 25 illustrates the scenario in the table form for explanation purposes.

As shown in FIG. 25, the scenario 2270 is made up of: starting time and end time indicating a time allocation in the time domain; effect to be assigned to such allocated time domain; still picture to be assigned to each effect; and parameters. When an effect is slide out eff6, the following are described in the parameter column: a selected variation (a flag F0=1 indicating a slope variation of θ, and such θ); the width of blocks to be slide out (the position of a block boundary yBL[j] and θ that specify the blocks); the order of blocks to be slide out (B0, B1, . . . ); and the direction in which the blocks are slide out (B0: toward upper right, B1: toward lower right, . . . ).

When a scenario with the above structure is reproduced, the short film selection unit 2410 of the reproduction unit 2040 gives an instruction to read out the scenario of the short film as well as the music and still pictures defined in such scenario, and the short film reproduction unit 2420 reproduces the short film using the music and still pictures according to such scenario, so as to output such reproduced short film to the display unit 2050. In this case, the short film reproduction unit 2420 generates frame images from still pictures assigned to respective effects by performing processing defined by the respective parameters for such effects, and reproduces the short film.

As described above, according to the seventh embodiment of the present invention, a variation of an effect as well as parameters that determine the operation of such effect are determined according to the object information of still pictures.

Accordingly, it is possible to circumvent the situation in which a person's face as an object is partitioned. Moreover, even when still pictures are assigned to the same effect, it is possible to carry out an effect variation of the effect which is optimum for the respective still pictures mapped to such effect. Accordingly, from a viewer's point of view, the operation of the same effect looks different depending on a still picture mapped to such effect. As a result, even when there are same consecutive effects in a short film, they look as if they were different effects to the viewer's eyes, which increases a degree of entertainment of the short film and therefore which carries the viewer with him/her until the end of the short film without boring such viewer. Furthermore, even when different still pictures are mapped to the same effect, it is possible to select a variation from among a plurality of variations of such effect, so that the still pictures can be differently represented on a picture-by-picture basis.

Note that, in the seventh embodiment, a still picture is transformed into the rotating coordinate system in order to check whether an effect variation is feasible or not, but it is also possible to provide a template for the respective effect variations so as to judge whether it is possible to move a straight line that divides a still picture into blocks within a certain range without such straight line running over any object.

Furthermore, in order to obtain a block boundary line which slopes at an angle opposite to that shown in FIG. 23C, the rotating angle θ may just have to be changed within the range of 90°<θ<180°.

Eighth Embodiment

Next, an explanation is given of a short film generation/reproduction apparatus according to the eighth embodiment of the present invention.

Figure 26:
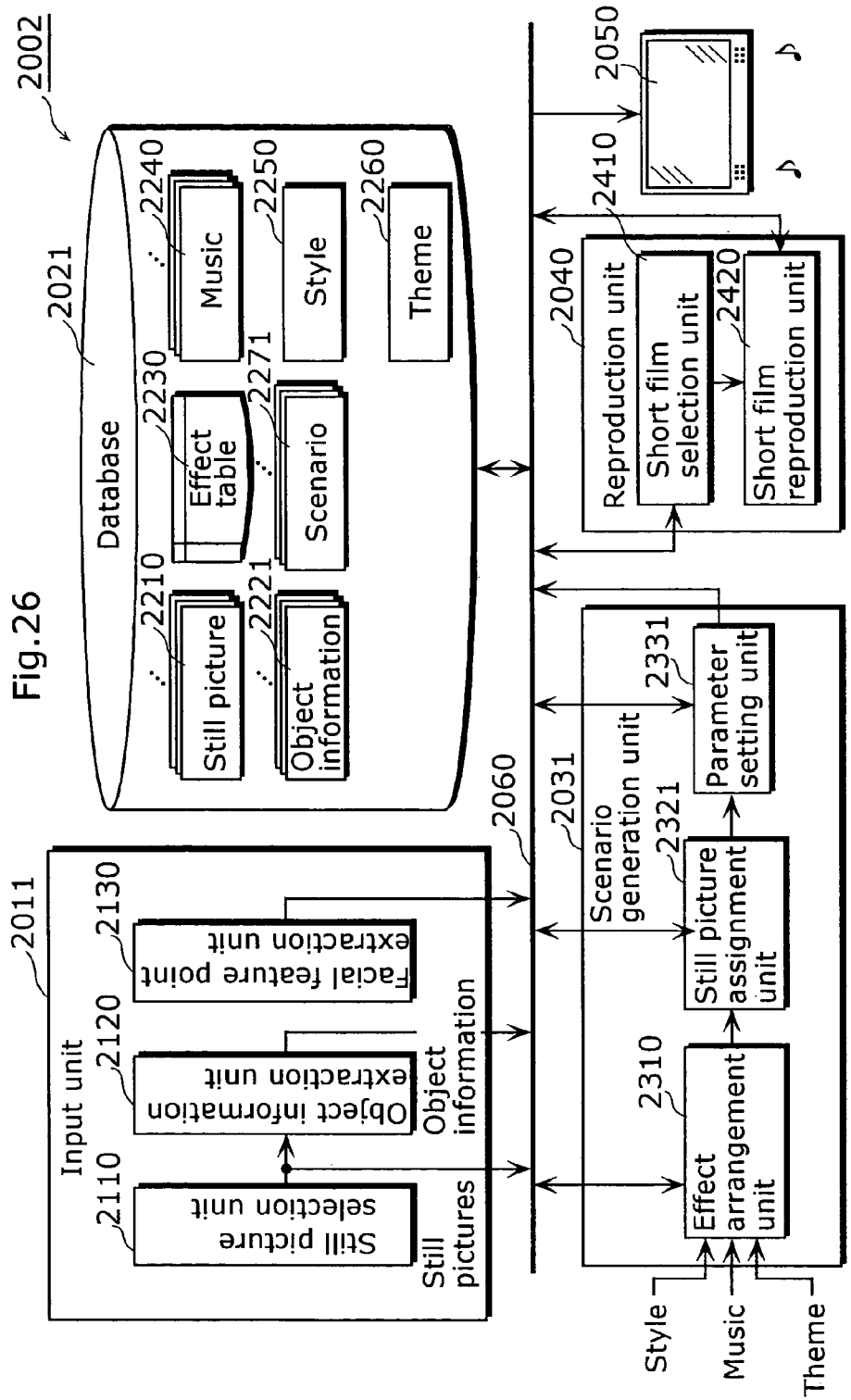
FIG. 26 is a block diagram showing a functional configuration of the short film generation/reproduction apparatus according to an eighth embodiment of the present invention.

FIG. 26 is a functional block diagram showing another configuration of the short film generation/reproduction apparatus according to the eighth embodiment of the present invention. Note that components corresponding to those in the short film generation/reproduction apparatus 2001 in the seventh embodiment are assigned the same numbers, and explanations thereof are omitted.

As shown in FIG. 26, a short film generation/reproduction apparatus 2002 is comprised of an input unit 2011, a database 2021, a scenario generation unit 2031, a reproduction unit 2040, a display unit 2050, and an internal bus 2060 and the like that connects the input unit 2011~the display unit 2050 together with one another. The input unit 2011 includes, in its configuration, a facial feature point extraction unit 2130, in addition to the still picture selection unit 2110 and the object information extraction unit 2120. The scenario generation unit 2031 includes, in its configuration, a still picture assignment unit 2321 and a parameter setting unit 2331, in addition to the effect arrangement unit 2310. Note that in FIG. 26, only the scenario generation unit 2031 that corresponds to the scenario generation unit 1117 is illustrated out of the configuration of the respective short film generation units 1105a~1105d, as in the case of the seventh embodiment.

The input unit 2010 of the short film generation/reproduction apparatus 2001 is configured to extract the position of only an object (person's face), but the input unit 2011 of the short film generation/reproduction apparatus 2002 further incorporates in it the facial feature point extraction unit 2130 for extracting facial feature points (facial parts such as eyes, nose and mouth) in addition to the configuration of the input unit 2010. This addition of the facial feature point extraction unit 2130 makes the short film generation/reproduction apparatus 2002 different greatly from the short film generation/reproduction apparatus 2001, since it becomes possible for it to prepare a scenario which supports a facial feature point-conscious effect (e.g. montage) and to reproduce a short film using such scenario.

FIGS. 27A~27G are storyboards showing an example of such effect in the short film generation/reproduction apparatus 2002.

In FIGS. 27A~27G, the storyboards shows a montage-like effect which is realized by performing a kind of vertical slide out in which blocks including the head, eyes, nose, mouth and other parts are slide out one by one.

This effect is characterized by that it can provide a montage-like visual effect by determining the width of blocks by obtaining the position and size of the eyes, nose, and mouth which are facial parts.

In order to realize such processing, an effect table 2231, object information 2221, and a scenario 2271 stored in the database 2021 are structured in a manner that enables a montage-like effect to be carried out.

To be more specific, as shown in 28, the effect table 2231 is made up of columns for effect names, columns for the number of required objects, and columns for features of the required objects. "Montage eff10" is stored in a column for an effect name, "1," or "2" is stored in a column for the number of required objects which corresponds to the montage eff10, and "head, eyes, nose and mouth" are stored in a column for features of the required objects.

Figure 29:
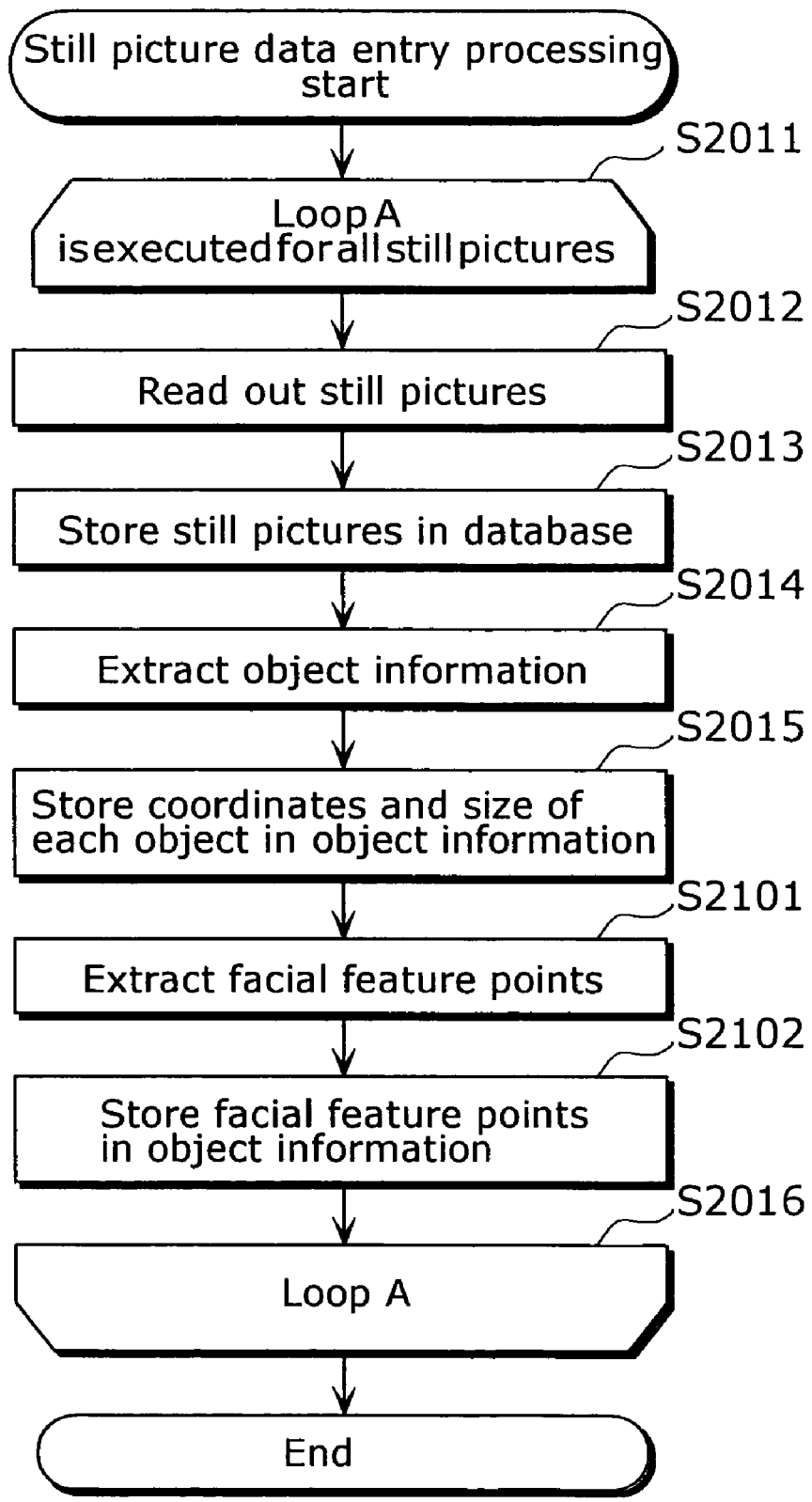
FIG. 29 is a flowchart showing an algorithm for generating object information that allows the realization of a montage-like effect.

FIG. 29 is a flowchart showing the algorithm for generating object information that allows the realization of a montage-like effect.

The still picture selection unit 2110 and the object information extraction unit 2120 repeatedly perform the following processing on all still pictures stored in the medium on a picture-by-picture basis (S2011).

First, the still picture selection unit 2110 reads still pictures stored in the medium into the memory of the short film generation/reproduction apparatus 2002 (S2012), and stores such readout still pictures in the database 2021 (S2013). Then, the object information extraction unit 2120 extracts all objects included in the above still pictures (S2014), and stores the position information (coordinates and size) and the like of the respective object in the object information (S2015).

When an object is identified as a face, the facial feature point extraction unit 2130 obtains facial feature points after obtaining the position information of the object (S2101), and stores such extracted facial feature points in the object information (S2102). Here, facial feature point information includes coordinates (more than one) of features on the face, such as the inner corner of the eyes, the outer corner of the eyes, the top of the nose, the two edges of the mouth, the beginning and end of the eye brows, and the like. Here, an existing technique may be used for extracting facial feature points, an example of which is one introduced in the section of "Applications to face recognition technology and security" in the Sensing Technology Seminar 2002 titled "Crisis management and security for peace of mind and safety" organized by the Society of Sensing Technology of Japan.

When all object information is generated, the input unit 2011 stores the object information in the database 2021. Accordingly, object information 2221 corresponding to still pictures 2210 (see FIG. 30) will be stored in the database 2021.

When all the still pictures 2210 and object information 2221 are stored in the database 2021 (S2016), the input unit 2011 terminates processing for inputting data.

FIG. 30 is a diagram showing an example structure of the object information 2221 stored in the database 2021 through the data input processing described above.

As shown in FIG. 30, the object information 2221 includes center coordinates of a circle which an extracted object is adjacent to, position information indicated by the radius size of such circle, the file name of the corresponding still picture, and features. Here, the features are the position coordinates of the inner corner of the eyes, the outer corner of the eyes, the top of the nose, the two edges of the mouth, and the beginning and end of the eye brows.

The object information 2221 with the above structure allows the obtention of the position and facial feature points of each object in all still pictures to be targets of image processing, making it possible for image processing to be performed mainly on the facial parts of each object.

Next, an explanation is given of the operation for scenario generation processing.

Figure 31:
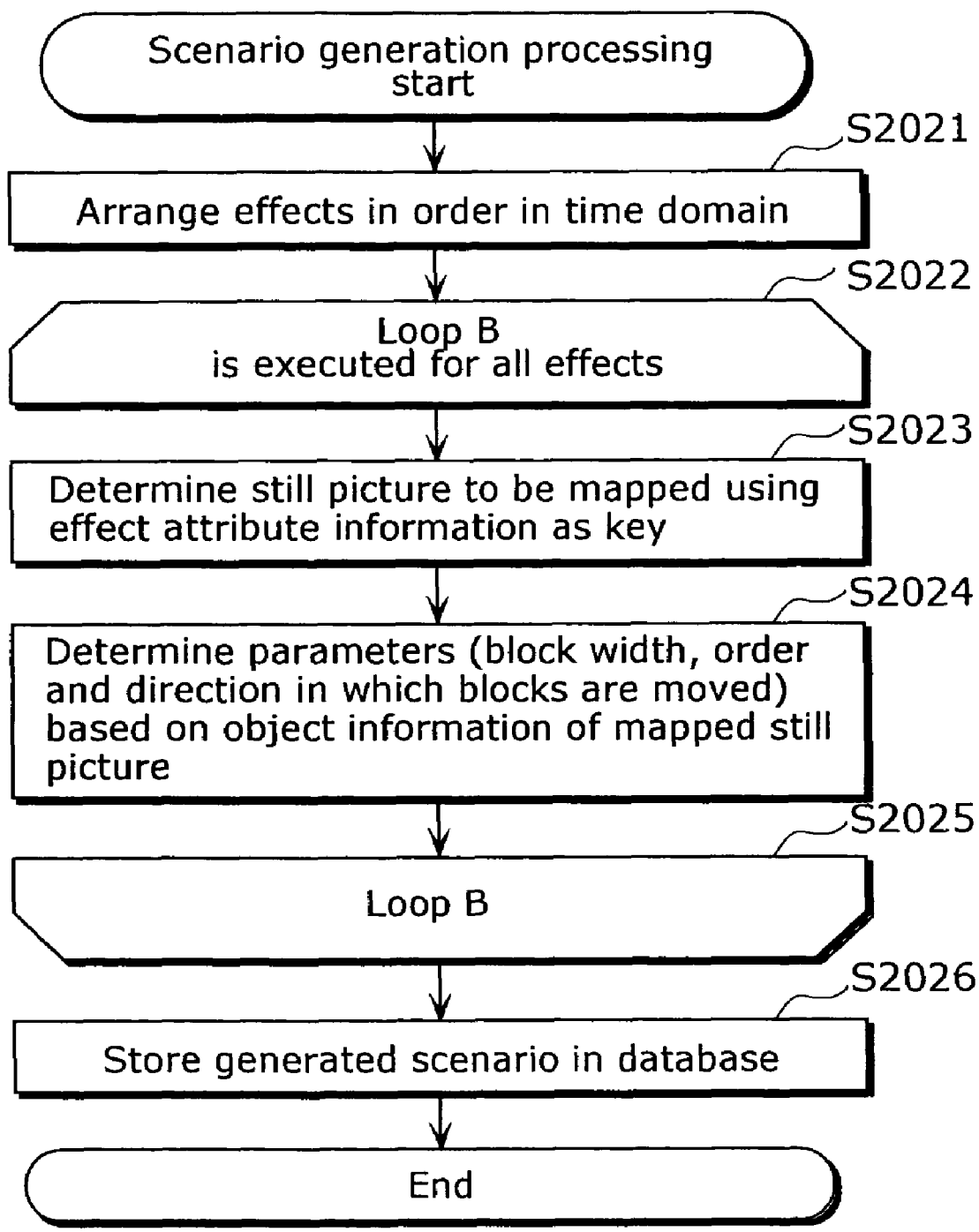
FIG. 31 is a flowchart showing an algorithm to be followed by each unit in the scenario generation unit, until a scenario is generated.

FIG. 31 is a flowchart showing the algorithm to be followed by each unit in the scenario generation unit 2031, until a scenario is generated. Note that this scenario generation processing shall be carried out after receiving a user's instruction about still pictures and the range of still pictures used in a short film as well as music, a style, and a theme used for such short film are determined.

First, the effect arrangement unit 2310 selects one effect from among a plurality of effects stored in the effect table 2230, and places it in a selected section in the time domain (S2021). To be more specific, this refers to the processing for arranging effects of "montage", and "zoom", and the like in order of appearance, in accordance with the time length of the selected music. Accordingly, a framework of the scenario is formed.

When the arrangement of effects in the time domain completes, the still picture assignment unit 2321 and the parameter setting unit 2331 determine still pictures to be mapped to all the effects arranged in the time domain, so as to set various parameters (S2022).

First, the still picture assignment unit 2321 searches for still pictures which include an required number of objects according to the object information 2221, with the number of objects and features in effect attribute information as keys, and selects one of the above searched still pictures as a still picture to be mapped (S2023). More specifically, the still picture assignment unit 2321 searches for a still picture including the number of objects as well as features required by the effect attributes, and maps such selected picture to the effect.

Next, the parameter setting unit 2331 determines parameters, based on the object information of still pictures which have been mapped (S2024). To be more specific, the parameter setting unit 2331 reads out the object information first, and then obtains, from information about the head, eyes, nose and mouth out of the facial feature points, the center of gravity coordinates and size thereof, so as to determine the width of blocks to be slide out and the order in which blocks are side out. Here, the blocks may be slide out in a random order, but it is possible to realize an effect which gives little unnatural impression to the viewer by sliding out blocks including parts other than facial parts first, which is followed by blocks including the mouth, the nose and the head respectively, and finally by sliding a block that includes the eyes. Note that block boundaries between parts are determined so that parts will be partitioned to the least, in consideration of the importance of parts as well as the center of gravity coordinates and size of the respective parts. Also note that the position information of an object is not necessarily have to be represented by the center coordinates and radius of a circle, and therefore that it can also be represented by the starting and end coordinates on one of the diagonal lines of a square.

When still pictures to be mapped and parameters for all effects are determined (S2025), it marks the completion of the scenario. Thus, the scenario generation unit 2031 stores such generated scenario in the database 2021 (S2026), and terminates the scenario generation processing.

FIG. 32 is a diagram showing an example structure of a scenario 2271 stored in the database 2021.

As shown in FIG. 32, the scenario 2271 is made up of: starting time and end time indicating a time allocation in the time domain; effect to be assigned to such allocated time domain; still picture to be assigned to each effect; and parameters. When an effect is montage, the following are described in the parameter row: the width of blocks to be slide out; the order of sliding out blocks; and the direction in which the blocks are slide out.

When the scenario 2271 with the above structure is reproduced, the short film selection unit 2410 of the reproduction unit 2040 gives an instruction to read out the scenario of the short film as well as the music and still pictures defined in such scenario, and the short film reproduction unit 2420 reproduces the short film using the music and still pictures according to such scenario, so as to output the reproduced short film to the display unit 2050. In this case, the short film reproduction unit 2420 generates, from still pictures assigned to respective effects, frame images defined by the respective parameters for such effects, and reproduces the short film. When frame images are generated, parameters that determine the position and size of blocks are determined, on the basis of information about facial parts (head, eyes, nose and mouth) from an object (face) in a still picture.

Therefore, the eighth embodiment according to the present invention is capable of generating a visual effect with an increasingly high degree of entertainment, without giving any unnatural impressions to the viewer, even when an effect in which a face as an object is partitioned into blocks.

Note that, as shown in FIG. 33A, when a still picture mapped to montage includes faces of two persons, montage-like processing may be performed in the following manner (see FIG. 33C~33H): trim the face portion of such two persons; perform normalization so that the sizes of the faces will be approximately the same; adjust the positions of respective parts of the two objects and overlay two pictures (see FIG. 33B); and slide out blocks of the upper picture where facial parts are included on a block-by-block basis, so as to allow the bottom picture to appear as if it was a montage photo.

Through the above processing, it is possible to produce a visual effect with a higher degree entertainment.

Ninth Embodiment

Figure 34:
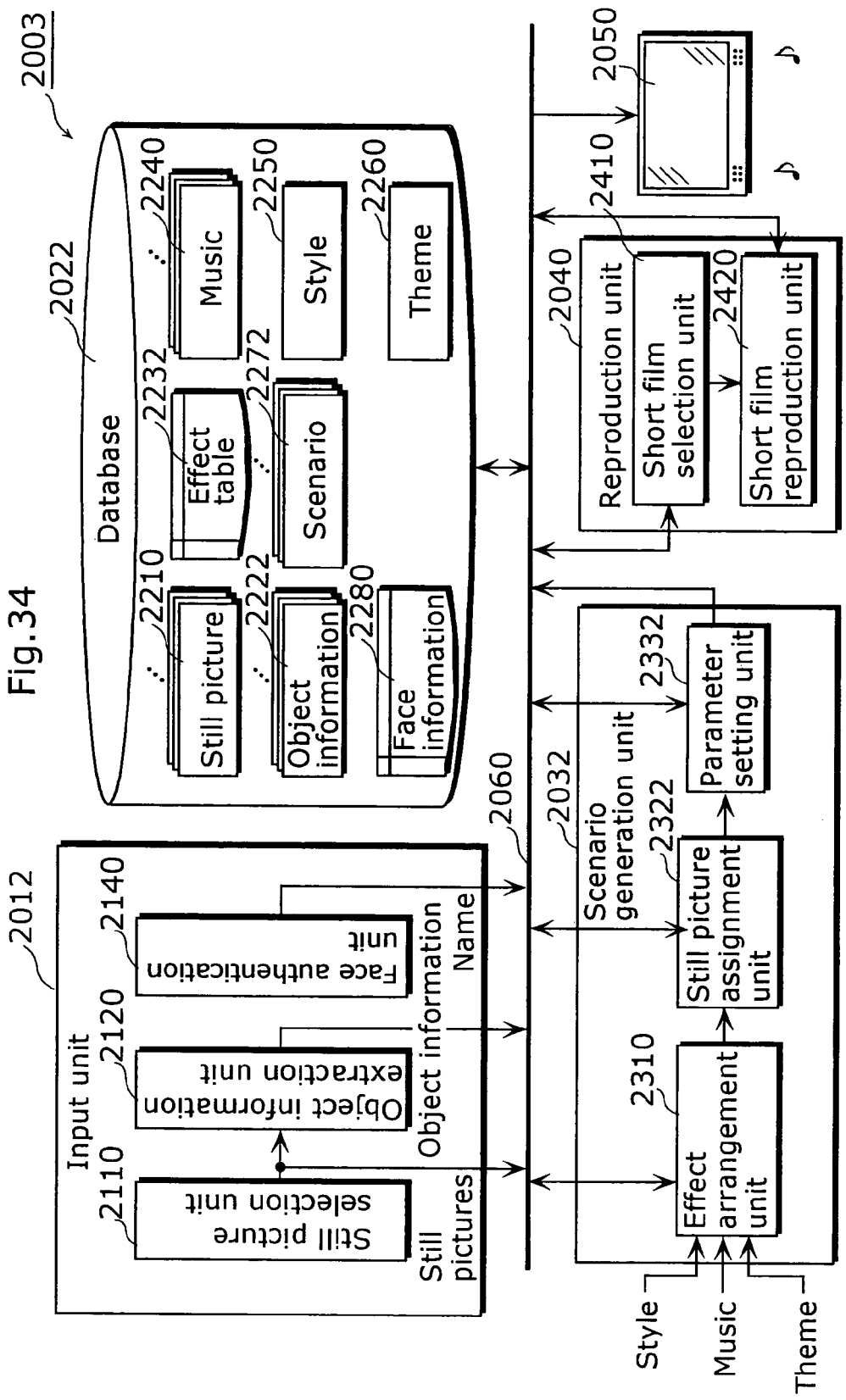
FIG. 34 is a block diagram showing a functional configuration of a short film generation/reproduction apparatus according to a ninth embodiment of the present invention.

FIG. 34 is a functional block diagram showing the configuration of a short film generation/reproduction apparatus 2003 according to the ninth embodiment of the present invention.

As shown in FIG. 34, the short film generation/reproduction apparatus 2003 is comprised of an input unit 2012, a database 2022, a scenario generation unit 2032, a reproduction unit 2040, a display unit 2050, and an internal bus 2060 and the like that connects the input unit 2012~the display unit 2050 together with one another. Note that components corresponding to those in the short film generation/reproduction apparatus 2001 in the seventh embodiment are assigned the same numbers, and explanations thereof are omitted. Also note that in 34, only the scenario generation unit 2032 that corresponds to the scenario generation unit 1117 is illustrated out of the configuration of the respective short film generation units 1105a~1105d, as in the case of the seventh and eighth embodiments.

The input unit 2012 includes, in its configuration, a face authentication unit 2140, in addition to the still picture selection unit 2110 and the object information extraction unit 2120. Meanwhile, the scenario generation unit 2032 includes, in its configuration, a still picture assignment unit 2322 and a parameter setting unit 2332, in addition to the effect arrangement unit 2310.

The input unit 2010 of the short film generation/reproduction apparatus 2001 is configured to extract the position of only an object (person's face), but the input unit 2012 of the short film generation/reproduction apparatus 2003 further incorporates in itself the face authentication unit 2140 for identifying who such object is, in addition the configuration of the input unit 2010. This addition of the face authentication unit 2140 makes the short film generation/reproduction apparatus 2003 different greatly from the short film generation/reproduction apparatus 2001, since it becomes possible for it to prepare a scenario which supports an effect that is conscious of a person authenticated by the face authentication unit 2140 (e.g. spotlight) and to reproduce a short film using such scenario.

The face authentication unit 2140 checks a face detected in a still picture with face information 2280 which is stored in advance in the database 2022, in order to identify whose face that is, and additionally stores such person's name in the object information together with the face information. An existing face authentication technique can be employed for the face authentication unit 2140. Application software employing face authentication techniques has been commercialized by a number of companies, which include OMRON Corporation that produces "FaceKey" and NEC Corporation that produces "NeoFace". The face authentication unit 2140 can use one of these techniques which are used for security systems and which are capable of checking a face which has been obtained from an image with face images registered in advance, and unlocking the door when such face is authenticated as the face of a registered person.

Figure 35:
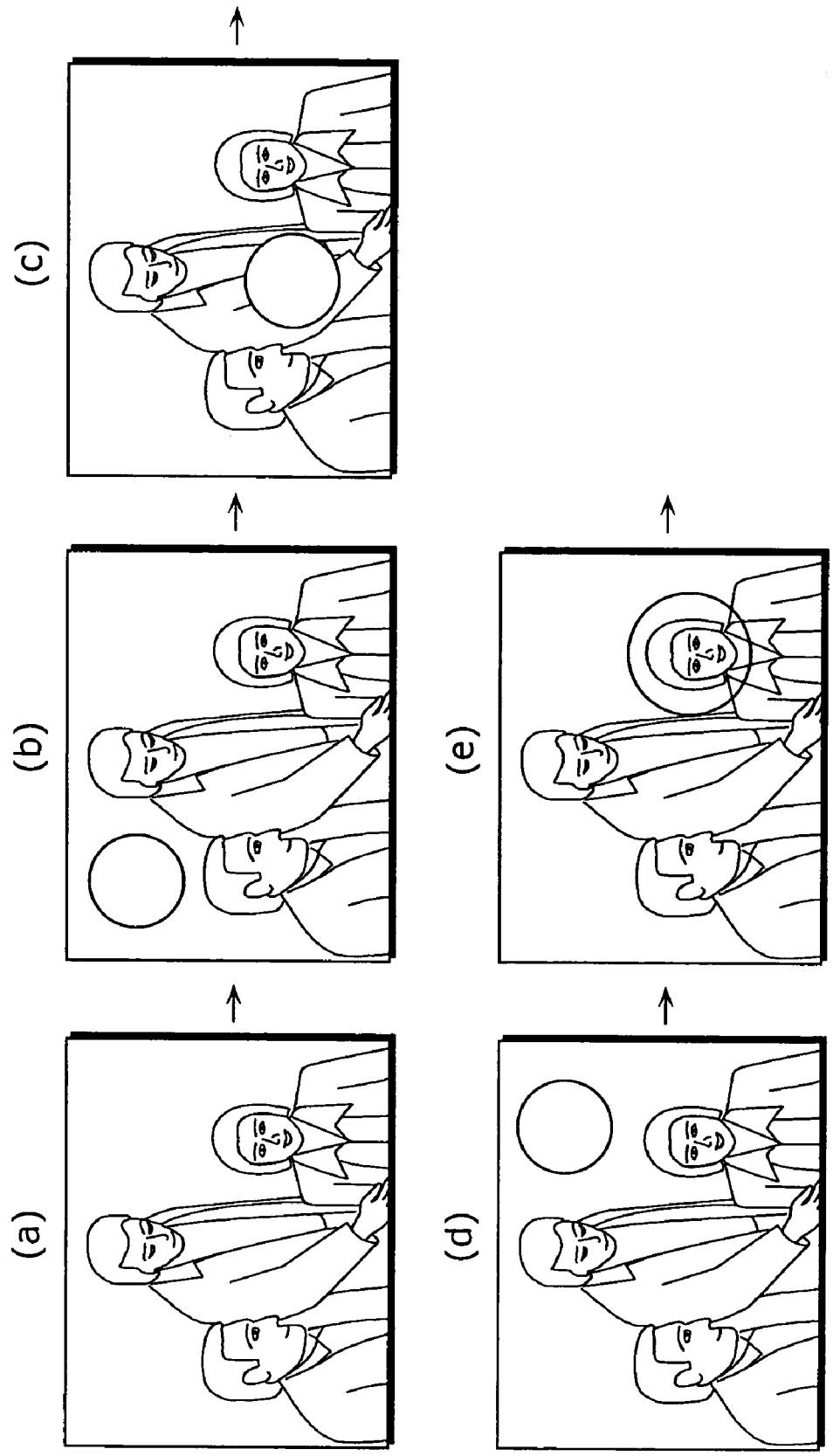
FIG. 35 is a diagram showing storyboards illustrating an example of an effect (spotlight) that puts focus on a specific person.

FIG. 35 is a diagram showing storyboards that illustrate an example of an effect (spotlight) that puts focus on a specific person. These storyboards illustrate an effect in which the spotlight moves around over a still picture (see (b)~(d) in FIG. 35) in which there are three persons (Stewart, Nash and Nikita from the left; see (a) in FIG. 35), and the spotlight focuses on Nikita at last (see (e) in FIG. 35). With this effect, it is possible to attract a viewer's attention solely to Nikita even when there are more than one person including Nikita in the picture. Therefore, Nikita can be a main person in a short film to be generated.

This effect is characterized by that it can provide a visual effect for focusing the spotlight on a specific person by identifying who such person is.

In order to realize such processing, an effect table 2232, object information 2222, and a scenario 2272 stored in the database 2022 are structured in a manner that allows an effect to focus the spotlight on a specific person.

To be more specific, as shown in FIG. 36, the effect table 2232 is made up of columns for effect names, columns for the number of required objects, and columns indicating whether it is possible to focus on one person. Either "OK" or "NO" is stored in a column indicating focusability on one person. For example, "OK" is stored when an effect is spotlight eff1, in which case it is possible to obtain a visual effect for putting focus on one person.

Figure 37:
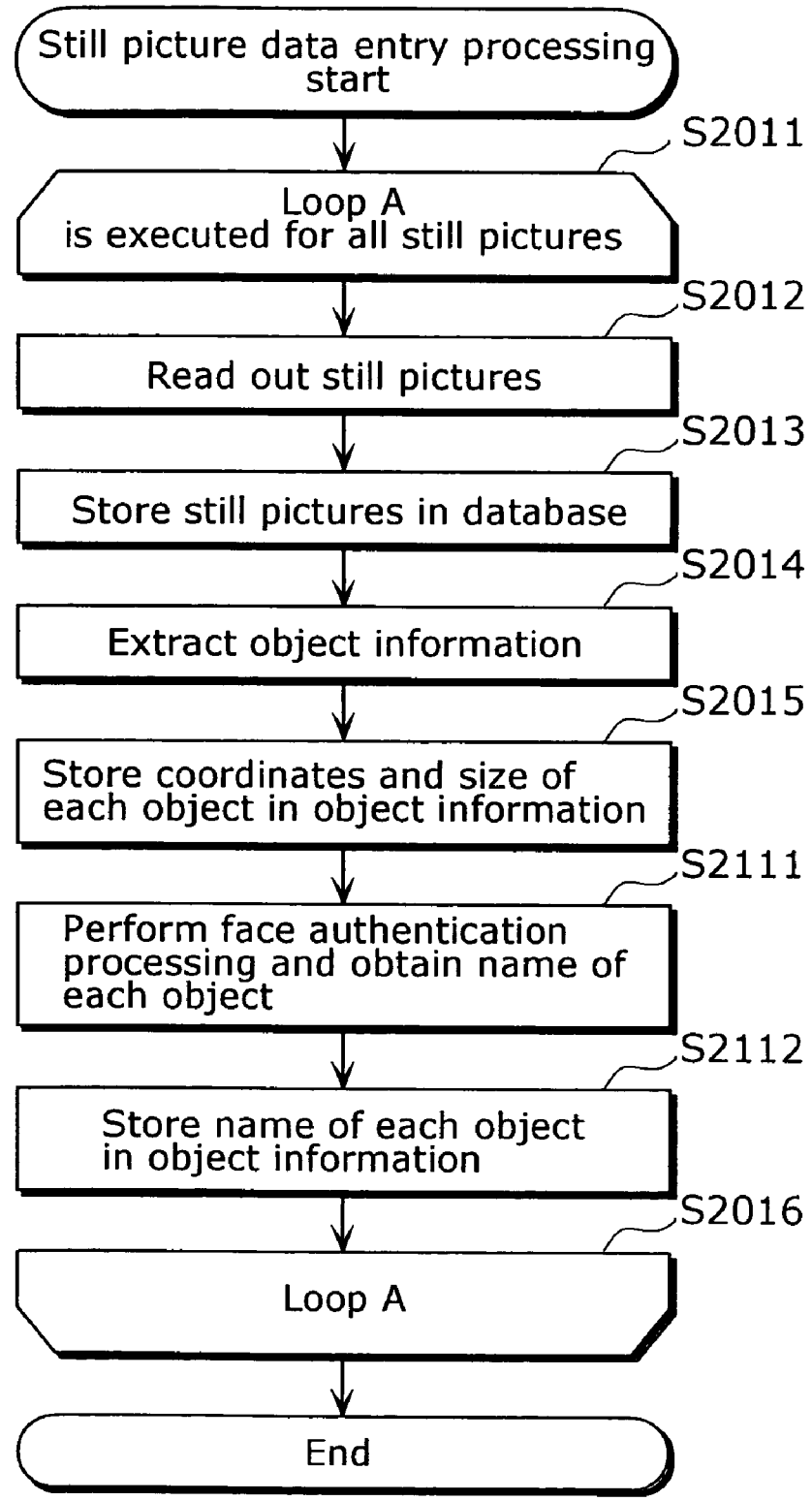
FIG. 37 is a flowchart showing an algorithm for generating object information that allows the realization of an effect for putting a spotlight on one person.

FIG. 37 is a flowchart showing the algorithm for generating object information that allows the realization of an effect for putting the spotlight on one person.

The still picture selection unit 2110, the object information extraction unit 2120 and the face authentication unit 2140 repeatedly perform the following processing on all still pictures stored in the medium on a picture-by-picture basis (S2011).

First, the still picture selection unit 2110 reads still pictures stored in the medium into the memory of the short film generation/reproduction apparatus 2003 (S2012), and stores such readout still pictures in the database 2022 (S2013). Then, the object information extraction unit 2120 extracts all objects included in the above still pictures, and stores object information including the position information and the like of the respective objects (S2014 and S2015).

When objects are identified as faces, the face authentication unit 2140 performs face authentication and obtains the names of the respective objects, after obtaining the position information of such respective objects (S2111), so as to store such obtained names in the object information (S2112). To be more specific, the face authentication unit 2140 compares the face information 2280 used for identifying individuals stored in advance in the database 2022 with face information provided by the object information extraction unit 2120, so as to search for the names of the objects. When such names are found, the face authentication unit 2140 additionally stores, in the database 2022, such names as part of the object information together with the face information. Needless to say, the face authentication unit 2140 stores no names when the above names are not found.

When all object information is generated, the input unit 2012 stores the object in formation in the database 2022. Accordingly, object information 2222 of the respective still pictures 2210 (see FIG. 38) will be stored in the database 2022.

When all the still pictures 2210 and object information 2222 are stored in the database 2022 (S2216), the input unit 2012 terminates processing for inputting data.

FIG. 38 is a diagram showing an example structure of the object information 2222 which has been stored in the database 2022 through the data input processing described above.

As shown in FIG. 38, the object information 2222 includes center coordinates of a circle which each of the extracted objects is adjacent to, position information indicated by the radius size of the respective circles, the file name of the corresponding still picture, and object names.

The object information 2222 with the above structure allows the obtention of the position and name of each object in all still pictures to be targets of image processing, making it possible for image processing to be performed mainly on an object whose name has been specified by the user.

Figure 39:
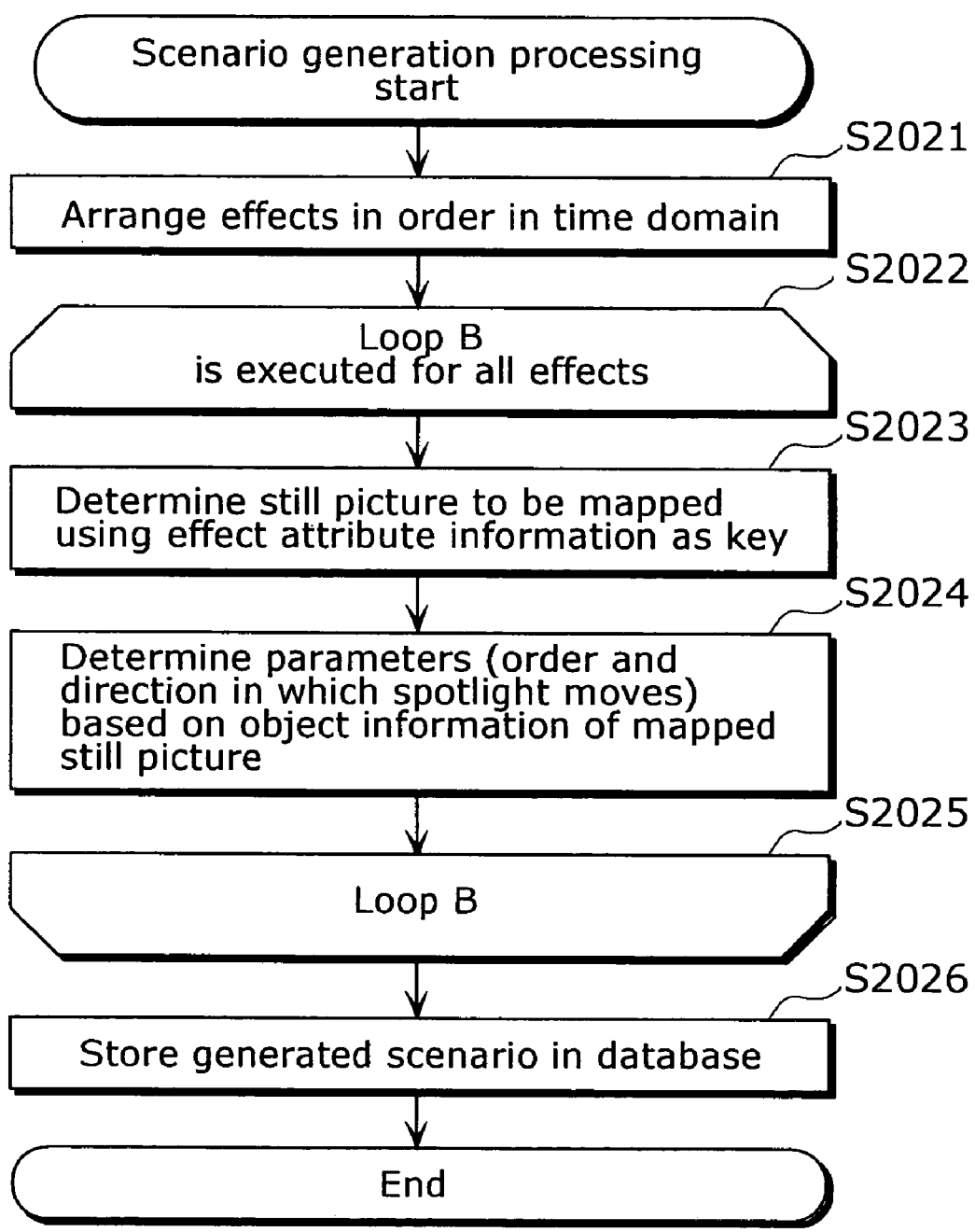
FIG. 39 is a flowchart showing an algorithm to be followed by each unit in the scenario generation unit, until a scenario is generated.

FIG. 39 is a flowchart showing the algorithm to be followed by each unit in the scenario generation unit 2032, until a scenario is generated. Note that this scenario generation processing shall be carried out after receiving a user's instruction about still pictures and the range of still pictures used in a short film as well as music, a style, and a theme used for such short film are determined.

First, the effect arrangement unit 2310 selects one effect capable of providing a visual effect for focusing on one person from among a plurality of effects stored in the effect table 2232, and places it in a selected section in the time domain (S2021). To be more specific, this refers to the processing for arranging effects of "spotlight", and "zoom", and the like in order of appearance, in accordance with the time length of the selected music. Accordingly, a framework of the scenario is formed.

When the arrangement of effects in the time domain completes, the still picture assignment unit 2322 and the parameter setting unit 2332 search the database 2022 for still pictures that include Nikita, determine still pictures to be mapped to all the effects arranged in the time domain, and set various parameters (S2022). Here, still pictures to be searched may include not only Nikita alone but also other people as long as Nikita is included.

First, the still picture assignment unit 2322 searches for still pictures which include a required number of objects according to the effect table 2232, with the effect attribute information as a key, and selects one of the above searched still pictures as a still picture to be mapped (S2023). More specifically, the still picture assignment unit 2322 searches for a still picture that includes the number of objects required by the attributes of an effect and that shows focusability on one person (Nikita), and maps such selected picture to the effect.

Next, the parameter setting unit 2332 determines parameters, based on the object information of the above mapped still picture (S2024). To be more specific, the parameter setting unit 2332 reads out the object information, and sets the position and size of the face of Nikita included in such object information, so as to determine the position to be finally reached by the spotlight (destination). Note that, when an effect is not spotlight but slide out, it is possible to show Nikita for a longer period of time and therefore to give a strong impression about Nikita to the viewer of a short film by making a setting that allows the block including the face of Nikita to be slide out in the end. Meanwhile, when an effect is slide in, it is possible to show Nikita for a longer period of time and therefore to give a strong impression about Nikita to the viewer by making a setting that allows the block including the face of Nikita to be slide in first of all.

When still pictures to be mapped and parameters for all effects are determined (S2025), it marks the completion of the scenario. Thus, the scenario generation unit 2032 stores such generated scenario in the database 2022 (S2026), and terminates the scenario generation processing.

FIG. 40 is a diagram showing an example structure of a scenario 2272 stored in the database 2022.

As shown in FIG. 40, the scenario 2272 is made up of: starting time and end time indicating a time allocation in the time domain; effect to be assigned to such allocated time domain; still picture to be assigned to each effect; and parameters. When an effect is spotlight, a parameter row describes "object to put spotlight on" (including its position and size).

When the scenario 2272 with the above structure is reproduced, the short film selection unit 2410 of the reproduction unit 2040 gives an instruction to read out the scenario of the short film as well as the music and still pictures defined in such scenario, and the short film reproduction unit 2420 reproduces the short film using the music and still pictures according to such scenario, so as to output the reproduced short film to the display unit 2050. In this case, the short film reproduction unit 2420 generates, from still pictures assigned to the respective effects, frame images defined by the respective parameters for such effects and reproduces the short film. When frame images are generated, parameters to be determined are ones that enable the spotlight to focus on the position in which an object (face) specified by the name of a still picture is located.

As described above, according to the ninth embodiment of the present invention, the face authentication unit 2140 is capable of recognizing the names of objects in a still picture. Thus, by using a picture including an arbitrary person, it is possible to execute an effect for putting focus on such person. Accordingly, a short film that focuses on an arbitrary person is generated, the short film being capable of serving the purpose of reproduction. For example, when a short film is reproduced at a wedding reception where main persons are the bride and groom, it is preferable that the short film is focusing on the bride and groom, even when such short film uses pictures that include many friends of them in addition to the bride and groom. However, by the use of the short film generation/reproduction apparatus 2003 according to the ninth embodiment of the present invention, it becomes possible to easily generate a short film that puts focus on the bride and groom, since it is capable of selecting pictures that include the bride and groom and then setting such bride and groom as principal objects in an effect.

Tenth Embodiment

Figure 41:
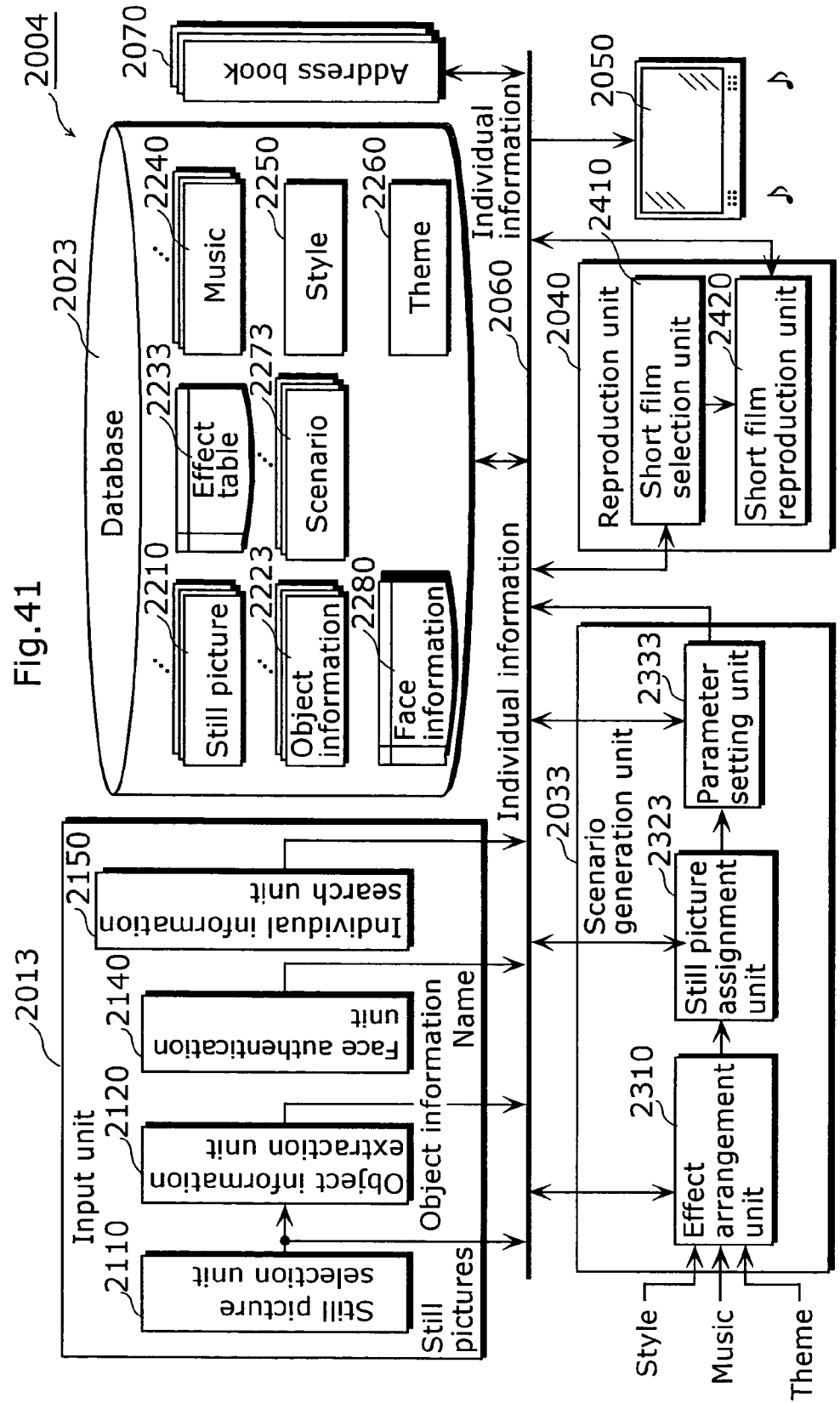
FIG. 41 is a block diagram showing a functional configuration of a short film generation/reproduction apparatus according to a tenth embodiment of the present invention.

FIG. 41 is a functional block diagram showing the configuration of a short film generation/reproduction apparatus 2004 according to the tenth embodiment of the present invention.

As shown in FIG. 41, the short film generation/reproduction apparatus 2004 is comprised of an input unit 2013, a database 2023, a scenario generation unit 2033, a reproduction unit 2040, a display unit 2050, and an internal bus 2060 and the like that connects the input unit 2013~the display unit 2050 together with one another. Note that components corresponding to those in the short film generation/reproduction apparatus 2003 in the ninth embodiment are assigned the same numbers, and explanations thereof are omitted. Also note that in FIG. 41, only the scenario generation unit 2033 that corresponds to the scenario generation unit 1117 is illustrated out of the configuration of the respective short film generation units 1105a~1105d, as in the case of the seventh and eighth embodiments.

The input unit 2012 of the ninth embodiment obtains the name of an object through the face authentication unit 2140. However, the tenth embodiment is greatly different from the ninth embodiment in that the input unit 2013 further includes an individual information search unit 2150 for searching a lookup table (e.g. address book) in which the names and personal data of objects are stored, by the use of a name obtained by the face authentication unit 2140 and in that the short film generation/reproduction apparatus 2004 is capable of adding, as object information, the attributes (e.g. sex, age, hobby, and affiliation) of an object in a still picture, so as to provide a short film with an increased degree of enjoyment and entertainment as an added-value using such added object information, even when some of still pictures are assigned to the same effect.

Figure 42:
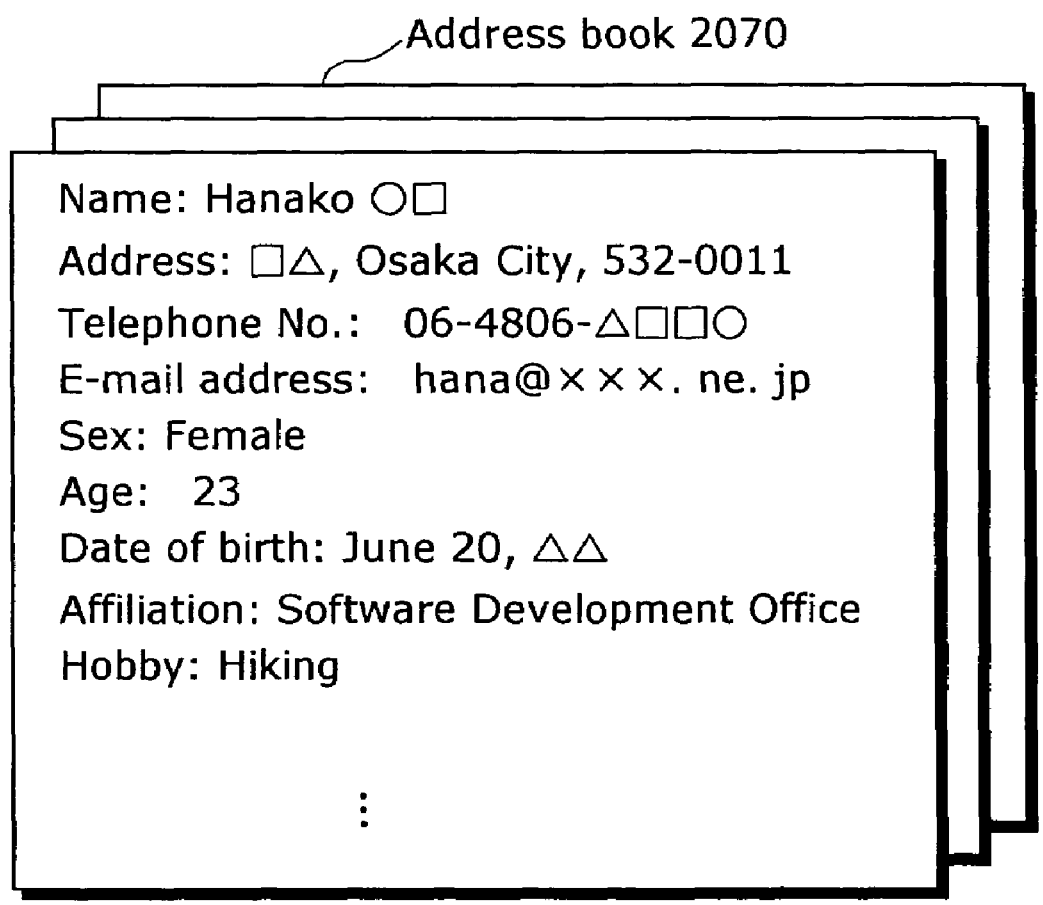
FIG. 42 is a diagram showing an example structure of an address book.

As shown in FIG. 42, an address book 2070 is made up of name and other attributes such as address, telephone number, e-mail address, sex, age, date of birth, affiliation, and hobby.

Figure 43A:
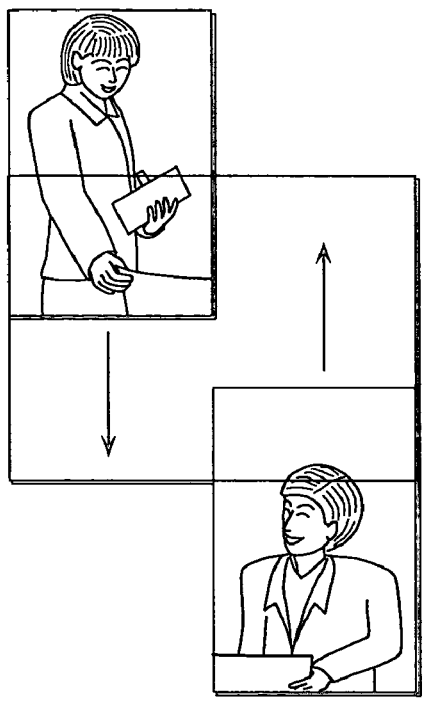
FIGS. 43A~43D are storyboards showing an example of an effect that takes sexes (man-woman) into account.
Figure 43B:
Figure 43C:
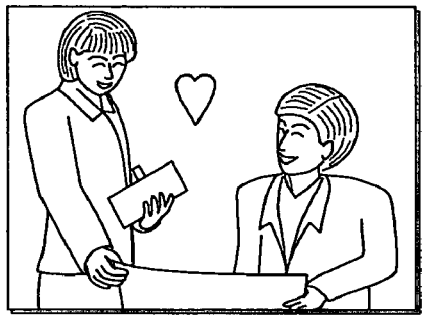
Figure 43D:
Figure 44A:
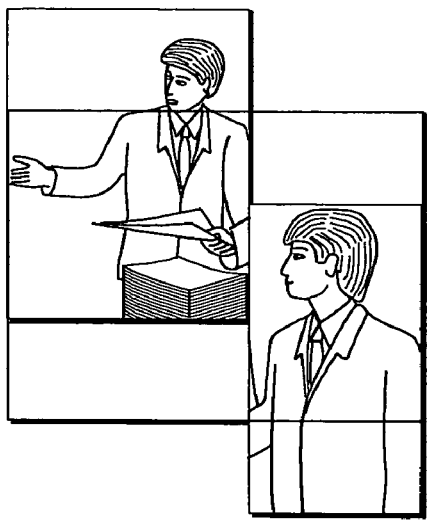
FIGS. 44A~44D are storyboards showing an example of an effect that takes sexes (man-man) into account.
Figure 44B:
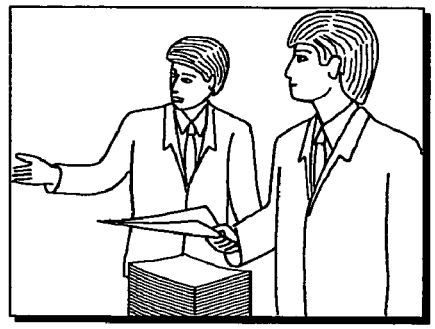
Figure 44C:
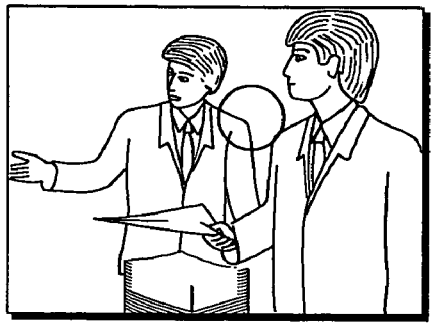
Figure 44D:
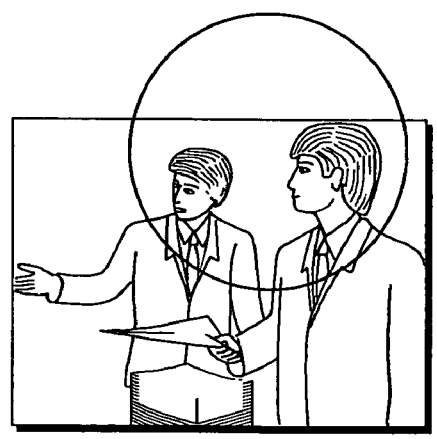

FIGS. 43A~43D are storyboards showing an example of an effect that takes into account the sex of an object. Unlike an existing "slide in" effect, this effect is capable of showing a character (heart mark in FIGS. 43C and 43D) which is indicative of the relationship between objects, when one of them is a man and the other is a woman. In this effect, a block including the man's face and a block including the woman's face are slide in together to form a picture (FIGS. 43A and 43B). Then, a character indicative of the relationship between them (e.g. heart mark) is displayed (FIGS. 43C and 43D). In contrast, as shown in FIGS. 44A~44D, when two objects in a still picture are not a man and a woman, a focus is put on the two person's faces using a normal circle.

In order to realize such processing, an effect table 2233, object information 2223, and a scenario 2273 stored in the database 2023 are structured in a manner that enables an effect to take into account the sex of a specific person.

To be more specific, as shown in FIG. 45, the effect table 2233 is made up of columns for effect names, columns for the number of required objects, columns for the sex of required objects and columns for characters. In columns for the sex of required objects, "1 man and 1 woman", "other combination possible" and the like are stored, whereas in columns for characters, "heart mark" is stored when a pair of objects is made up of a man and a woman and "◯" is stored when a pair of objects is made up of another combination of sexes. Accordingly, it is possible to provide a visual effect for displaying a character suitable for a combination of sexes.

Figure 46:
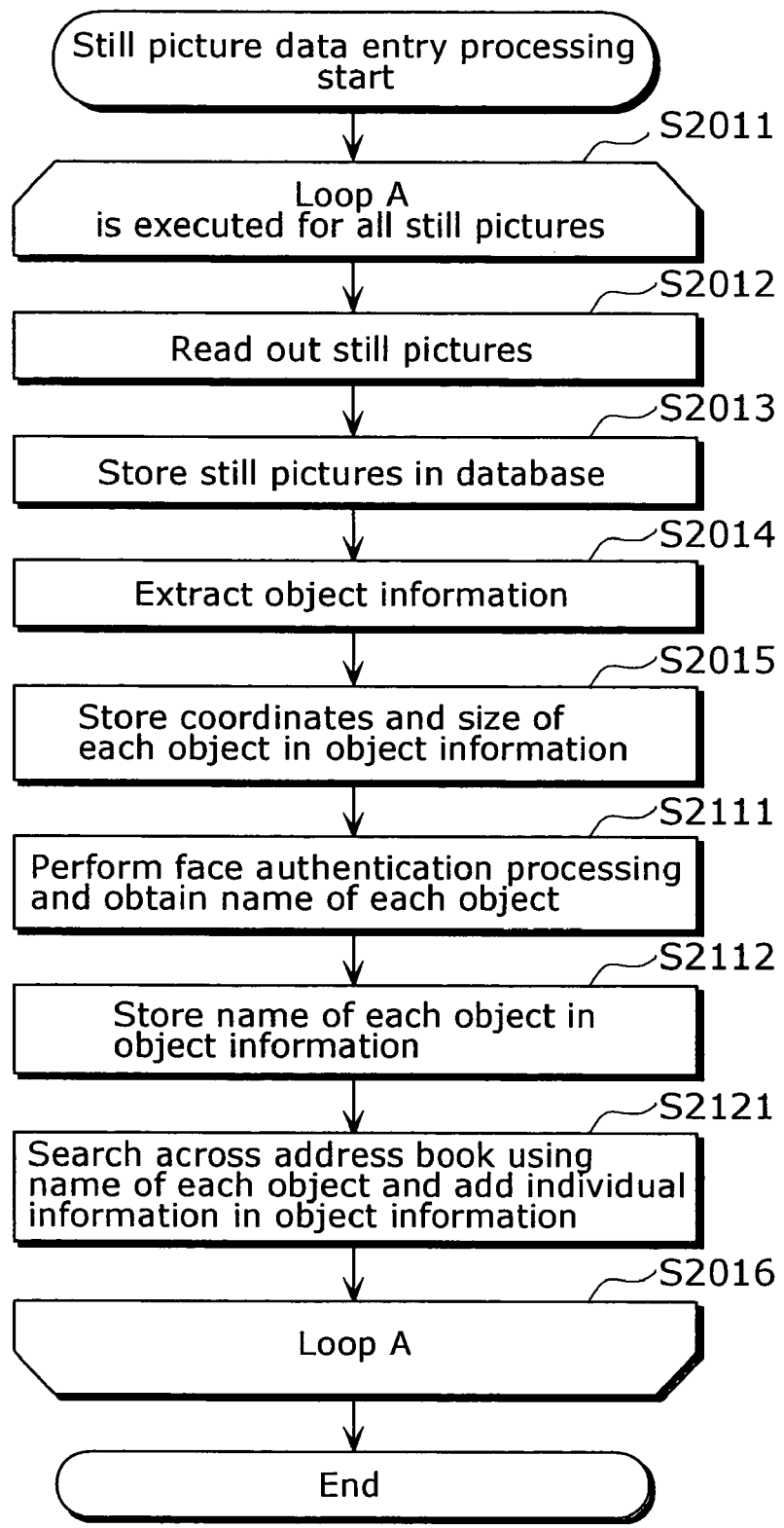
FIG. 46 is a flowchart showing an algorithm for generating object information that allows the realization of an effect for changing characters to be displayed depending on a combination of sexes.

FIG. 46 is a flowchart showing the algorithm for generating object information that allows the realization of an effect for changing characters to be displayed depending on a combination of sexes.

The still picture selection unit 2110, the object information extraction unit 2120, the face authentication unit 2140, and the individual information search unit 2150 repeatedly perform the following processing on all still pictures stored in the medium on a picture-by-picture basis (S2011).

First, the still picture selection unit 2110 reads still pictures stored in the medium into the memory of the short film generation/reproduction apparatus 2004 (S2012), and stores such readout still pictures in the database 2023 (S2013). Then, the object information extraction unit 2120 extracts all objects included in the above still pictures, and stores object information including the position information and the like of the respective objects (S2014 and S2015).

When objects are identified as faces, the face authentication unit 2140, after obtaining the position information of the objects, performs face authentication and obtains the name of each object (S2111), so as to store such obtained names in the object information 2223 (S2112).

When the above names are stored, the individual information search unit 2150 searches across the address book 2070 with reference to the names, and adds individual information corresponding to such names to the object information 2223 (S2121). When all object information is generated, the input unit 2013 stores the object information 2223 in the database 2023. Accordingly, the object information 2223 corresponding to the respective still pictures 2210 (see FIG. 47) will be stored in the database 2023.

When all the still pictures 2210 and object information 2223 are stored in the database 2023 (S2016), the input unit 2013 terminates processing for inputting data.

FIG. 47 is a diagram showing an example structure of the object information 2223 stored in the database 2023 through the data input processing described above.

As shown in FIG. 47, the object information 2223 is made up of center coordinates of a circle which each of the extracted objects is adjacent to, position information indicated by the radius size of the respective circles, the file name of the corresponding still picture, names of objects, and individual information, that is, object attributes.

The object information 2223 with the above structure allows the obtention of the position and name, and the like of each object in all still pictures to be targets of image processing, making it possible for image processing to be performed mainly on a pair of objects whose sexes have been specified by the user.

Figure 48:
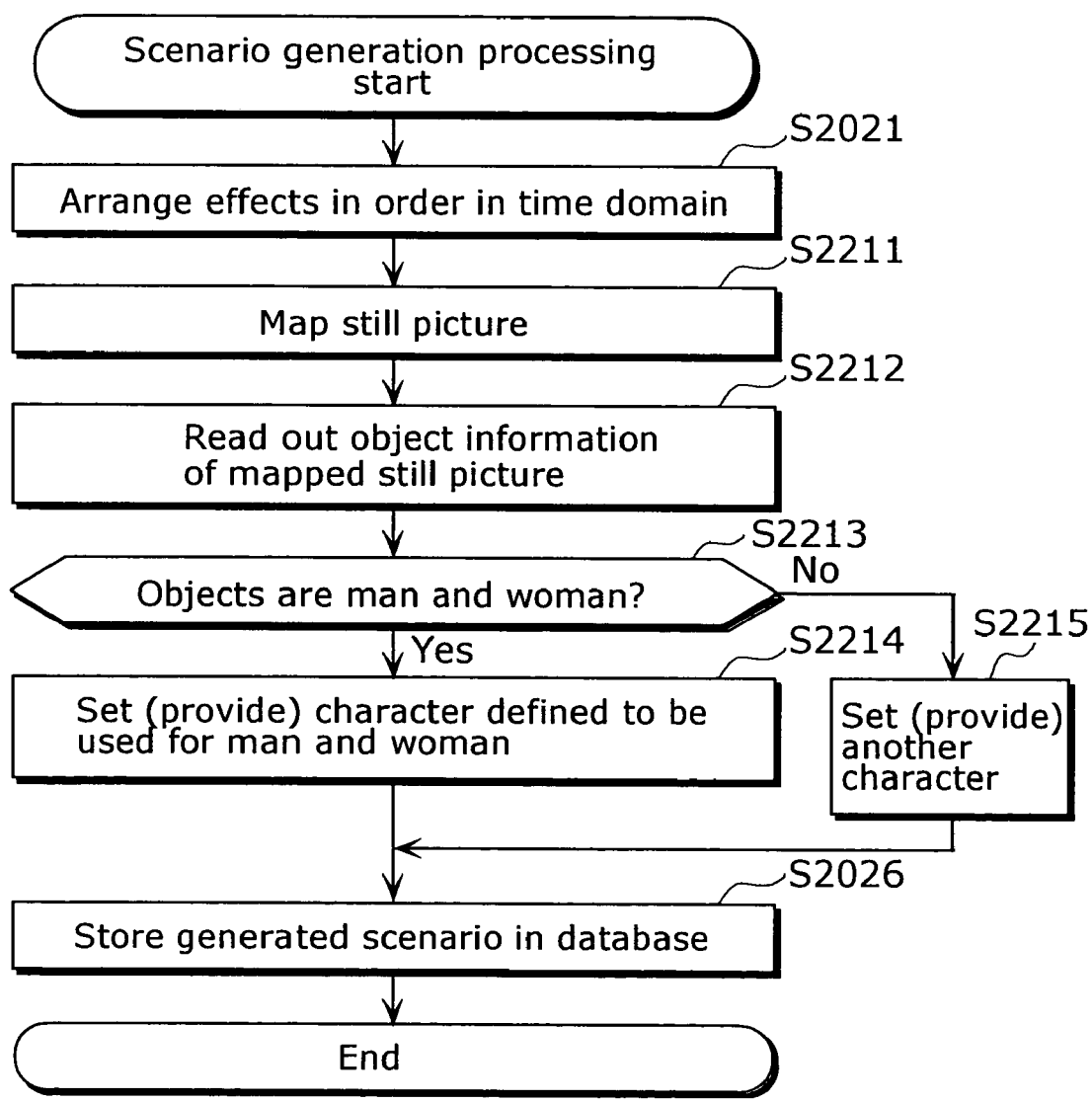
FIG. 48 is a flowchart showing an algorithm to be followed by each unit in the scenario generation unit, until a scenario is generated.

FIG. 48 is a flowchart showing the algorithm to be followed by each unit in the scenario generation unit 2033, until a scenario is generated. Note that this scenario generation processing shall be carried out after receiving a user's instruction about still pictures and the range of still pictures used in a short film as well as music, a style, and a theme used for such short film are determined.

First, the effect arrangement unit 2310 selects one effect capable of providing a visual effect suitable for a user-specified pair of object sexes from among a plurality of effects stored in the effect table 2233, and places it in a selected section in the time domain (S2021). To be more specific, this refers to the processing for arranging effects of "still", and "zoom", and the like in order of appearance, in accordance with the time length of the selected music. Accordingly, a framework of the scenario is formed.

When the arrangement of effects in the time domain completes, the still picture assignment unit 2323 searches for still pictures that match a user-specified combination of sexes, determines still pictures to be mapped to all the effects arranged in the time domain, and sets various parameters (S2211). More specifically, effect attributes are features of a still picture which is suited to be mapped to each effect. Here, the number of objects=2, and the sexes of such objects are 1 man and 1 woman. Here, a still picture to be searched may include not only two persons who match the user-specified combination of sexes, but also other people including such couple.

When the mapping completes, the parameter setting unit 2333 judges whether objects in a still picture are a pair of a man and a woman or another combination, on the basis of object information of such mapped still picture (S2213). When the objects in the still picture are a man and a woman (Yes in S2213), heart mark is assigned which is a character defined to be used for a pair of objects made up of a man and a woman (S2214). When the objects are made up of another combination (No in S2213), "○" is assigned which is a character defined to be used for a pair of another combination of sexes (S2215).

When characters to the still pictures are all assigned, it marks the completion of the scenario. Thus, the scenario generation unit 2033 stores such generated scenario in the database 2023 (S2026), and terminates the scenario generation processing.

When the scenario 2273 with the above structure is reproduced, the short film selection unit 2410 of the reproduction unit 2040 gives an instruction to read out the scenario of the short film as well as the music and still pictures defined in such scenario, and the short film reproduction unit 2420 reproduces the short film using the music and still pictures according to such scenario, so as to output the reproduced short film to the display unit 2050. In this case, the short film reproduction unit 2420 generates, from still pictures assigned to the respective effects, frame images defined by the respective parameters for such effects, and reproduces the short film. When frame images are generated, a character is determined, the character being specified by a combination of sexes of objects in a still picture.

Note that, in the tenth embodiment, the sex of an object is used as an attribute of the object, but it is also possible to generate a scenario by the use of the age, data of birth or other attributes as well as to display the name, age, data of birth, or other attributes together with a character.

As described above, according to the tenth embodiment of the present invention, by making a link to the address book using the name of an object in a still picture obtained by the face authentication unit 2140, it is possible to add, to object information, a variety of attributes (sex, age, affiliation, and hobby, and the like) associated with the name. Thus, the use of such information allows the discovery of a new aspect of entertainment even when the same effect is concerned.

Note that, in the seventh~tenth embodiments, an explanation is given for the case where an object is a person's face, but the present invention is not limited to this, and therefore that the present invention is also applicable to all sorts of objects such as the whole body of a person, animal (e.g. dog, cat), fruits (e.g. apple, lemon), personal property (desk, chair), and fixed property (e.g. sightseeing guide map).

Also, in the seventh embodiment, the still picture assignment unit 2320 assigns still pictures including the number of objects required by each of effects placed in the time domain by the effect arrangement unit 2310 on an effect-by-effect basis, according to the object information stored in the database 2020. However, the still picture assignment unit 2320 in the tenth embodiment may assign still pictures satisfying at least one of the object's type, color, shape and the number of objects required by the respective effects. In this case, the object information extraction unit 2120 shall extract the color and shape of objects.

Moreover, it is also possible that the still picture assignment unit 2320 assigns still pictures that satisfy picture features (an indicator of color shade, color spread, color position, brightness, brightness position, and the like) required by the respective effects. In this case, the input unit 2013 calculates a color histogram, a frequency histogram, and the like on a picture-by-picture basis, so as to extract, in advance, the picture features of the respective still pictures.

Eleventh Embodiment

Next, an explanation is given of the case where a scenario, or a short film, is generated by selecting effect blocks.

In the first~tenth embodiments, an effect, that is, a basic effect indicating one motion to be specified from a visual standpoint (e.g. pan, still, wipein) is selected from among a group of effects. The eleventh embodiment, on the other hand, is greatly different from the first~tenth embodiments in that an effect block is selected from among a group of effect blocks, each being made up of a sequence of one or more basic effects.

In the database, music, pictures, and a group of effect blocks are stored. Music and pictures include musical features and picture features as meta-data respectively, in addition to the real content as music and pictures.

Figure 49:
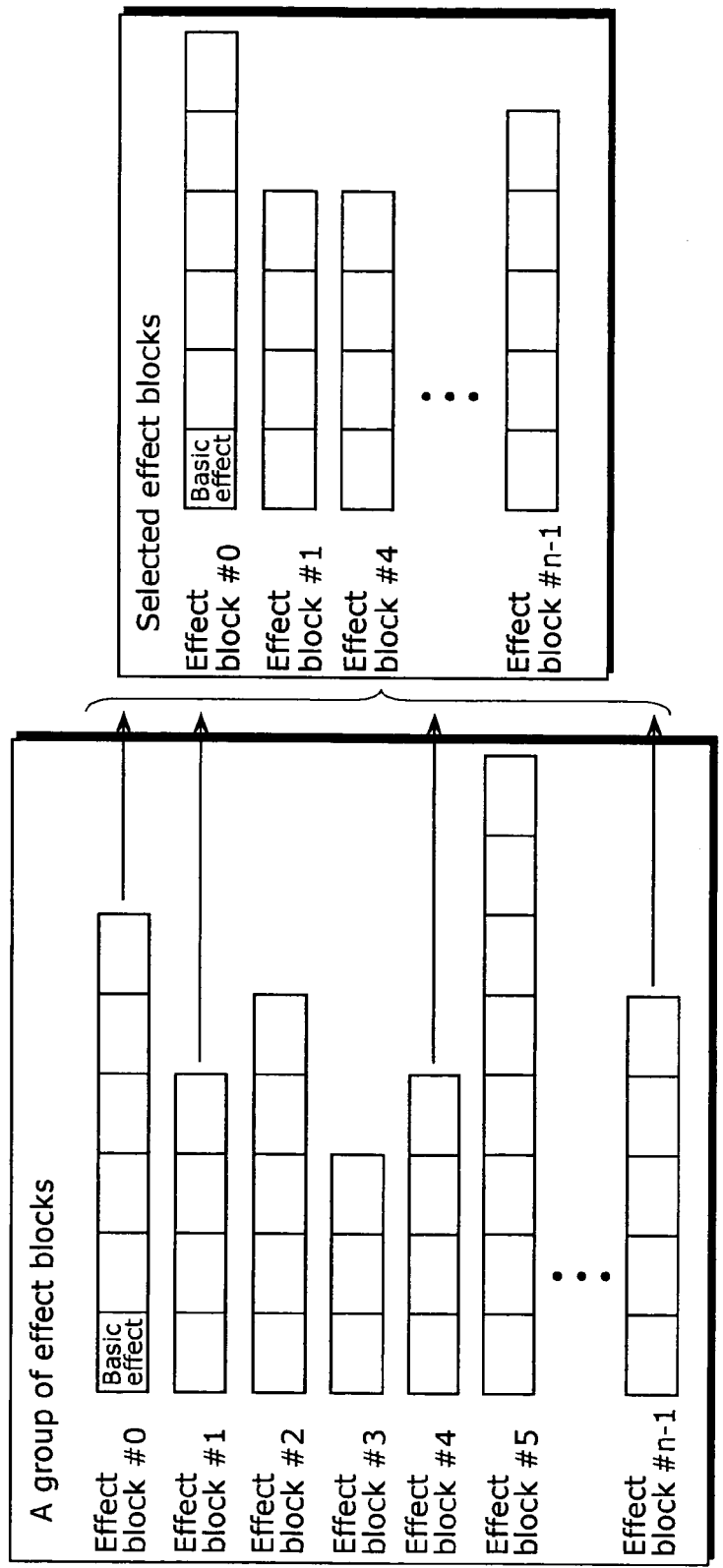
FIG. 49 is a diagram showing a group of effect blocks and how effect blocks are selected.

As shown in FIG. 49, a group of effect blocks is made up of a plurality of sequences, each of which includes one or more basic effects. Each effect block is a combination of a basic effect indicating one motion to be specified from a visual standpoint (e.g. pan, still, wipein) and at least one of a basic effect which is the same as such basic effect and another basic effect. When effect blocks are simply included in a group of effect blocks as they are (initial state), parameters required at the time of reproduction are not yet determined at all.

When a short film is composed of effect blocks, the scenario generation unit can generate a scenario, that is, a short film by sequentially executing the following steps 1)~4), based on either musical features or picture features:

1) select two or more effect blocks to be used for generating short film content;
2) generate parameters for the effect blocks that determine content features;
3) arrange the effect blocks in the time domain in accordance with the music; and
4) allocate pictures suitable for the respective effect blocks.

Here, an explanation is given of an example of generating a scenario based on musical features.

Musical features can be divided into two categories: musical note information and sensitivity information. Musical note information, which can be obtained from a musical note, includes tempo indicating the rhythm of the whole music and a variation point at which a tune of the music changes or at which a characteristic sound (e.g. sound of a percussion instrument) comes in. Meanwhile, sensitivity information, which indicates an impression held by a listener of the music, indicates an emotive feel that could be held by the listener by the use of five keywords of "intensiveness", "dynamism", "briskness", "simpleness", and "softness", and the like, each being represented by ten levels. Note that each keyword does not have to be represented by 10 levels, and may be represented, for example, by five levels or three levels. Meanwhile, an effect block is a sequence of one or more basic effects, for which only a sequential arrangement is determined at the initial state, with the time length, the start position, the end position and the color shade, and the like being undefined at all.

The short film generation/reproduction apparatus has a plurality of effete blocks.

A basic effect indicates one motion to be specified from a visual standpoint (e.g. Pan, Slidein, Still, Wipein, Focusin).

An effect block defines a series of coherent motions (e.g. one scene in a movie) by arranging an arbitrary number of basic effects in order in the time domain.

For example, when an effect block is a sequence of four basic effects of Still→Still→Still→BoxOut, three pictures are displayed in still condition, and the scene finishes off with the last picture being displayed in an increasingly reduced size until it disappears.

The following describes the configuration and algorithm required for automatically generating a short film (content) according to the musical features of selected music, using effect blocks and pictures as materials.

Figure 51:
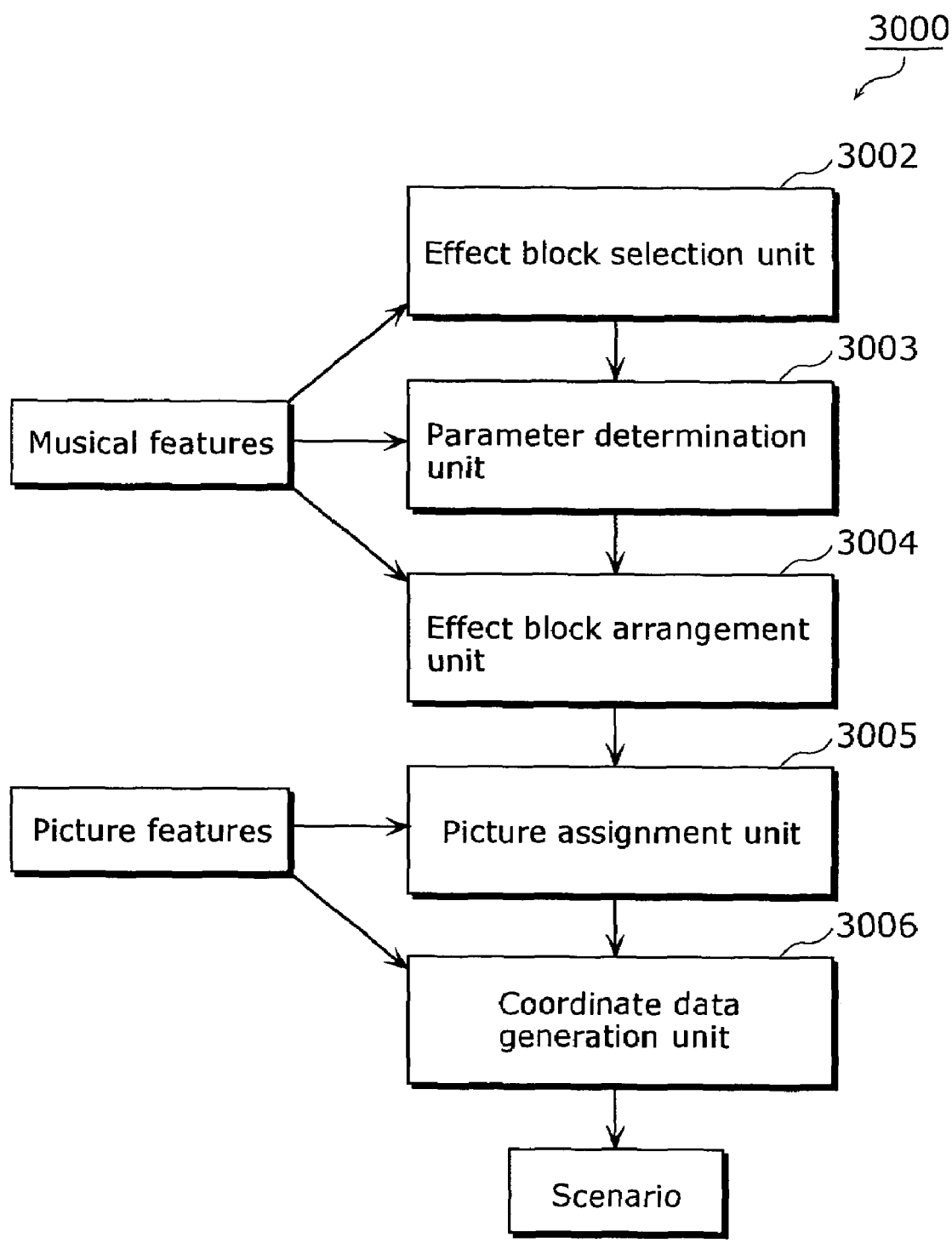
FIG. 51 is a block diagram showing a functional configuration of a short film generation/reproduction apparatus according to an eleventh embodiment of the present invention.

FIG. 51 is a block diagram showing a functional configuration of a short film generation/reproduction apparatus 3000 according to the eleventh embodiment of the present invention.

As shown in FIG. 51, the short film generation/reproduction apparatus 3000 is comprised of an effect block selection unit 3002, a parameter determination unit 3003, an effect block arrangement unit 3004, a picture assignment unit 3005, and a coordinate data generation unit 3006, in addition to musical features and picture features stored in the database as well as the above-described group of effect blocks. Note that FIG. 51 illustrates only components corresponding to the database and the scenario generation unit as the short film generation/reproduction apparatus 3000.

Figure 52:
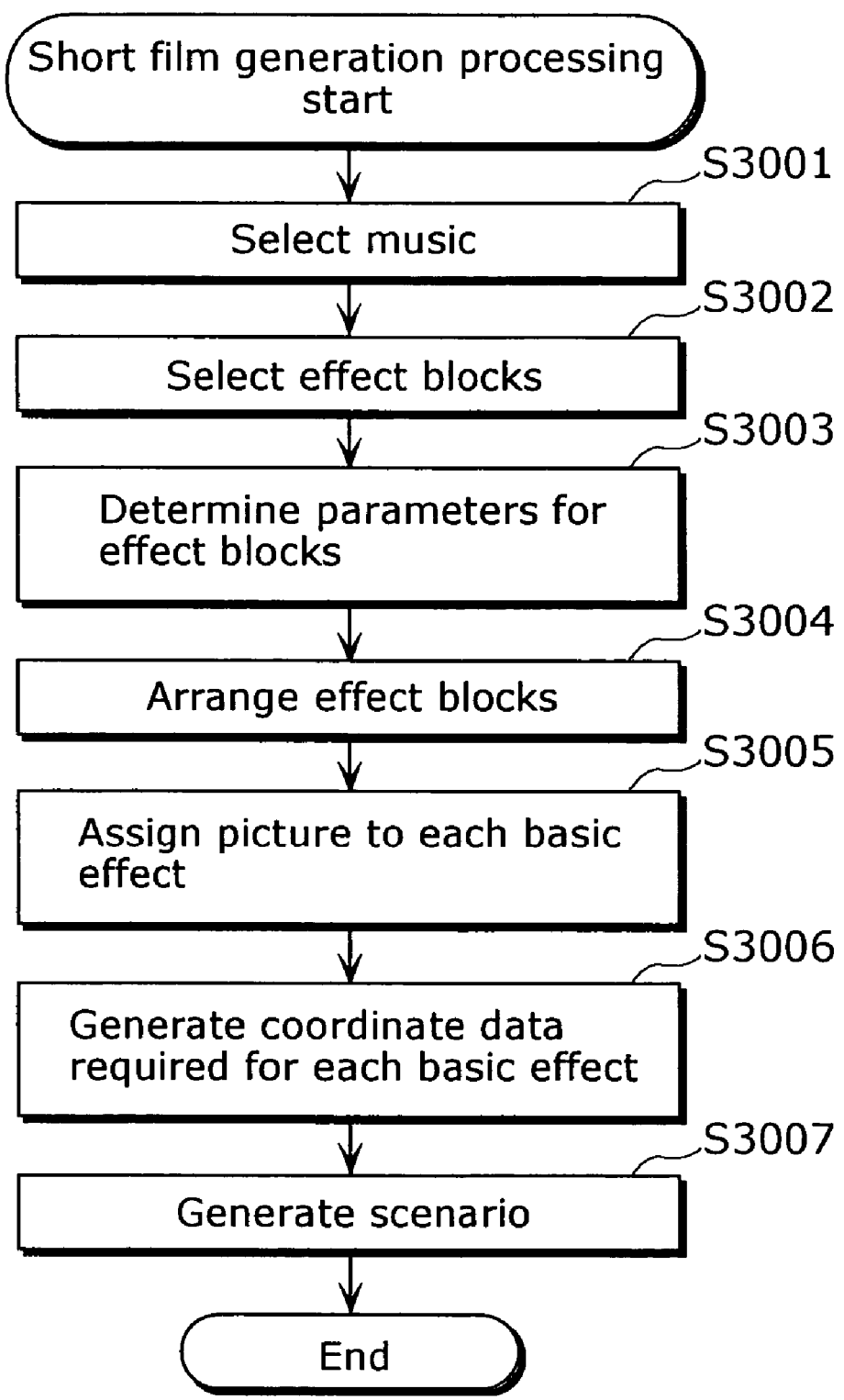
FIG. 52 is a flowchart showing processing for generating a short film to be carried out by each unit in the short film generation/reproduction apparatus.

FIG. 52 is a flowchart showing processing for generating a short film to be carried out by each unit in the short film generation/reproduction apparatus 3000.

First, the short film generation/reproduction apparatus 3000 selects, from the database, music to be reproduced as BGM of a short film (S3001). This selection may be made using a method in which the user selects a piece of favorite music on his/her own through a GUI or another interface provided by the short film generation/reproduction apparatus 3000, or a method in which the short film generation/reproduction apparatus 3000 automatically selects music from the database. After selecting the music, the short film generation/reproduction apparatus 3000 reads out the musical data of such selected music and its musical feature data from the database. Note that when there is no musical feature in the database, musical feature data shall be extracted from musical data when such musical data is read out from the database.

After the musical data and musical feature data are obtained, the effect block selection unit 3002 selects, from among a group of effect blocks, effect blocks to be used for generating the content of a short film according to the musical features (S3002; see FIG. 49). In order to allow this, all effect blocks are provided in advance with tempo information as one element of tag information. Using this tempo information, the effect block selection unit 3002 selects an effect block with intense tune variations when the selected music is up-tempo music, while selecting an effect block with small tune variations when the selected music is slow music, according to the musical note information.

Figure 50:
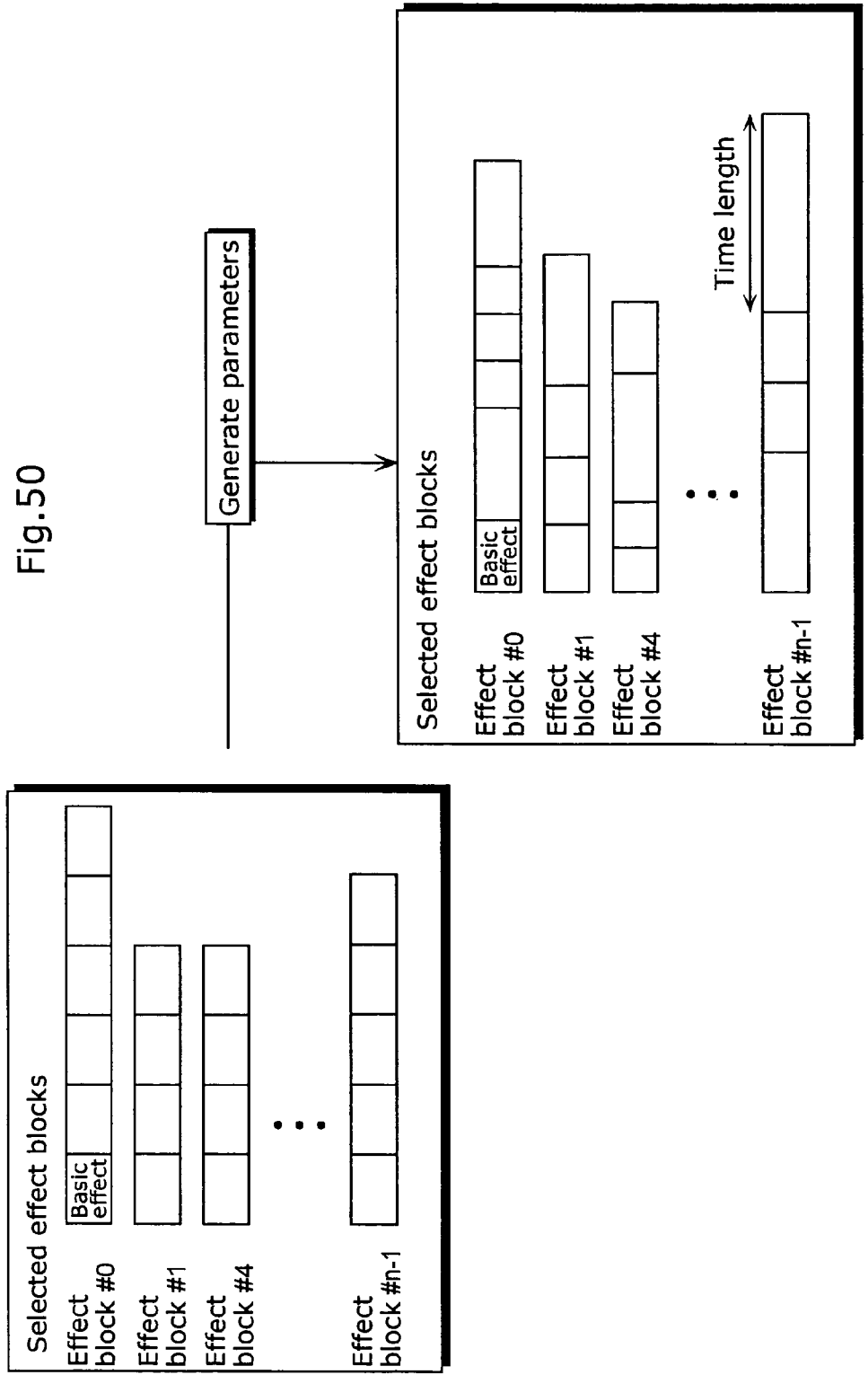
FIG. 50 is a diagram showing parameter generation and a setting of generated parameters for selected effect blocks.

After the selection of effect blocks completes, the parameter determination unit 3003 determines parameters for the selected effect blocks (S3003; see FIG. 50). More specifically, the parameter determination unit 3003 determines the color tone, frame pattern, background color, and the like of the entire content according to the sensitivity information, and determines the length of execution time and motion (the first and last coordinate values of pan) of each basic effect, a search rule for searching for pictures to be assigned, and the like. For example, when the sensitivity information indicates "intensiveness" (2), "dynamism" (2), "briskness" (3), "simpleness" (8), and "softness" (6), parameters are set as follows in order to generate a scenario with leisurely and monochrome content: color tone=monochrome, background color=black, execution time=rather long, motion=leisurely, and picture search rule=temporal sequence, and the like.

Note that a group of effect blocks selected in Step S3002 and a group of parameters determined in Step S3003 make up a style. "Style" in the present embodiment is defined as an upper layer of effects, but it is also possible that a style is defined as belonging to the same layer as that of effects.

After the parameters are determined, the effect block arrangement unit 3004 selects effect blocks one by one from among a plurality of effect blocks which have been selected according to the musical note information in the musical features, and arranges them in order in the time domain (S3004). More specifically, effect blocks are arranged in a manner in which the switching of effects agrees with points at which a tone of the music changes or points at which a characteristic sound such as that of a percussion instrument comes in, particularly according to variation point information. For example, when there is a succession of variation points, such an effect block is arranged in the time domain as allows still pictures to be displayed to change in a successive manner, like Still→Still→Still.

After the effect blocks are arranged in the time domain, the picture assignment unit 3005 assigns pictures (still pictures) to each basic block (S3005). To be more specific, the picture assignment unit 3005 searches the database for pictures on the basis of picture features required by basic effects in an effect block and the search rule. For example, "focusin" is a basic effect which gradually reduces the display area with respect to the center point of a specified object in a picture, but a picture to be selected in this case is one that includes one or more objects whose vertical or horizontal length is 60% or over of the still picture, for example.

When the assignment of pictures completes, the coordinate data generation unit 3006 generates, from the picture features of the above-assigned pictures, coordinate values required to actually operate basic effects of the respective effect blocks (S3006). Let us be more specific by taking "FocusOut" as an example. "FocusOut" is a basic effect that puts focus on an arbitrary point in a picture to display a region of interest and displays the entire image of the still picture by gradually enlarging the area of a focused figure, but this basic effect requires coordinate values to represent the size of the focused figure at the beginning and at the end. Note that when a fixed figure shall be a square or a circle, coordinate values can be specified by the center point of such figure and its radius size at the beginning and at the end. In order to obtain coordinate values, the coordinate data generation unit 3006 uses coordinate values obtained from the object information included in the respective picture features of the assigned pictures.

When the generation of the coordinate data completes (S3007), it marks the completion of the scenario. Thus, the short film generation/reproduction apparatus 3000 stores such generated scenario, that is, a short film, in the database, and terminates the short film generation processing.

Note that musical features are used in Steps S3002 and S3003, but it is also possible to use picture features instead of musical features. Stated another way, in Step S3002, by the use of a representative color extracted as picture features from a picture, an effect block of intense variations may be selected when the representative color is "red", whereas an effect block with mild variations may be selected when the representative color is "blue".

In Step S3003, parameters for effect blocks may be determined from picture features. When the representative color is "red", for example, parameters are set as follows in order to generate a scenario with dynamic content: color tone=normal, background color=white, execution time=rather short, motion=leisurely, and picture search rule=temporal sequence, and the like.

Thus, according to the eleventh embodiment of the present invention, it is possible to realize a smooth transition of effects and to produce a visual effect with an increased degree entertainment.

Twelfth Embodiment

Figure 53A:
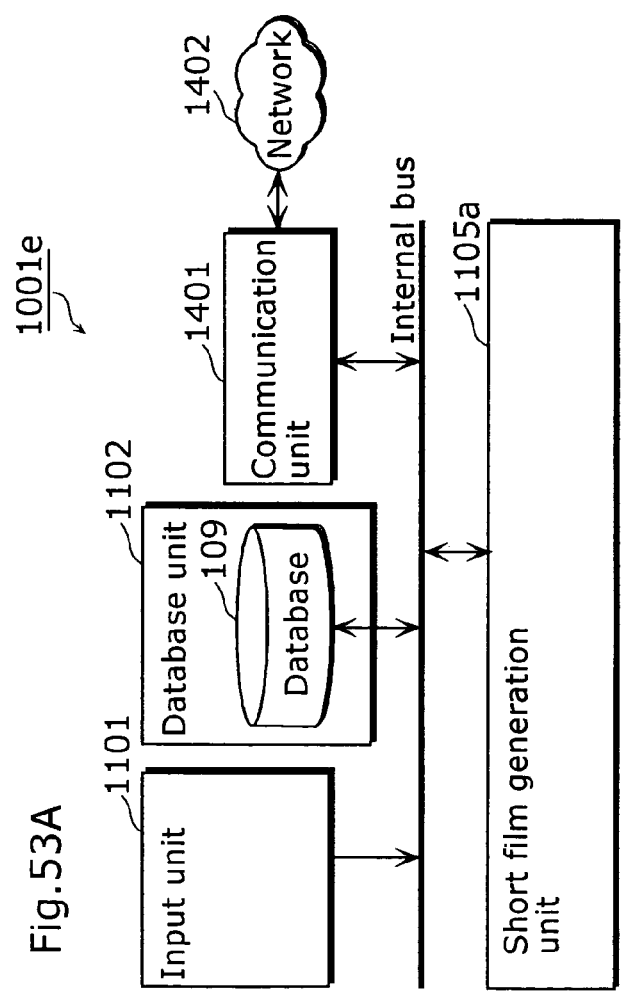
FIGS. 53A and 53B are block diagrams showing a structure of an embodiment of a short film generation/reproduction system according to the present invention.
Figure 53B:
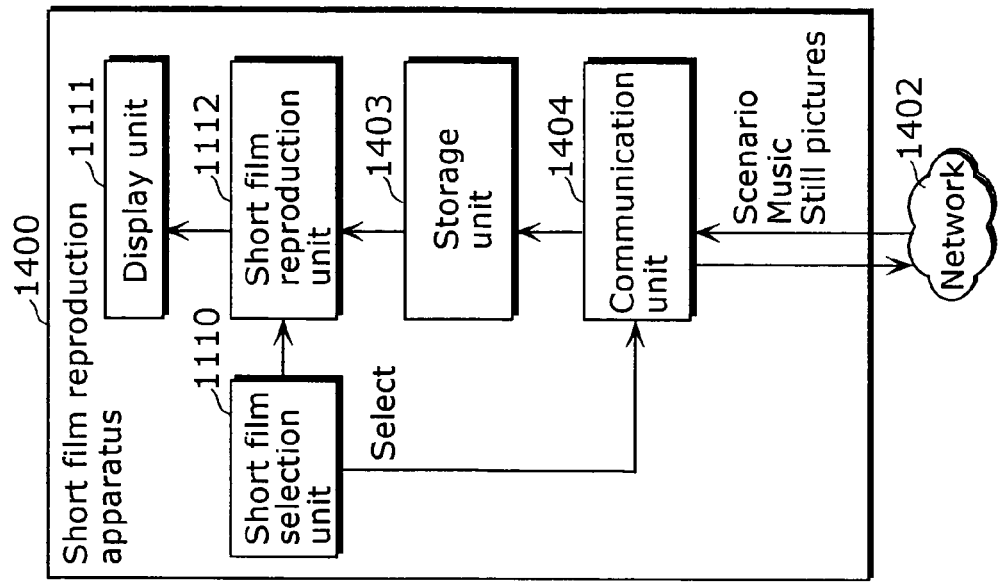

FIGS. 53A and 53B are functional block diagrams showing the structure of a short film generation/reproduction system according to the twelfth embodiment of the present invention. Note that components equivalent to those of the aforementioned embodiments are assigned the same numbers, and explanations thereof are omitted.

The short film generation/reproduction system according to the twelfth embodiment is different from the above embodiments in that the reproduction unit 1103 presented in the above embodiments is not integrated into the short film generation/reproduction apparatus but is included in a short film reproduction apparatus 1400 together with the display device 1002 and in that a short film generation/reproduction apparatus 1001e includes a communication unit 1401. However, the other components are the same as those in the aforementioned embodiments.

The communication unit 1401 of the short film generation/reproduction apparatus 1001e communicates with an external apparatus via a network 1402. Meanwhile, the short film reproduction apparatus 1400 is comprised of the short film selection unit 1110, the display unit 1111, the short film reproduction unit 1112, a storage unit 1403, and a communication unit 1404.

The short film selection unit 1110 provides the user with a GUI for selecting a short film to be reproduced. The short film reproduction unit 1112 reads out, from the storage unit 1403, the scenario of the selected short film as well as the still pictures and music defined in such scenario, decodes the scenario to reproduce the short film. The communication unit 1404 communicates with an external apparatus via the network 1402. The storage unit 1403 temporarily stores data received from the external apparatus via the communication unit 1404. The display unit 1111, which is an LCD or other devices for displaying video, displays a reproduced short film.

Next, an explanation is given of the operation of the short film reproduction apparatus 1400 with the above configuration, when reproducing a short film.

The short film selection unit 1110 obtains a list of short films stored in the database unit 1102 in the short film generation/reproduction apparatus 1001e via the communication unit 1404 and the network 1402, and displays it to the user. When the user selects a short film s/he wishes to watch, the short film selection unit 1110 sends information including the name of such selected short film to the short film generation/reproduction apparatus 1001e via the communication unit 1404, so as to request it to send the scenario, music and still pictures of the selected short film.

The communication unit 1401 in the short film generation/reproduction apparatus 1001e reads out, from the database unit 1102, the scenario, music and still pictures of the short film requested by the short film reproduction apparatus 1400, and sends them to the short film reproduction apparatus 1400.

On the receipt of the scenario, music and still pictures of the requested short film, the communication unit 1404 in the short film reproduction apparatus 1400 stores such scenario, music and still pictures into the storage unit 1403. Then, the short film reproduction unit 1112 reads out, from the storage unit 1403, the scenario, still pictures and music of the selected short film, decodes the scenario so as to reproduce the short film, and outputs such reproduced short film to the display unit 1111.

As described above, by excluding the reproduction unit 1103 from the configuration of the short film generation/reproduction apparatus so as to incorporate it into the short film reproduction apparatus 1400 together with the display device 1002, it becomes possible for the user to independently carry the short film reproduction apparatus 1400 with him/her. Moreover, it is also possible to embody the short film reproduction apparatus 1400 as a mobile phone, which can be easily carried around. This enables the user to show a short film created at home to people such user encounters in an outside location, which dramatically increases the user's enjoyment.

Thirteenth Embodiment

Next, an explanation is given of another embodiment for reproducing a short film by the short film generation/reproduction apparatus with the configuration presented in the first~twelfth embodiments.

Figure 54:
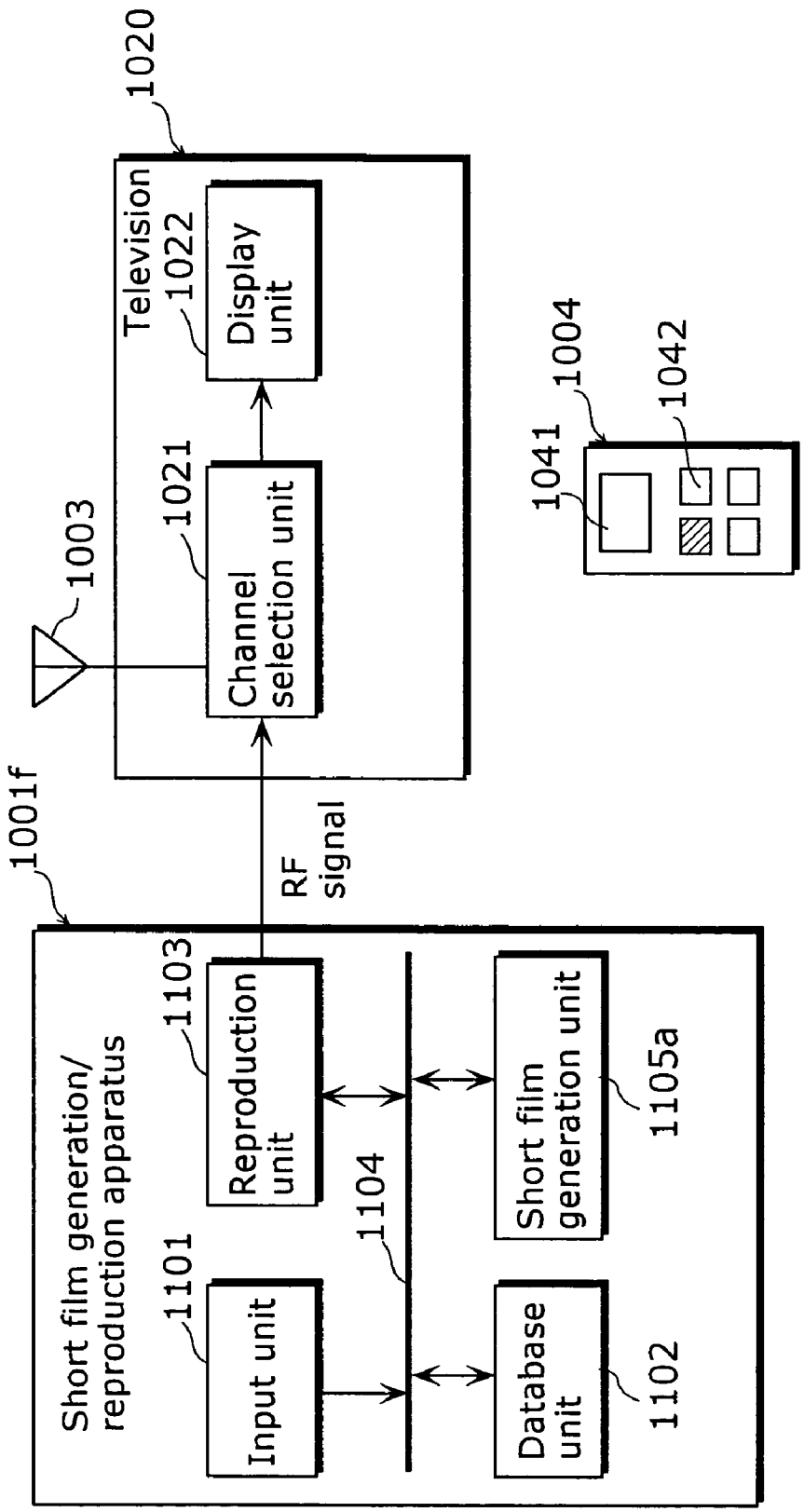
FIG. 54 is a block diagram showing a configuration of another embodiment of the short film generation/reproduction apparatus according to the present invention.

FIG. 54 is a block diagram showing the configuration of another embodiment of the short film generation/reproduction apparatus according to the present invention. Note that components equivalent to those of the aforementioned first~twelfth embodiments are assigned the same numbers, and explanations thereof are omitted.

A short film generation/reproduction apparatus 1001ƒ is connected to a television 1020, which is a display device, and includes a remote control reception unit (not illustrated in the diagram) that receives an operation signal from a remote controller 1004.

The reproduction unit 1103 of the short film generation/reproduction apparatus 1001ƒ modulates a reproduced short film into an RF signal, and outputs such signal to the television 1020. The RF signal here is a signal modulated into the frequency band of television channels. Usually, the U/VHF band is used as the frequency band to support television channels (e.g. 5, 7).

The television 1020 includes a channel selection unit 1021, a display unit 1022, and the remote control reception unit (not illustrated in FIG. 54) for receiving an operation signal from the remote controller 1004. Furthermore, an antenna 1003 is connected to the channel selection unit 1021.

The channel selection unit 1021, which has a tuner and a demodulation circuit (not illustrated in the diagram), receives an RF signal sent by the short film generation/reproduction apparatus 1001ƒ and a signal from the antenna 1003, selects a required frequency, and outputs the selected signal to the display unit 1022. The display unit 1022, which is a device for displaying video (e.g. LCD and CRT), displays a reproduced short film.

The remote controller 1004 includes a menu button 1041 and a plurality of channel buttons 1042. The user operates the television 1020 using the remote controller 1004, and selects the theme of a short film from the menu button 1041. Furthermore, an RF signal from the short film generation/reproduction apparatus 1001ƒ is assigned to a predetermined channel (e.g. 5) which is on one of the channel buttons 1042, and the user can switch between the short film and normal television programs from the channel buttons 1042.

Here, an explanation is given of the operation of the short film generation/reproduction apparatus 1001ƒ with the above configuration when reproducing a short film.

The user presses the channel (e.g. 5) which is one of the channel buttons 1042 on the remote controller 1004, the channel being assigned the RF signal sent from the short film generation/reproduction apparatus 1001ƒ. In response to this, the short film selection unit 1110 of the reproduction unit 1103 obtains themes stored in the database unit 1102, modulates them into an RF signal as a theme selection screen, and outputs the signal to the television 1020. A detailed explanation of theme selection is given later.

The user selects, from the theme selection screen displayed on the display unit 1022, a theme s/he wishes to watch using the menu button 1041. In response to this, the short film selection unit 1110 of the reproduction unit 1103 gives an instruction to read out the scenario of the short film corresponding to the selected theme, as well as the music and still picture defined in such scenario. The short film reproduction unit 1112 decodes the scenario read out from the database 1109, reproduces the short film using the readout music and still pictures, and modulates such short film into an RF signal, so as to output it to the television 1020.

Next, an explanation is given of theme selection.

Figure 55:
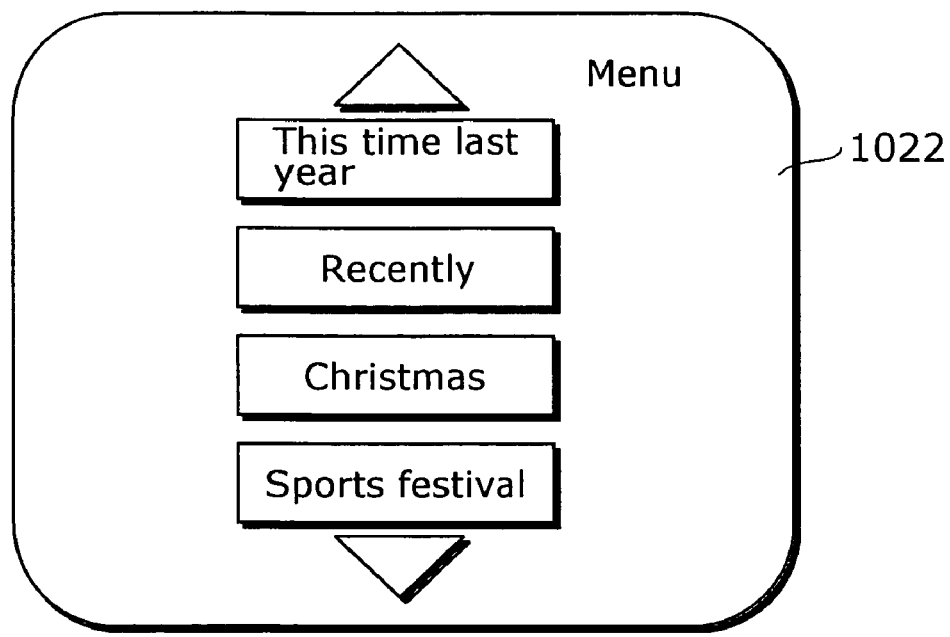
FIG. 55 is a diagram showing a display image of a theme selection screen in the display unit.
Figure 56:
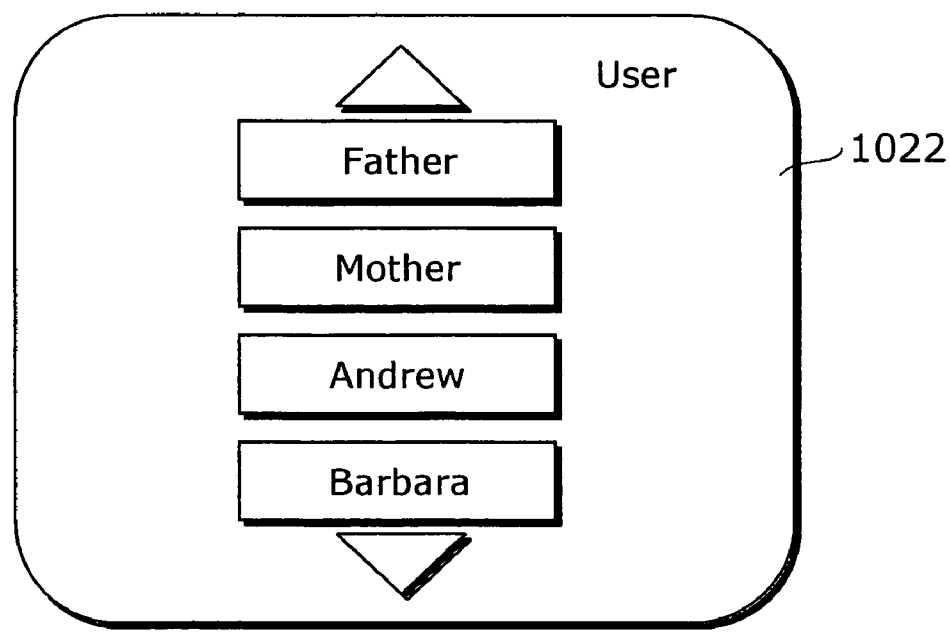
FIG. 56 is a diagram showing a display image of a user selection screen in the display unit.

FIG. 55 is a diagram showing a display image of the theme selection screen, and FIG. 56 is a diagram showing an image of a user selection screen.

There are two types of theme selection: manual selection and automatic selection. The user can select either of them in advance.

Manual selection includes two patterns: the user uses themes which are set in advance by himself/herself (default setting) and the user selects a theme from among a plurality of themes every time such user watches a short film. Examples of themes set by default are fixed themes such as a previously selected theme and a frequently selected theme. Meanwhile, when the user selects a theme every time s/he wishes to watch a short film, the user selects one theme from among a plurality of themes presented as shown in FIG. 55, for example, by operating the menu button 1041. Example themes in this case are themes indicating a certain period of time (e.g. "this time last year" and "recently") as presented in the first embodiment, and festivities (e.g. "Christmas day" and "sports festival"), and the like.

Meanwhile, automatic selection includes two patterns: themes change according to the date and time and themes change depending on a viewer. When themes change according to the date and time, a theme to be selected is one corresponding to a festivity (e.g. birthday and Christmas day) of the date when a viewer is watching the short film. When themes change depending on a viewer, the user selects his/her user name from the user selection screen as shown in FIG. 56, for example, so that a short film created by such user or a short film that includes such user is mainly reproduced.

As described above, since a reproduced output signal from the short film generation/reproduction apparatus 1001ƒ is assigned to a specific channel, there is no difference between a television program and a short film as far as user operations are concerned. Accordingly, it is possible for the user to watch a short film by going through a procedure approximately equivalent to that for operating a television. Moreover, the user can select and watch both a short film and television programs seamlessly as if zapping through television channels, which eliminates the user's operation-related trouble.

Note that the above explanation is given for the case where the user manually selects a theme every time s/he wishes to watch a short film. In the other case, the user is just required to press down one of the channels on the channel buttons 1042 to which an RF signal from the short film generation/reproduction apparatus 1001f is assigned, so that the short film reproduction unit 1112 will immediately reproduce the short film, modulate it to an RF signal, and output such modulated signal to the television 1020.

Furthermore, it is also possible to switch a short film being reproduced to another short film every time the user presses down the channel button dedicated to short films. In this case, the user can enjoy short films by switching between them without getting bored.

Moreover, it is also possible to have a configuration in which the display unit 1022 includes screens of two sizes, and either the smaller one or the bigger one can display a short film.

Fourteenth Embodiment

Figure 57:
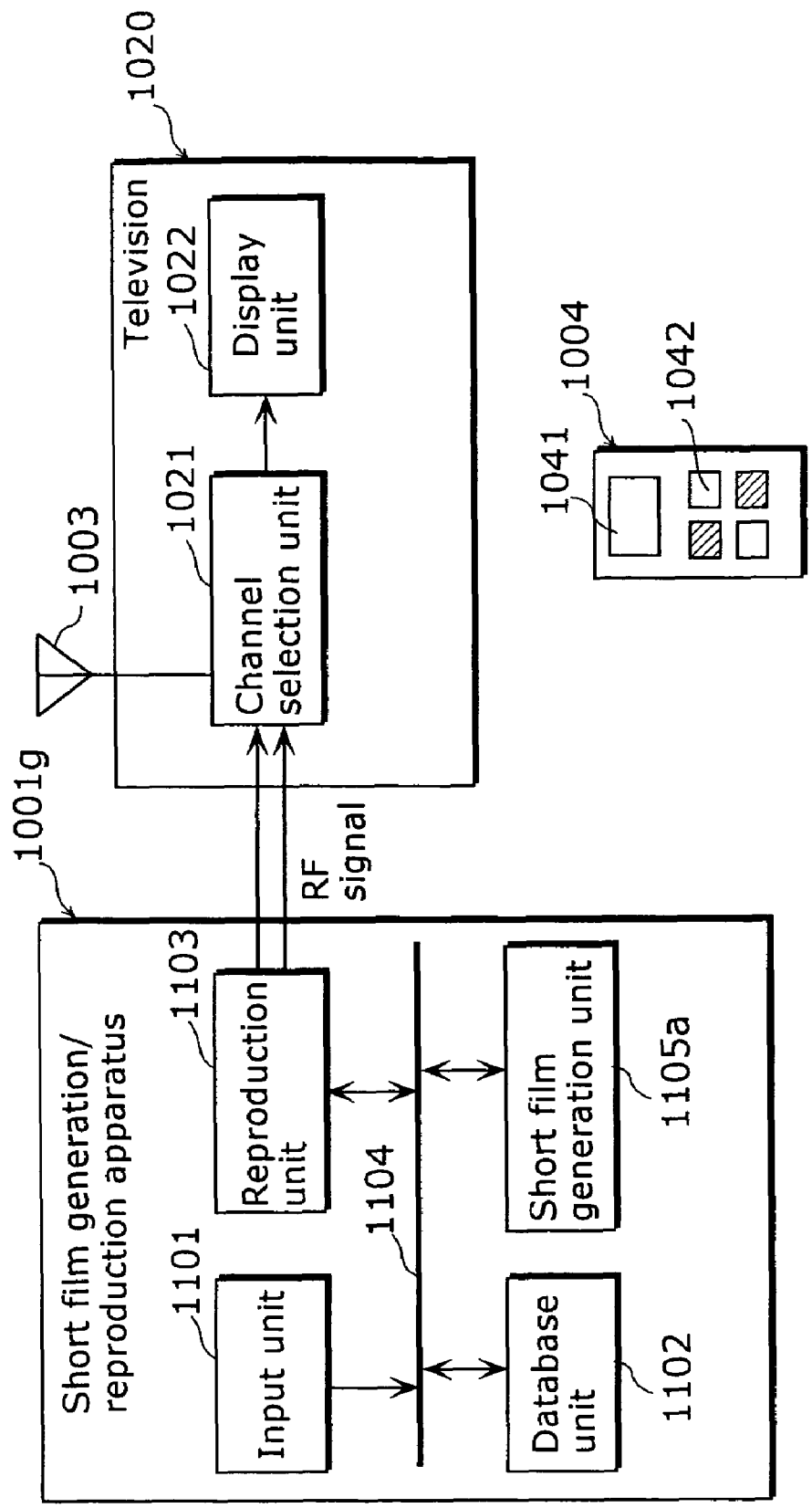
FIG. 57 is a block diagram showing a configuration of another embodiment of the short film generation/reproduction apparatus according to the present invention.

FIG. 57 is a block diagram showing the configuration of another embodiment of the short film generation/reproduction apparatus according to the present invention. Note that components equivalent to those of the thirteenth embodiment are assigned the same numbers, and explanations thereof are omitted.

The fourteenth embodiment is different from the thirteenth embodiment in that a plurality of RF signals are sent from a short film generation/reproduction apparatus 1001g, but other configuration is the same as that of the thirteenth embodiment.

The reproduction unit 1103 of the short film generation/reproduction apparatus 1001g modulates a reproduced short film into an RF signal and outputs such signal to the television 1020, but an RF signal is outputted plural in number.

The channel selection unit 1021 of the television 1020 receives a plurality of RF signals sent from the short film generation/reproduction apparatus 1001g as well as signals from the antenna 1003, selects a required frequency, and outputs the selected signals to the display unit 1022.

A plurality of RF signals sent from the short film generation/reproduction apparatus 1001g are respectively assigned to a plurality of predetermined channels (e.g. 5 and 7) on the channel buttons 1042 on the remote controller 1004. In other words, short films are assigned to channels different from each other's according to their respective themes. The user selects a theme from the menu button 1041 by pressing a channel corresponding to such theme.

As described above, since a plurality of RF signals are provided from the short film generation/reproduction apparatus 1001g, it is possible for the user to enjoy a short film as if s/he was operating a television, by switching channels to see another short film.

Furthermore, it is also possible to switch only a short film being reproduced to another short film, without changing themes, every time the user presses down the channel button 1042 being selected. Stated another way, a short film is switched to another one every time the user presses down the same button which is one of the channel buttons 1042. In this case, the user can enjoy short films without getting bored.

Fifteenth Embodiment

Figure 58:
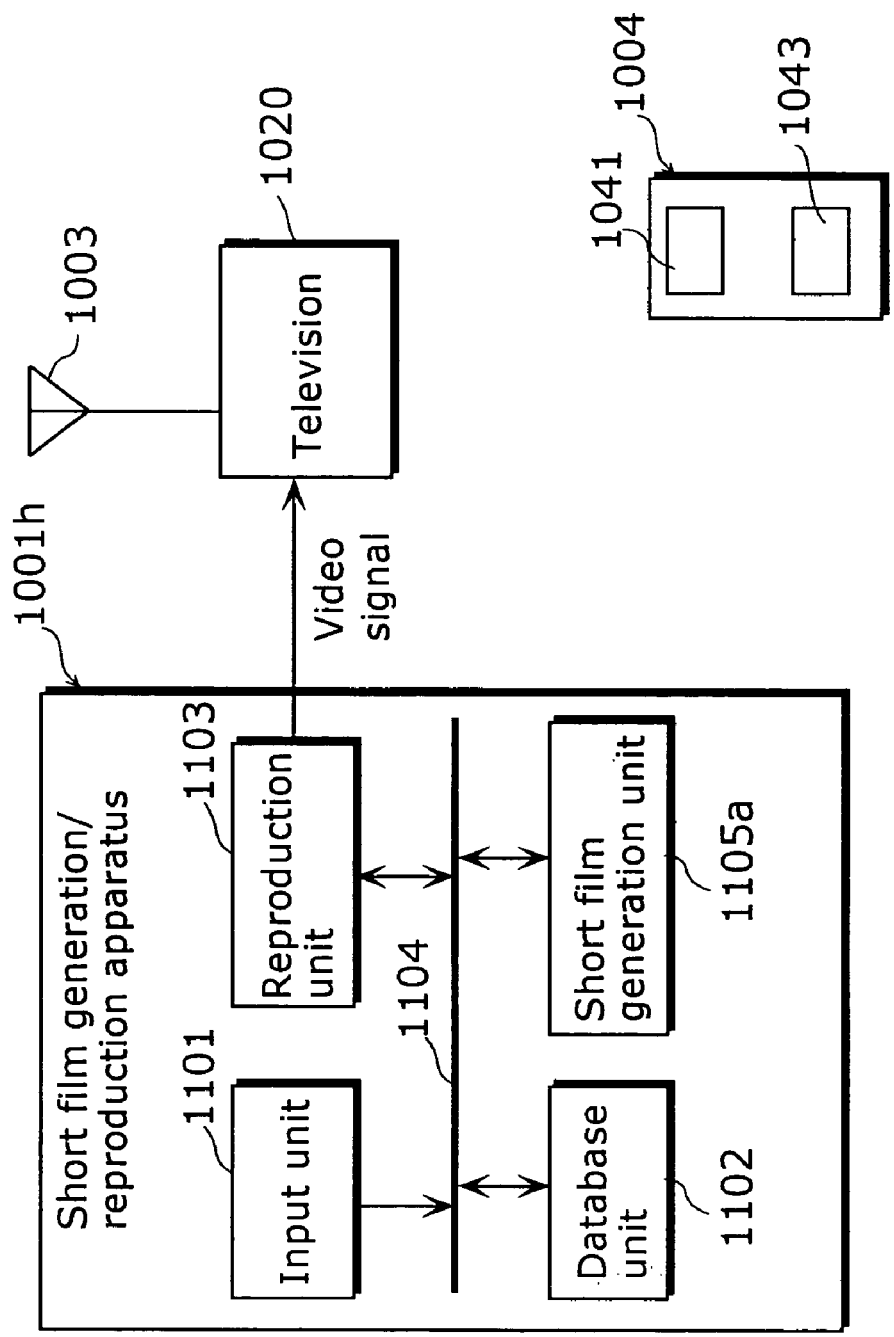
FIG. 58 is a block diagram showing a configuration of another embodiment of the short film generation/reproduction apparatus according to the present invention.

FIG. 58 is a block diagram showing the configuration of another embodiment of the short film generation/reproduction apparatus according to the present invention. Note that components equivalent to those of the thirteenth embodiment are assigned the same numbers, and explanations thereof are omitted.

The fifteenth embodiment is different from the thirteenth embodiment in that a reproduced short film is outputted as a video signal from a short film generation/reproduction apparatus 1001h, but other configuration is the same as that of the thirteenth embodiment.

The reproduction unit 1103 of the short film generation/reproduction apparatus 1001h converts a reproduced short film into a video signal, and outputs it to the television 1020.

The television 1020 receives the vide signal sent from the short film generation/reproduction apparatus 1001h at a video input terminal (not illustrated in FIG. 58).

The remote controller 1004 includes the menu button 1041 and a short film button 1043. The user operates the television 1020 through the remote controller 1004, and selects the theme of a short film from the menu button 1041. Furthermore, the user presses the short film button 1043 to watch a short film. In other words, when the user presses down the short film button 1043, the television 1020 selects a video signal sent from the short film generation/reproduction apparatus 1001h, and displays such video signal. Here, it is also possible that a short film being reproduced is switched to another one every time the user presses down the short film button 1043. In this case, the user can enjoy short films without getting bored.

As described above, since a reproduced short film from the short film generation/reproduction apparatus 1001h is outputted in the form of a video signal, it is possible for the user to view a short film just by carrying out the operation required to watch video.

Note that, in the thirteenth~fifteenth embodiments, the short film generation/reproduction apparatuses 1001e~1001h and the television 1020 are separately configured, but the present invention is not limited to this. Therefore, it is also possible that the short film generation/reproduction apparatus 1001 and the television 1020 are integrated into the same configuration.

Also note that it is also possible to embody the short film generation/reproduction apparatuses 1001a~1001h and 2001~2004 explained in the respective embodiments as a home server, a personal computer, a mobile phone, a portable digital assistant, a car navigation system, and the like, for example.

Furthermore, in the aforementioned embodiments, still pictures are retrieved from the medium storing still pictures, but still pictures may be still pictures taken, for example, by a camera-equipped mobile phone itself, still pictures which are sent in the form of an attachment to an e-mail message, or still pictures obtained via a network. In other words, the present invention is applicable to pictures obtained by any methods as long as such pictures are still pictures.

Moreover, in the aforementioned embodiments, effects and effect blocks are arranged in order according to the time length of music used as BGM, but a time length used as a reference may be one specified by the user through a GUI, and the like.

INDUSTRIAL APPLICABILITY

The short film generation/reproduction apparatus according to the present invention is suited to be employed in personal computers and portable digital assistants including mobile phones to generate a short film with an increased degree of entertainment by the use of still pictures selected from an enormous amount of pictures of the user and music which such user wishes to use, and to reproduce the generated short film.

What is claimed is:

1. A short film generation/reproduction apparatus for generating a video using at least one still picture and reproducing the video, the short film generation/reproduction apparatus comprising:
a database unit operable to store:
a still picture group including a plurality of still pictures;
a feature of each still picture included in the still picture group, the feature of each still picture being from among features identified in an expression for still pictures;
a style group including a plurality of styles indicating an outline of the video;
a feature of each style included in the style group, the feature of each style being from among features identified in an expression for styles;
a music group including a plurality of musical pieces; and
a feature of each musical piece included in the music group, the feature of each musical piece being from among features identified in an expression for music;
a selection unit operable to select a selection element used to generate a portion of the video, the selection element being selected from a selection group according to a user input, the selection group being any one of the still picture group, the style group, and the music group, and the selection element selected by the selection unit being any one of a still picture of the plurality of still pictures, a style of the plurality of styles, and a musical piece of the plurality of musical pieces, only from the selection group that is any one of the still picture group, the style group, and the music group;
a feature reading unit operable to read out, from the database unit, the feature of the selection element selected by the selection unit;
a feature conversion unit operable to convert the feature read out by the feature reading unit into features identified in two other expressions, from among the expression for still pictures, the expression for styles, and the expression for music, the two other expressions being expressions other than the expression including the feature read out by the reading unit;
a determination unit operable to automatically determine, as two other elements used to generate a portion of the video and from only two groups of the still picture group, the style group, and the music group other than the selection group, a still picture of the plurality of still pictures, a musical piece of the plurality of musical pieces, or a style of the plurality of styles, the two other elements being determined based on the features included in the two other expressions and resulting from the conversion by the feature conversion unit; and
a scenario generation unit operable to generate a scenario of the video, based on the selection element selected by the selection unit and the two other elements determined by the determination unit.

2. The short film generation/reproduction apparatus according to claim 1, wherein the feature conversion unit converts a feature of a still picture that is read out by the feature reading unit into a feature of a musical piece and a feature of a style, when the selection unit selects the still picture.

3. The short film generation/reproduction apparatus according to claim 1, wherein the feature conversion unit converts a feature of a musical piece that is read out by the feature reading unit into a feature of a still picture and a feature of a style, when the selection unit selects the musical piece.

4. The short film generation/reproduction apparatus according to claim 1, wherein the feature conversion unit converts a feature of a style that is read out by the feature reading unit into a feature of a still picture and a feature of a musical piece, when the selection unit selects the style.

5. The short film generation/reproduction apparatus according to claim 1,
wherein the database unit further stores a theme of the video to be generated and a feature of the theme from among features identified in an expression for themes,
wherein the selection unit selects one of the following elements to be used when generating the video: a still picture; a musical piece; a style; and a theme, and
wherein the feature reading unit reads out, from the database unit, the feature corresponding to the element selected by the selection unit, the feature being one of the feature of the still picture, the feature of the musical piece, the feature of the style, and the feature of the theme.

6. The short film generation/reproduction apparatus according to claim 2, wherein the feature conversion unit converts a feature of a theme that is read out by the feature reading unit into a feature of a still picture, a feature of a musical piece, and a feature of a style, when the selection unit selects the theme.

7. The short film generation/reproduction apparatus according to claim 1, further comprising:
a still picture obtainment unit operable to obtain a still picture; and
a picture feature extraction unit operable to extract a feature identified in the expression for still pictures from the still picture obtained by the still picture obtainment unit.

8. The short film generation/reproduction apparatus according to claim 7, further comprising an object information extraction unit operable to extract object information from the still picture obtained by the still picture obtainment unit, the object information being information about an object included in the still picture.

9. The short film generation/reproduction apparatus according to claim 8,
wherein the style includes (i) a predetermined number of effects specifying what kind of visual effect is used to reproduce at least one target still picture which is the still picture obtained by the still picture obtainment unit and (ii) a parameter including an attribute of the style, and
wherein the scenario generation unit associates, with each of the predetermined number of effects, the object information included in the at least one target still picture of each of the predetermined number of effects.

10. The short film generation/reproduction apparatus according to claim 9,
wherein the scenario generation unit includes:
an effect arrangement unit operable to select effects one by one from among the predetermined number of effects included in the style, and to arrange the selected effects one by one in a time domain;
a still picture assignment unit operable to assign a still picture to each of the effects arranged in the time domain by the effect arrangement unit on the basis of the object information, the still picture satisfying a picture feature required by the respective effects; and
a parameter setting unit operable to generate the scenario by describing a parameter indicating processing to be performed on the object suitable for each of the effects arranged in the time domain by the effect arrangement unit, and to store the generated scenario in the database unit.

11. The short film generation/reproduction apparatus according to claim 10, wherein the picture feature required by each of the effects is a feature of the object.

12. The short film generation/reproduction apparatus according to claim 10, wherein the feature of the object is at least one of a type of the object, a color of the object, a shape of the object, and a number of objects.

13. The short film generation/reproduction apparatus according to claim 10, further comprising a feature point extraction unit operable to extract, from the object, a feature point indicating a characteristic part of the object, and to store the extracted feature point in the object information,
wherein the parameter setting unit generates the scenario by describing a parameter indicating processing to be performed on a position where the feature point of the object is located.

14. The short film generation/reproduction apparatus according to claim 10,
wherein the database unit further stores face information for individual authentication used to identify a face of an individual,
wherein the short film generation/reproduction apparatus further comprises a face authentication unit operable to authenticate a name of the object based on the face information and to store the authenticated name of the object in the object information, when the object extracted by the object information extraction unit is a person's face, and
wherein the parameter setting unit generates the scenario by describing a parameter indicating processing to be performed on the object specified by the authenticated name.

15. The short film generation/reproduction apparatus according to claim 14, further comprising:
an individual information storage unit operable to store individual information in which a name of an individual and an attribute of the individual are associated with each other; and
an individual information search unit operable to search, from the individual information, for the attribute of the individual corresponding to the name of the object authenticated by the face authentication unit, and to store the individual attribute obtained by the search in the object information,
wherein the parameter setting unit generates the scenario by describing a parameter indicating processing to be performed on the object specified by the individual attribute.

16. The short film generation/reproduction apparatus according to claim 1,
wherein the style includes (i) a predetermined number of effects specifying what kind of visual effect is used to reproduce one still picture which is a target of each of the predetermined number of effects and (ii) a parameter including an attribute of the style, and
wherein the scenario generation unit arranges the predetermined number of effects based on the attribute of the style and an attribute included in each of the predetermined number of effects.

17. The short film generation/reproduction apparatus according to claim 16,
wherein the predetermined number of effects is either a basic effect including only one effect or an effect block made up of a plurality of basic effects, and
wherein the scenario generation unit arranges the basic effect or the effect block, based on the attribute of the style and the attribute included in each of the predetermined number of effects.

18. The short film generation/reproduction apparatus according to claim 16, wherein the scenario generation unit assigns a still picture to each of the predetermined number of effects, the still picture being suitable for a type of each of the predetermined number of effects.

19. The short film generation/reproduction apparatus according to claim 1, further comprising:
a short film selection unit operable to select the video to be reproduced; and
a short film reproduction unit operable to read out, from the database unit, the scenario of the video selected by the short film selection unit, and one still picture and the music defined in the scenario, and to reproduce the video based on the scenario.

20. The short film generation/reproduction apparatus according to claim 19, further comprising a display unit operable to display the video reproduced by the short film reproduction unit.

21. The short film generation/reproduction apparatus according to claim 19, further comprising an operation unit operable to operate the short film generation/reproduction apparatus and a display device for displaying the video, the display device being connected to the short film generation/reproduction apparatus,
wherein the short film reproduction unit modulates a signal obtained by reproducing the video into an RF signal so as to output the RF signal, and starts reproducing the video when a predetermined channel button is pressed down, the channel button being included in the operation unit and being assigned the RF signal.

22. The short film generation/reproduction apparatus according to claim 21, wherein the short film reproduction unit switches the video being reproduced to another video, every time the channel button is pressed down.

23. The short film generation/reproduction apparatus according to claim 22, wherein the short film reproduction unit reproduces a plurality of videos and outputs a plurality of RF signals all at once.

24. The short film generation/reproduction apparatus according to claim 19, further comprising an operation unit operable to operate the short film generation/reproduction apparatus and a display device for displaying the video, the display device being connected to the short film generation/reproduction apparatus,
wherein the short film reproduction unit modulates a signal obtained by reproducing the video into a video signal so as to output the video signal, and starts reproducing the video when a predetermined button is pressed down, the button being included in the operation unit and being assigned the video signal.

25. The short film generation/reproduction apparatus according to claim 24, wherein the short film reproduction unit switches the video being reproduced to another video, every time the button is pressed down.

26. The short film generation/reproduction apparatus according to claim 1, wherein the short film generation/reproduction apparatus is a home server.

27. A short film generation/reproduction apparatus for generating a video using at least one still picture and reproducing the video, the short film generation/reproduction apparatus comprising:
a database unit operable to store a still picture, a picture feature indicating a feature of the still picture, music, a musical feature indicating a feature of the music, and an effect specifying what kind of visual effect is used to reproduce the still picture, which is a target of the effect;

a selection unit operable to select, according to a user input, only one element from any of the following elements to be used when generating the video: the still picture; and the music;

a feature reading unit operable to read out, from the database unit, the feature corresponding to the element selected by the selection unit, the feature being either the picture feature or the musical feature;

a feature conversion unit operable to convert the feature read out by the feature reading unit into another feature;

a determination unit operable to automatically determine another element, based on the other feature resulting from the conversion by the feature conversion unit;

a style generation unit operable to determine a predetermined number of effects and a parameter used to generate the video, and to generate a style indicating an outline of the video to be generated, based on the element selected by the selection unit and the other element determined by the determination unit; and a scenario generation unit operable to generate a scenario of the video, based on the element selected by the selection unit, the other element determined by the determination unit, and the style generated by the style generation unit.

28. A short film generation/reproduction apparatus for generating a video using at least one still picture and reproducing the video, the short film generation/reproduction apparatus comprising:

an input unit operable to obtain a still picture inputted from outside;

a database unit operable to store the at least one still picture, a style including (i) a predetermined number of effects specifying what kind of visual effect is used to reproduce the at least one still picture which is a target of each of the predetermined number of effects and (ii) a parameter, and music used for the video to be generated, and a scenario generation unit operable to generate a scenario of the video, based on a predetermined feature of the style and a predetermined feature of the music, wherein the input unit includes an object information extraction unit operable to automatically extract an object included in a still picture every time a still picture is inputted from outside by a user, and to store, in the database unit, object information including a position of the extracted object, and wherein the scenario generation unit includes:

an effect arrangement unit operable to select effects one by one from among a group of effects stored in the database unit, and to arrange the selected effects one by one in a time domain;

a still picture assignment unit operable to automatically assign a still picture to each of the effects arranged in the time domain by the effect arrangement unit, each of the effects having the still picture assigned thereto based on the object information stored in the database unit, the still picture satisfying a picture feature required by the respective effects; and a parameter setting unit operable to generate the scenario by describing a parameter indicating processing to be performed on the object suitable for each of the effects arranged in the time domain by the effect arrangement unit, and to store the generated scenario in the database unit.

29. The short film generation/reproduction apparatus according to claim 28, wherein the picture feature required by each of the effects is a feature of the object.

30. The short film generation/reproduction apparatus according to claim 29, wherein the feature of the object is at least one of a type of the object, a color of the object, a shape of the object, and a number of objects.

31. The short film generation/reproduction apparatus according to claim 28, wherein the input unit further includes a feature point extraction unit operable to extract, from the object, a feature point indicating a characteristic part of the object, and wherein the parameter setting unit generates the scenario by describing a parameter indicating processing to be performed on a position where the feature point of the object is located.

32. The short film generation/reproduction apparatus according to claim 28, wherein the database unit further stores face information for individual authentication used to identify a face of an individual, wherein the input unit further includes a face authentication unit operable to authenticate a name of the object based on the face information and to store the authenticated name of the object in the object information, when the object extracted by the object information extraction unit is a person's face, and wherein the parameter setting unit generates the scenario by describing a parameter indicating processing to be performed on the object specified by the authenticated name.

33. The short film generation/reproduction apparatus according to claim 32, further comprising an individual information storage unit operable to store individual information in which a name of an individual and an attribute of the individual are associated with each other, wherein the input unit further includes an individual information search unit operable to search, from the individual information, for the attribute of the individual corresponding to the name of the object authenticated by the face authentication unit, and to store the individual attribute obtained by the search in the object information, and wherein the parameter setting unit generates the scenario by describing a parameter indicating processing to be performed on the object specified by the individual attribute.

34. A short film generation/reproduction system comprising:

a short film generation/reproduction apparatus for generating a video using at least one still picture and reproducing the video; and a short film reproduction apparatus connected to the short film generation/reproduction apparatus via a network, wherein the short film generation/reproduction apparatus includes:

a database unit operable to store:

a still picture group including a plurality of still pictures;

a feature of each still picture included in the still picture group, the feature of each still picture being from among features identified in an expression for still pictures;

a style group including a plurality of styles indicating an outline of the video;

a feature of each style included in the style group, the feature of each style being from among features identified in an expression for styles;

a music group including a plurality of musical pieces; and a feature of each musical piece included in music group, the feature of each musical piece being from among features identified in an expression for music;

a selection unit operable to select a selection element used to generate a portion of the video, the selection element being selected from a selection group according to a user input, the selection group being any one of the still picture group, the style group, and the music group, and the selection element selected by the selection unit being any one of a still picture of the plurality of still pictures, a style of the plurality of styles, and a musical piece of the plurality of musical pieces, only from the selection group that is any one of the still picture group, the style group, and the music group;

a feature reading unit operable to read out, from the database unit, the feature of the selection element selected by the selection unit;

a feature conversion unit operable to convert the feature read out by the feature reading unit into features identified in two other expressions, from among the expression for still pictures, the expression for styles, and the expression for music, the two other expressions being expressions other than the expression including the feature read out by the reading unit;

a determination unit operable to automatically determine, as two other the elements used to generate a portion of the video and from only two groups of the still picture group, the style group, and the music group other than the selection group, a still picture of the plurality of still pictures, a musical piece of the plurality of musical pieces, or a style of the plurality of styles, the two other elements being determined based on the features included in the two other expressions and resulting from the conversion by the feature conversion unit;

a scenario generation unit operable to generate a scenario of the video, based on the selection element selected by the selection unit and the two other elements determined by the determination unit; and a first communication unit operable to read out, from the database unit, the scenario of the video selected by the short film reproduction apparatus, and the still picture and the music defined in the scenario, and to send the read-out scenario, the still picture and the music to the short film reproduction apparatus via the network, and wherein the short film reproduction apparatus includes:

a short film selection unit operable to select the video to be reproduced;

a second communication unit operable to communicate with the short film generation/reproduction apparatus via the network;

a storage unit operable to temporarily store the scenario of the video, and the still picture and the music defined in the scenario, which are sent by the short film generation/reproduction apparatus;

a short film reproduction unit operable to read out, from the storage unit of the short film reproduction apparatus, the scenario of the video selected by the short film selection unit, and the still picture and the music defined in the scenario, and to reproduce the video based on the scenario; and a display unit operable to display the video reproduced by the short film reproduction unit.

35. A short film generation/reproduction method for generating a video using at least one still picture and reproducing the video, the short film generation/reproduction method comprising:

a selection step of selecting a selection element used to generate a portion of the video, the selection element being selected from a selection group according to a user input, the selection group being any one of a still picture group, a style group, and a music group, and the selection element selected by the selection step being any one of a still picture of a plurality of still pictures, a style of a plurality of styles, and a musical piece of a plurality of musical pieces, only from the selection group that is any one of the still picture group, the style group, and the music group, wherein the selection is performed using a database that stores (i) the still picture group including the plurality of still pictures, (ii) a feature of each still picture included in the still picture group, the feature of each still picture being from among features identified in an expression for still pictures, (iii) the style group including the plurality of styles indicating an outline of the video, (iv) a feature of each style included in the style group, the feature of each style being from among features identified in an expression for styles, (v) the music group including the plurality of musical pieces, and (vi) a feature of each musical piece included in the music group, the feature of each musical piece being from among features identified in an expression for music;

a feature reading step of reading out, from the database, the feature of the selection element selected in the selection step;

a feature conversion step of converting the feature read out in the feature reading step into features identified in two other expressions, from among the expression for still pictures, the expression for styles, and the expression for music, the two other expressions being expressions other than the expression including the feature read out in the feature reading step;

a determination step of automatically determining, as two other elements used to generate a portion of the video and from only two groups of the still picture group, the style group, and the music group other than the selection group, a still picture of the plurality of still pictures, a musical piece of the plurality of musical pieces, or a style of the plurality of styles, the two other elements being determined based on the features included in the two other expressions and resulting from the conversion in the feature conversion step; and a scenario generation step of generating a scenario of the video, based on the selection element selected in the selection step and the two other elements determined in the determination step.

36. A short film generation/reproduction method for generating a video using at least one still picture and reproducing the video, the short film generation/reproduction method comprising:

an input step of obtaining a still picture inputted from outside; and a scenario generation step of generating a scenario of the video, based on a predetermined feature of a style indicating an outline of the video to be generated and based on a predetermined feature of music to be used to generate the video, wherein the input step includes an object information extraction step of automatically extracting an object included in a still picture every time a still picture is inputted from outside, and generating object information including a position of the extracted object, and wherein the scenario generation step includes:

an effect arrangement step of selecting effects one by one from among a group of effects, and arranging the selected effects one by one in a time domain;

a still picture assignment step of automatically assigning a still picture to each of the effects arranged in the time domain in the effect arrangement step, each of the effects having the still picture assigned thereto based on the object information, the still picture satisfying a picture feature required by the respective effects; and a parameter setting step of generating the scenario by describing a parameter indicating processing to be performed on the object suitable for each of the effects arranged in the time domain in the effect arrangement step.

37. A program embodied in a non-transitory computer readable medium for generating a video using at least one still picture and reproducing the video, the program causing a computer to execute the following steps:

a selection step of selecting a selection element used to generate a portion of the video, the selection element being selected from a selection group according to a user input, the selection group being any one of a still picture group, a style group, and a music group, and the selection element selected by the selection step being any one of a still picture of a plurality of still pictures, a style of a plurality of styles, and a musical piece of a plurality of musical pieces, only from the selection group that is any one of the still picture group, the style group, and the music group, wherein the selection is performed using a database that stores (i) the still picture group including the plurality of still pictures, (ii) a feature of each still picture included in the still picture group, the feature of each still picture being from among features identified in an expression for still pictures, (iii) the style group including the plurality of styles indicating an outline of the video, (iv) a feature of each style included in the style group, the feature of each style being from among features identified in an expression for styles, (v) the music group including the plurality of musical pieces, and (vi) a feature of each musical piece included in the music group, the feature of each musical piece being from among features identified in an expression for music;

a feature reading step of reading out, from the database, the feature of the selection element selected in the selection step;

a feature conversion step of converting the feature read out in the feature reading step into features identified in two other expressions, from among the expression for still pictures, the expression for styles, and the expression for music, the two other expressions being expressions other than the expression including the feature read out in the feature reading step;

a determination step of automatically determining, as two other elements used to generate a portion of the video and from only two groups of the still picture group, the style group, and the music group other than the selection group, a still picture of the plurality of still pictures, a musical piece of the plurality of musical pieces, or a style of the plurality of styles, the two other elements being determined based on the features included in the two other expressions and resulting from the conversion in the feature conversion step; and a scenario generation step of generating a scenario of the video, based on the selection element selected in the selection step and the two other elements determined in the determination step.

38. A program embodied in a non-transitory computer readable medium for generating a video using at least one still picture and reproducing the video, the program causing a computer to execute the following steps:

an input step of obtaining a still picture inputted from outside; and a scenario generation step of generating a scenario of the video, based on a predetermined feature of a style indicating an outline of the video to be generated and based on a predetermined feature of music to be used to generate the video, wherein the input step includes an object information extraction step of automatically extracting an object included in a still picture every time a still picture is inputted from outside, and generating object information including a position of the extracted object, and wherein the scenario generation step includes:

an effect arrangement step of selecting effects one by one from among a group of effects, and arranging the selected effects one by one in a time domain;

a still picture assignment step of automatically assigning a still picture to each of the effects arranged in the time domain in the effect arrangement step, each of the effects having the still picture assigned thereto based on the object information, the still picture satisfying a picture feature required by the respective effects; and a parameter setting step of generating the scenario by describing a parameter indicating processing to be performed on the object suitable for each of the effects arranged in the time domain in the effect arrangement step.

* * * * *